United States Patent [19]

Breslau et al.

[11] 4,028,667
[45] June 7, 1977

[54] ASYNCHRONOUS, HIERARCHICAL LOOP COMMUNICATION SYSTEM WITH INDEPENDENT LOCAL STATION CONTROL OF ACCESS TO INBOUND TIME PORTIONS WITHOUT CENTRAL CONTROL

[75] Inventors: Franklin Charles Breslau, Teaneck, N.J.; Gerald Goertzel, White Plains, N.Y.

[73] Assignee: International Business Machines Corporation, Armonk, N.Y.

[22] Filed: Dec. 22, 1975

[21] Appl. No.: 643,711

[52] U.S. Cl. ........................................... 340/172.5
[51] Int. Cl.² ....................... H04J 3/08; G06F 3/04
[58] Field of Search ............. 340/172.5; 179/15 AL

[56] References Cited

UNITED STATES PATENTS

| | | | |
|---|---|---|---|
| 3,544,976 | 12/1970 | Collins | 340/172.5 |
| 3,633,169 | 1/1972 | Bickford | 340/172.5 |
| 3,692,941 | 9/1972 | Collins et al. | 179/15 AL |
| 3,731,002 | 5/1973 | Pierce | 179/15 AL |
| 3,732,543 | 5/1973 | Rocher et al. | 340/172.5 |
| 3,749,845 | 7/1973 | Fraser | 179/15 AL |
| 3,755,789 | 8/1973 | Collins | 340/172.5 |
| 3,810,100 | 5/1974 | Hungerford et al. | 340/172.5 |
| 3,879,710 | 4/1975 | Maxemchuk et al. | 340/172.5 |

Primary Examiner—Melvin B. Chapnick
Attorney, Agent, or Firm—Graham S. Jones, II

[57] ABSTRACT

A CPU communicates via an indirect memory access channel (IMA) to many devices on a high speed loop and an asynchronous low speed loop. The IMA connects to a loop adaptor (LAD) which connects to the primary parallel loop. A low speed serial loop is coupled to the primary loop through a general device adaptor and another LAD. The time of the loops is broken down into frames divided into inbound and outbound halves. Each half frame carries address and control data. The address in each frame is highly variable depending upon demand by devices and the allocation of service is controlled by interrupt signals by devices on the loops which can demand service whenever an empty or free inbound frame passes by their inputs as indicated by signals known as free bit signals, which are suppressed as soon as a device seizes a free inbound frame.

13 Claims, 79 Drawing Figures

FIG. 1

| FIG. 1A | FIG. 1B |

DATA RECEIVED FROM DSA OR LAD-OB

TO DSA OR LAD

DRLS

TO DSA OR LAD

GDA OUTBOUND

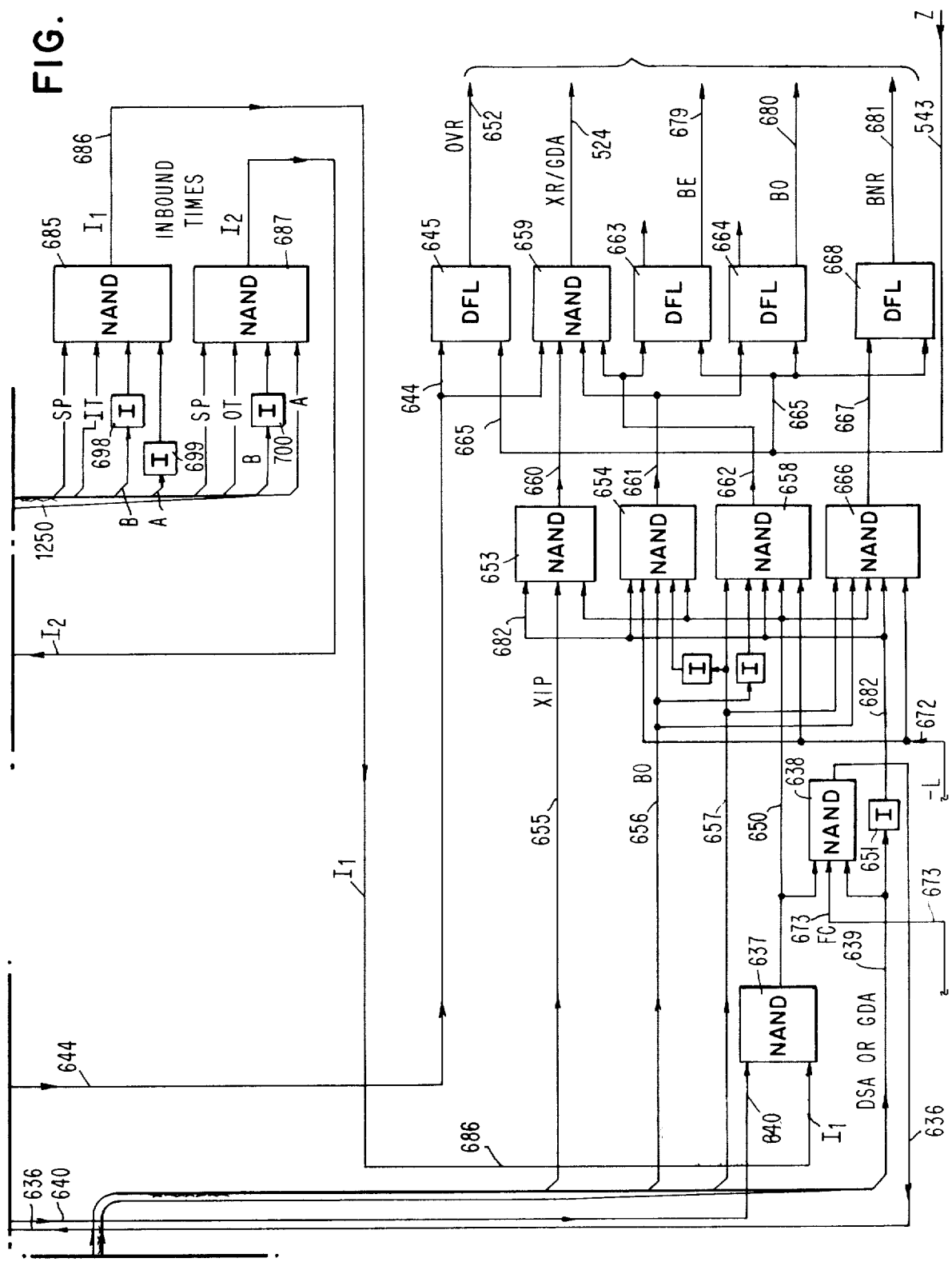

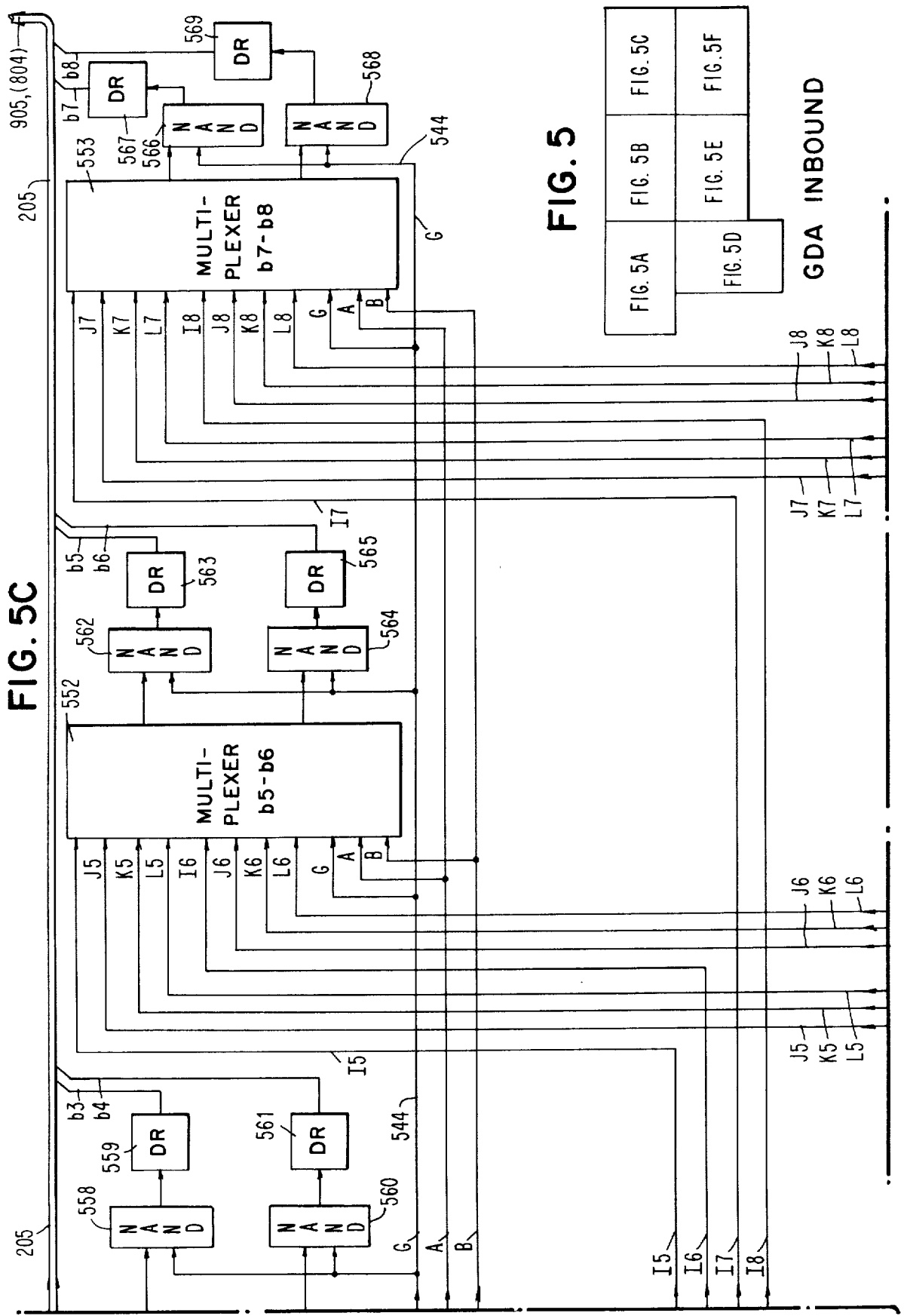

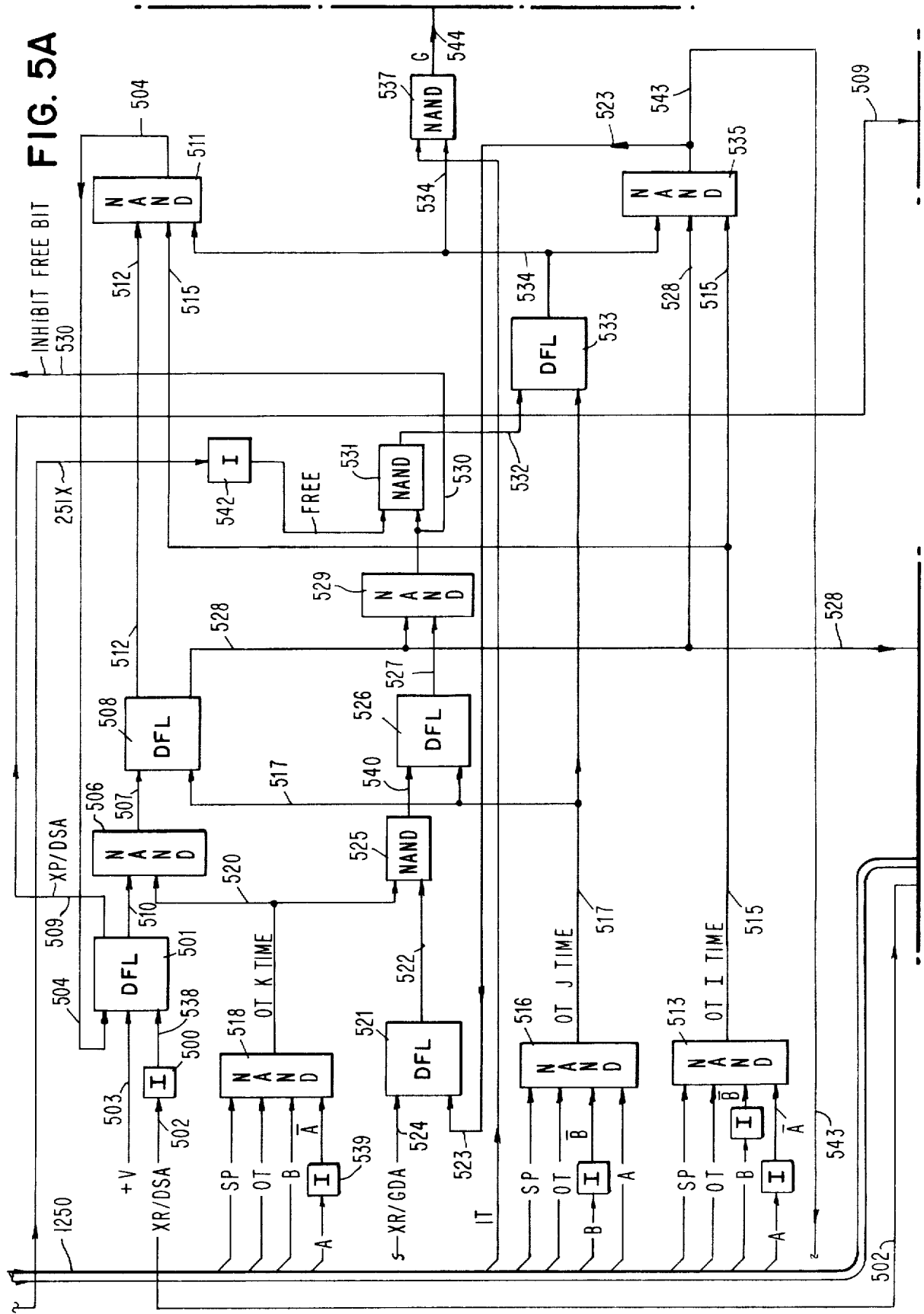

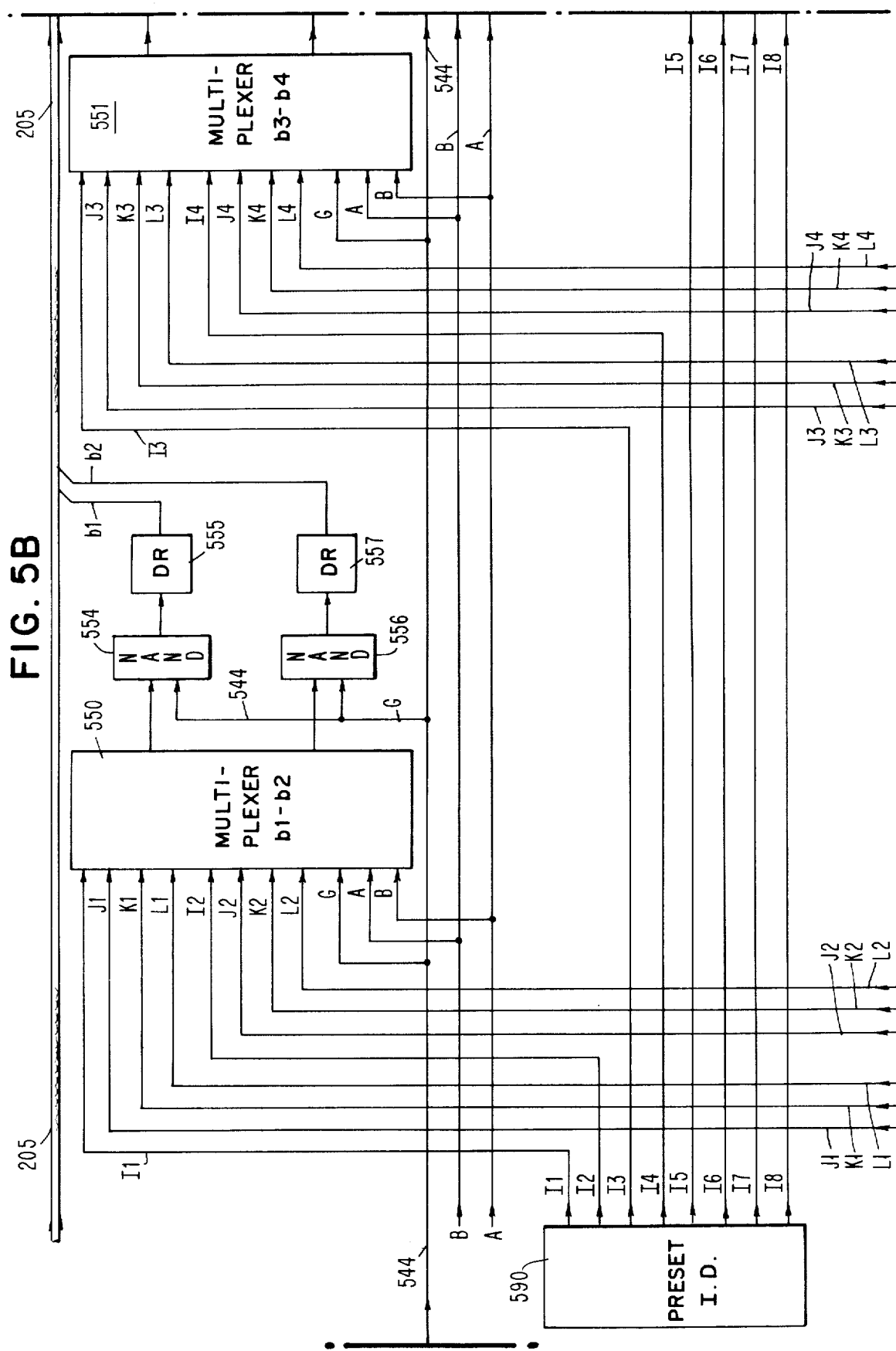

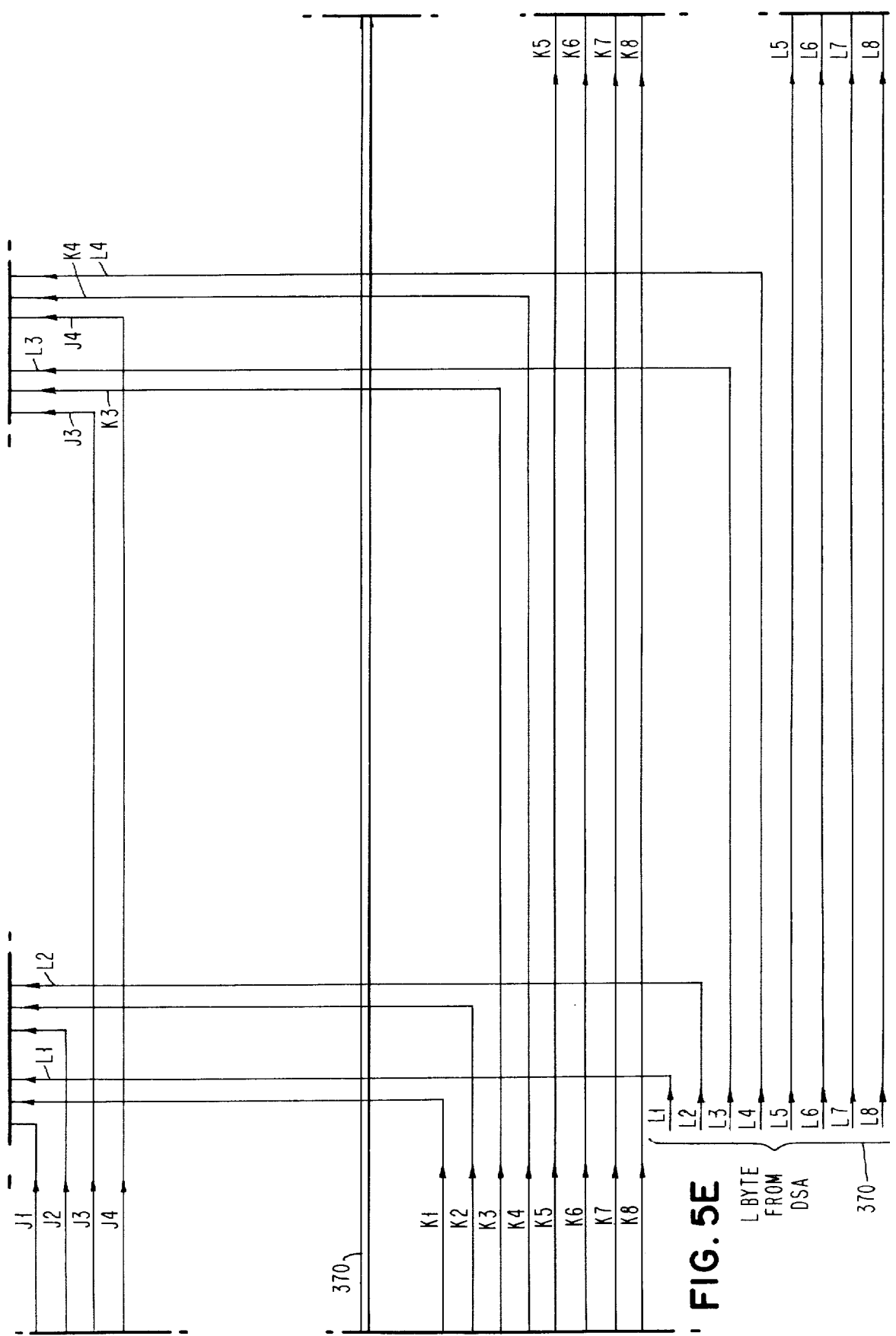

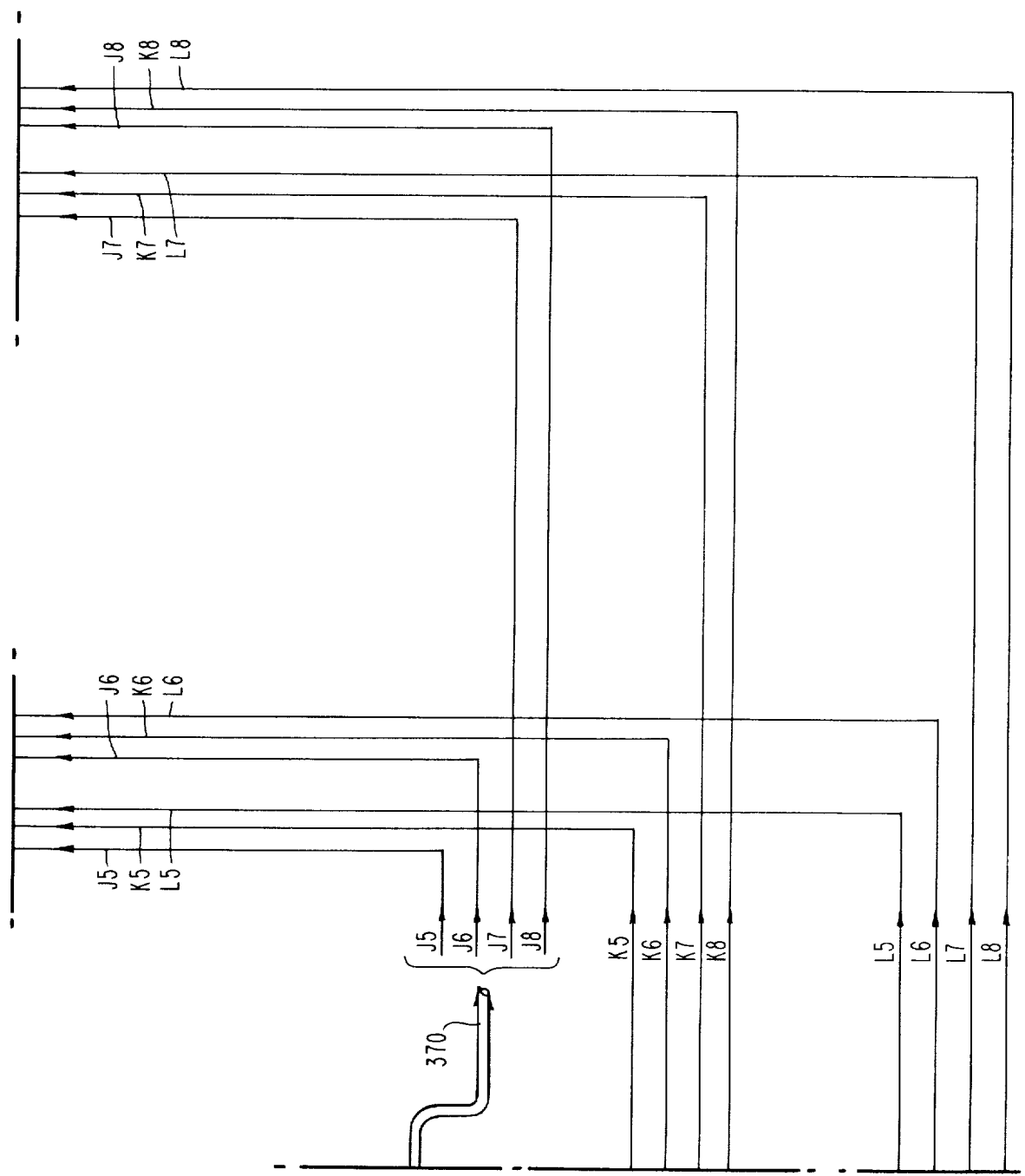

370
TO GDA OR IMA

| FIG. 6A |
| FIG. 6B |

LAD INBOUND TRANSMISSION

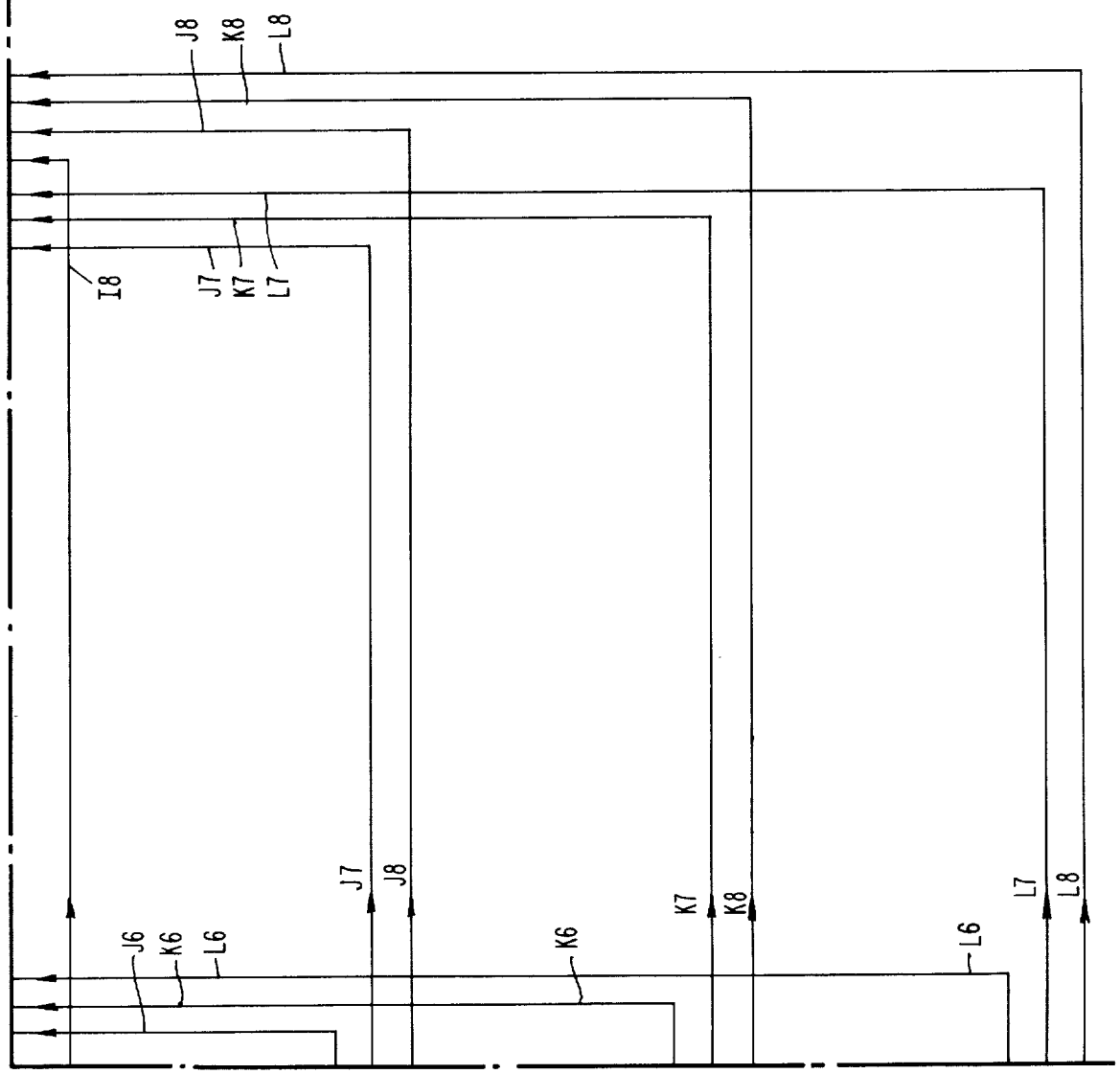

FRAME CHARACTER RECOGNITION

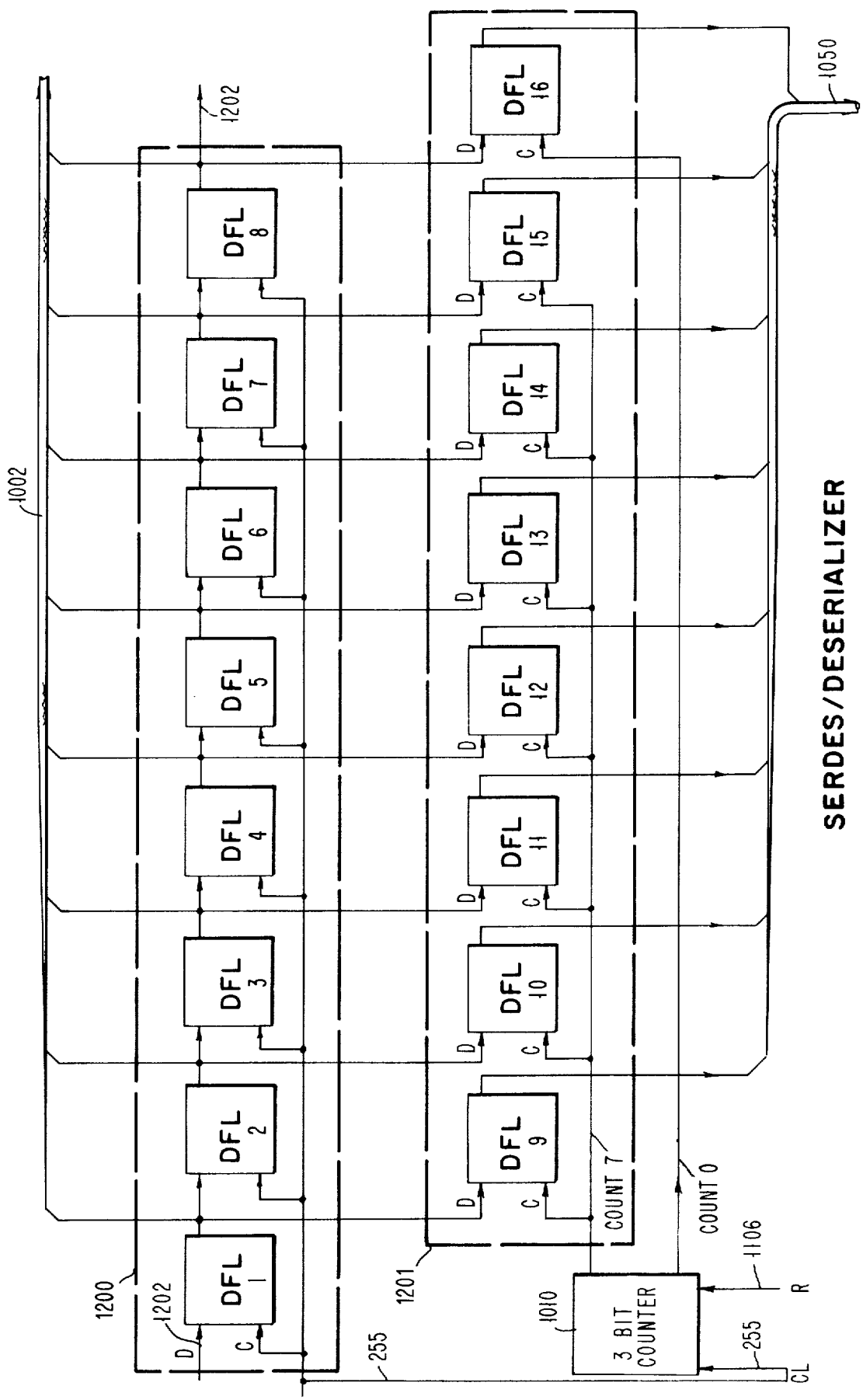
FIG. 12 SERDES/DESERIALIZER

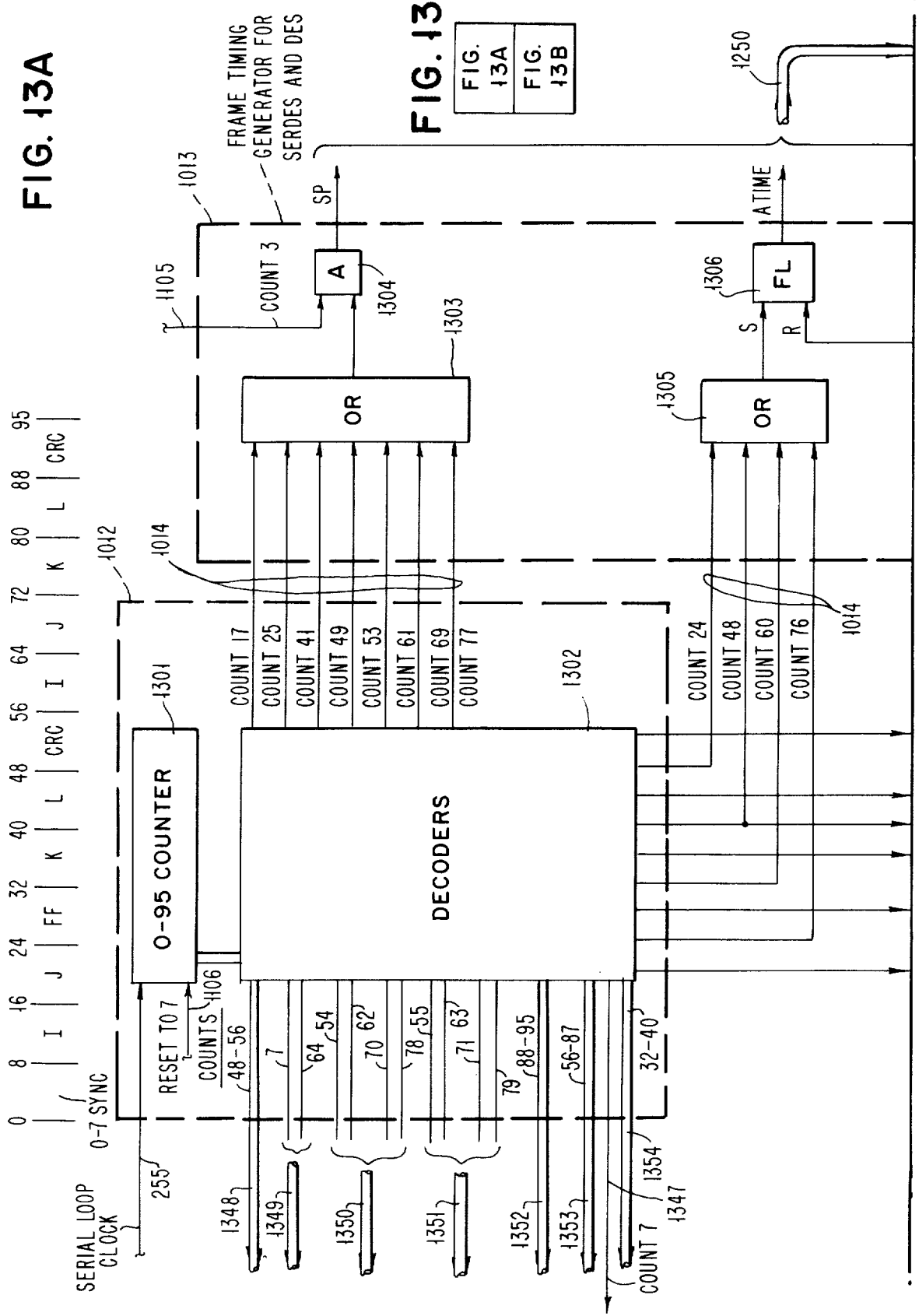

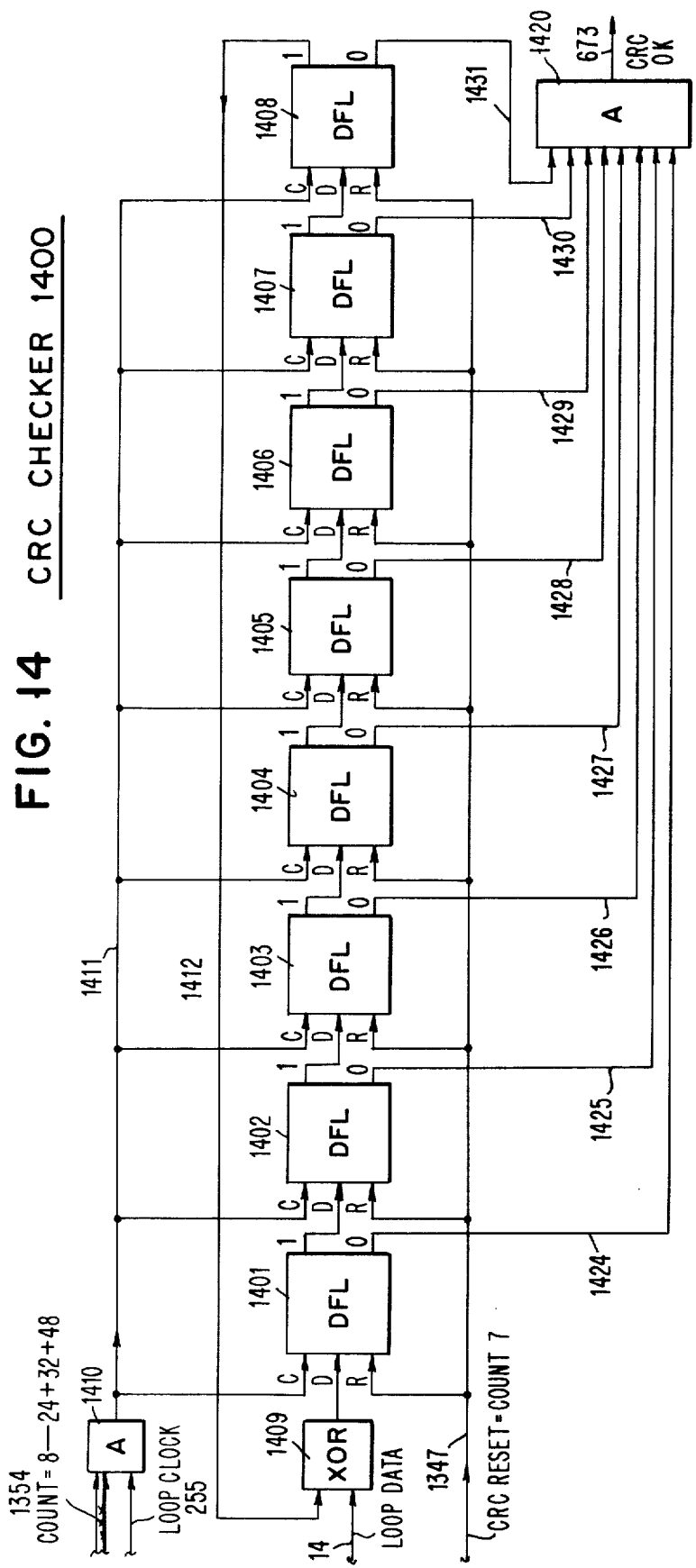

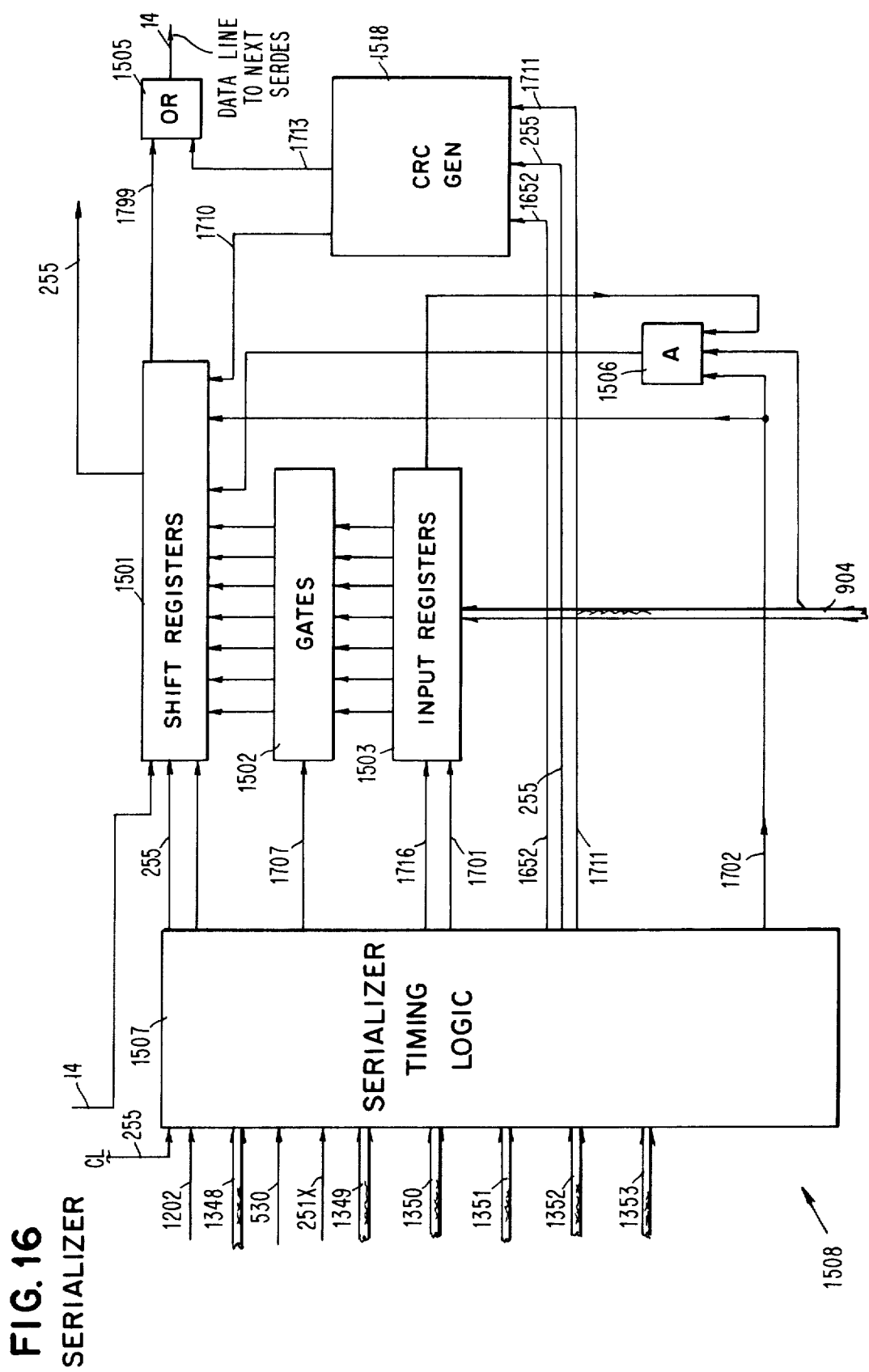

FIG. 17E  CRC GENERATOR

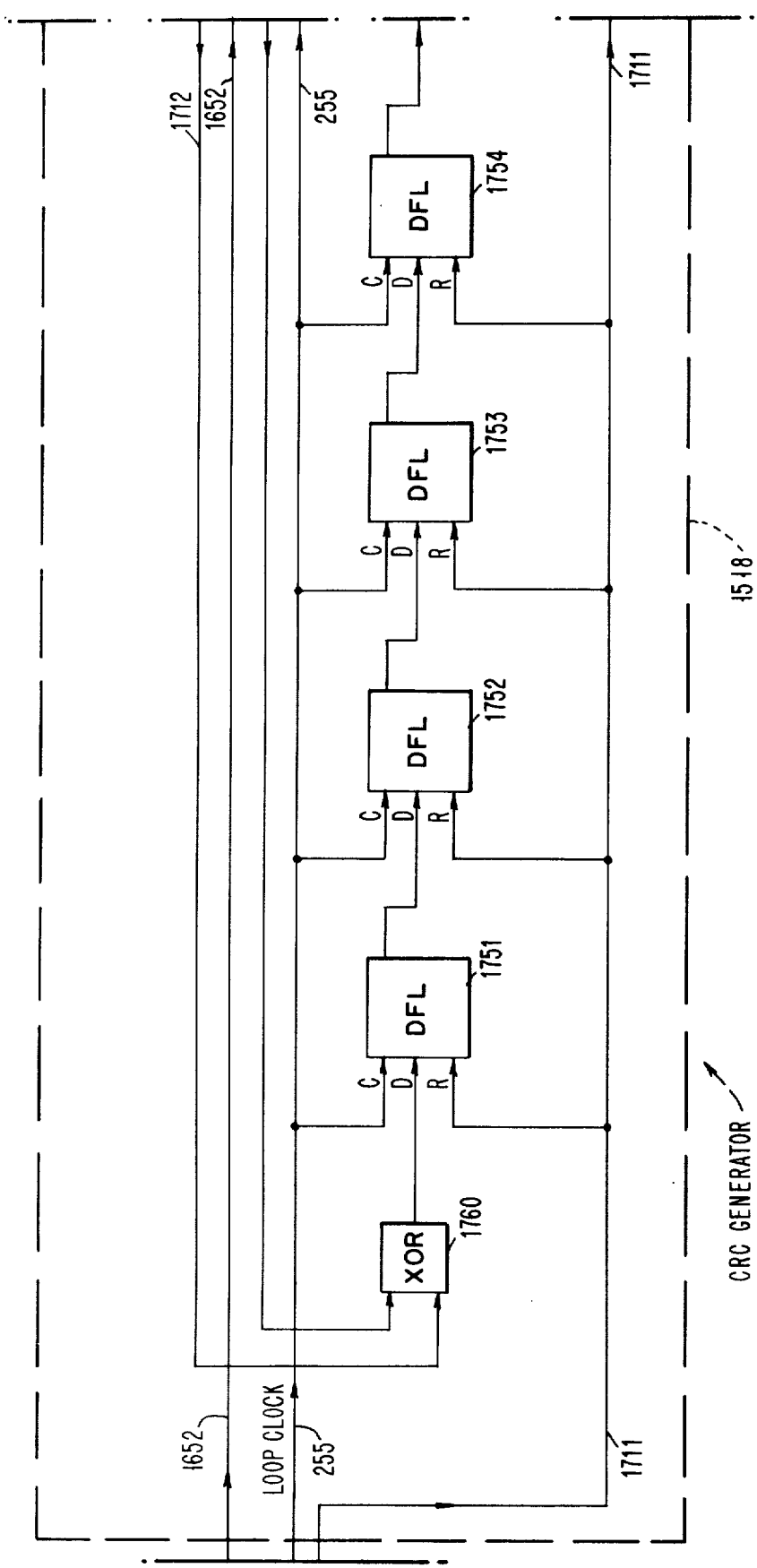
FIG. 17D SERIALIZER (1508)

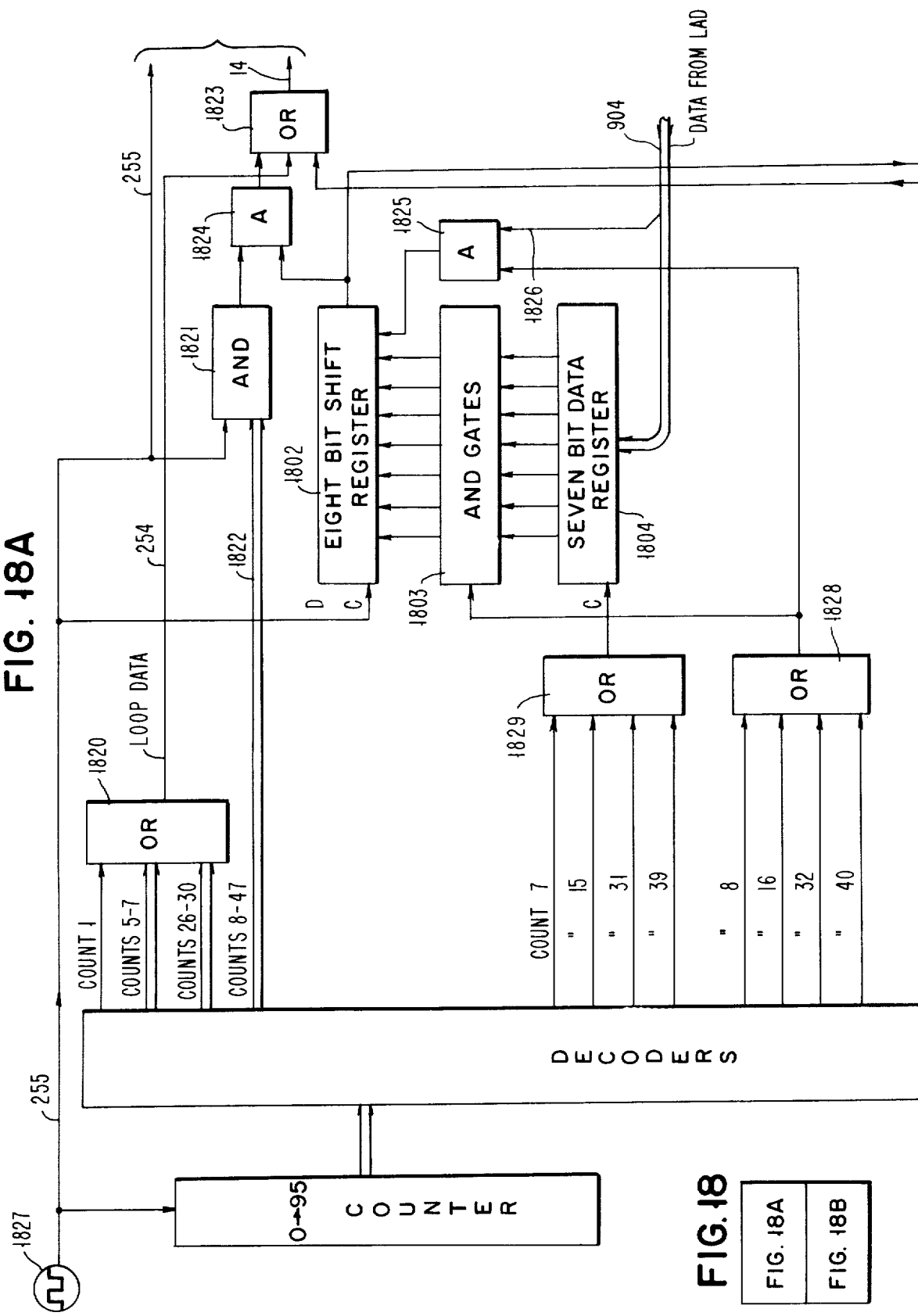

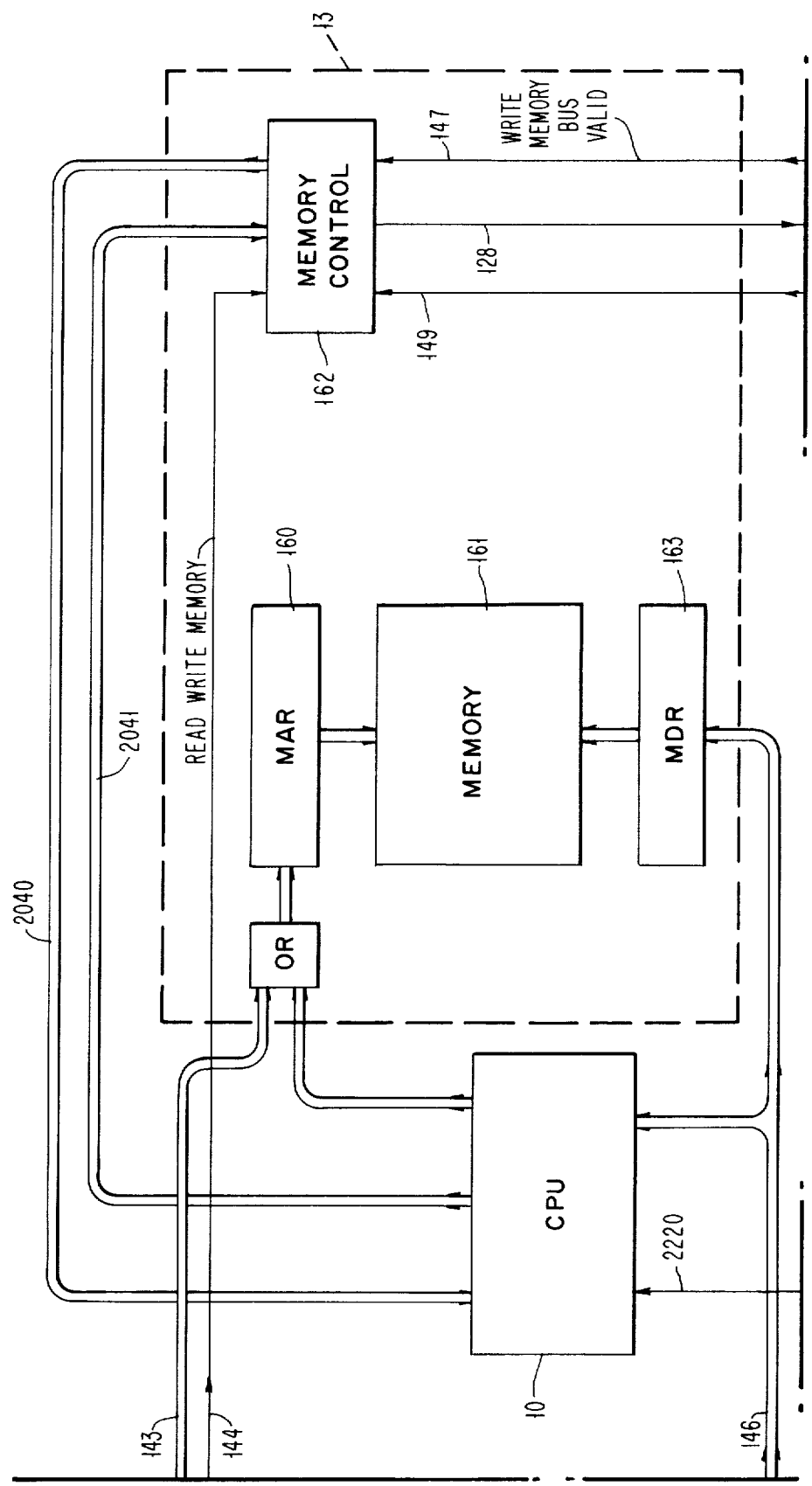
FIG. 20C  CPU, IMA, AND MEMORY

SAMPLE I BYTE PROCESS REGISTER 110

SAMPLE I BYTE STORAGE REGISTER 135

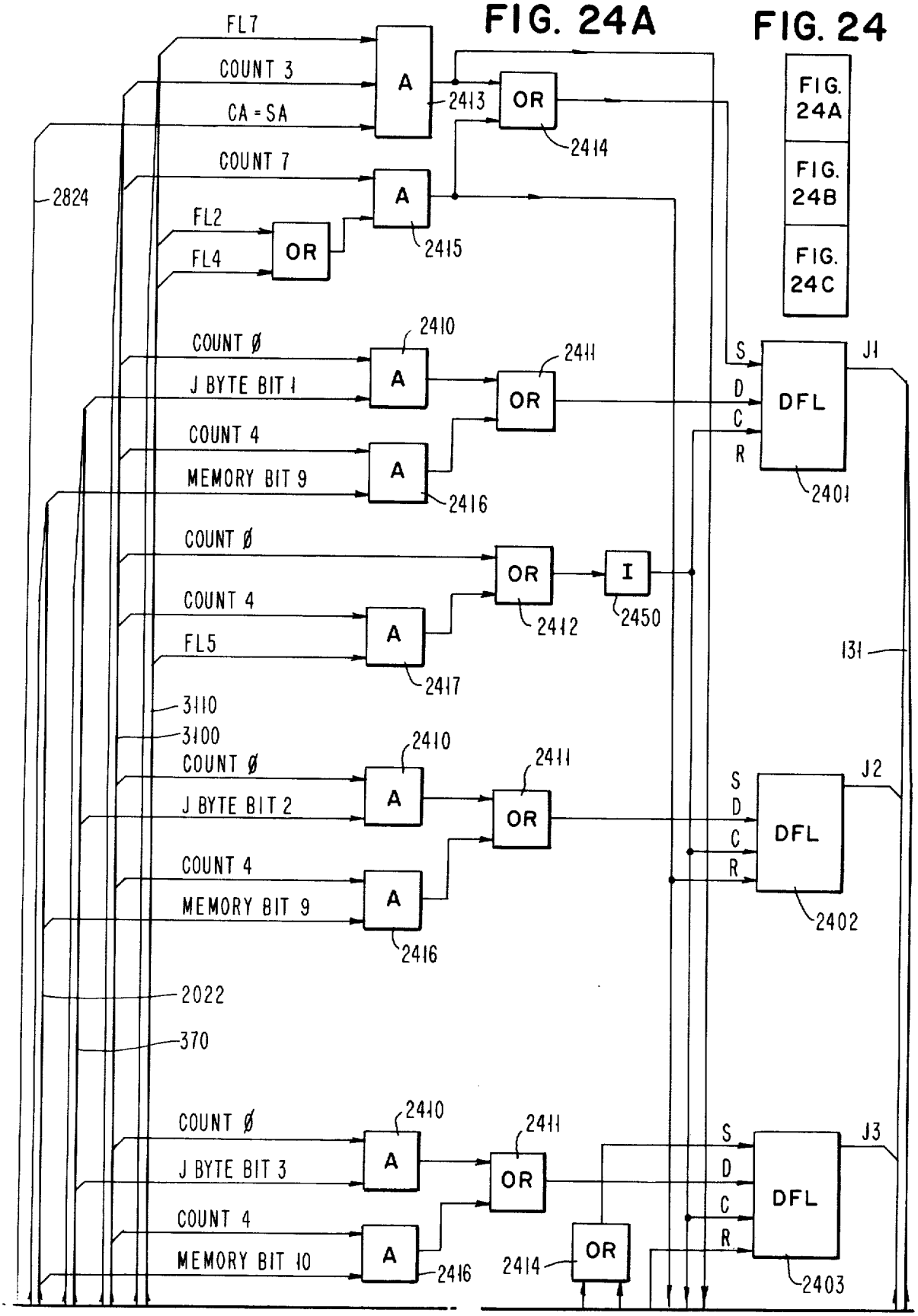

J BYTE PROCESS REGISTERS III

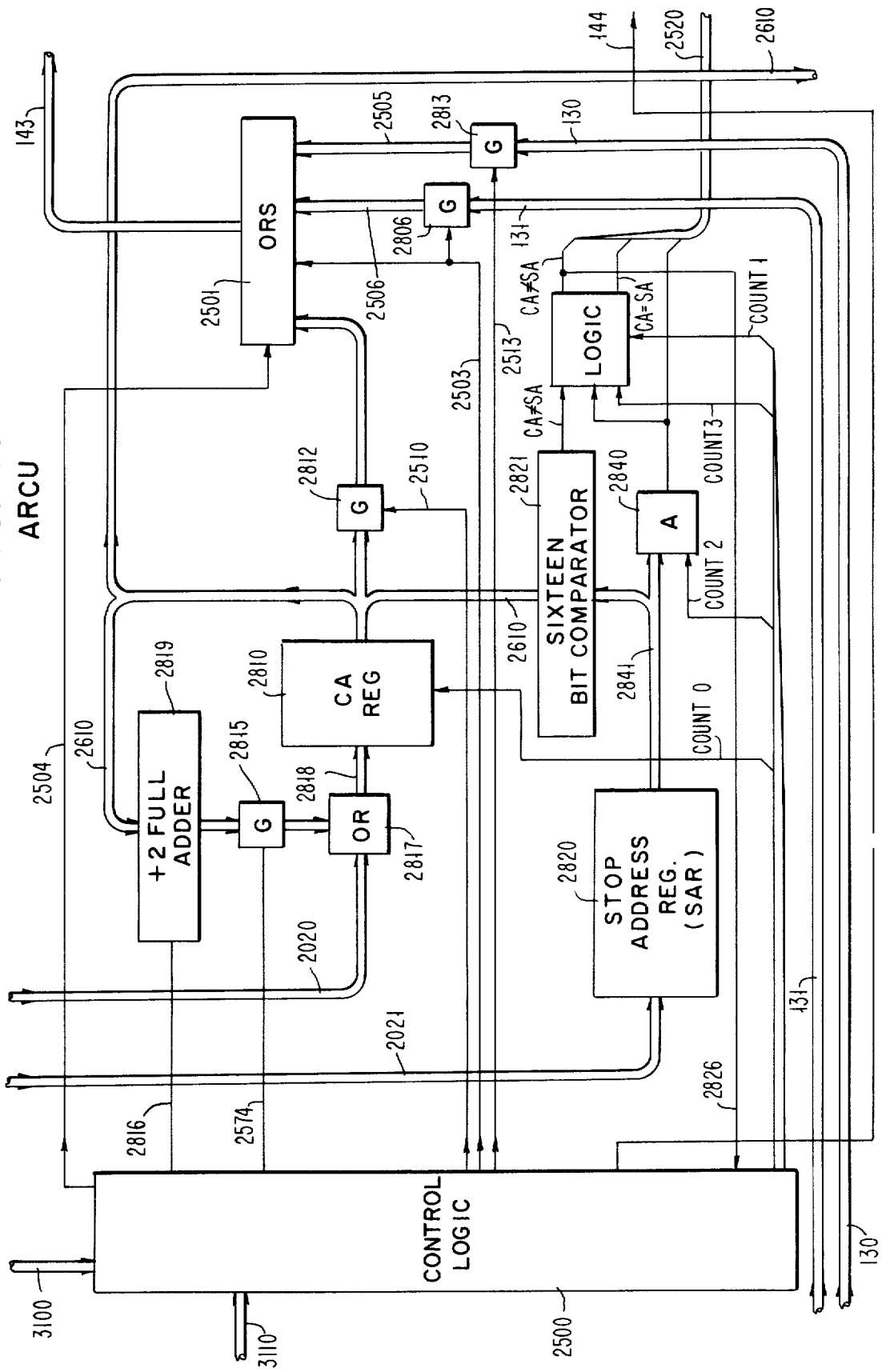

SAMPLE K BYTE REG.

SAMPLE L BYTE REGISTER

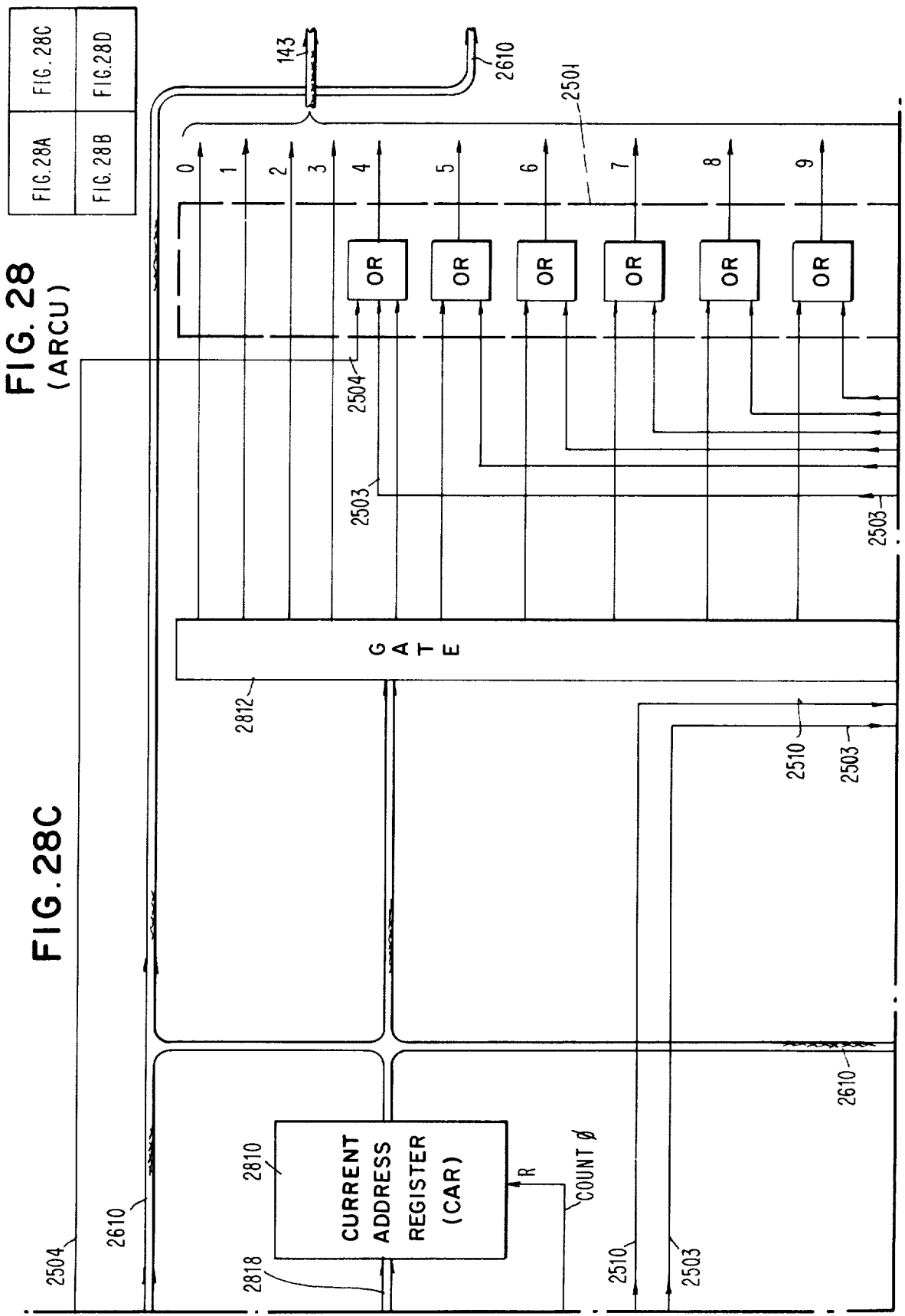

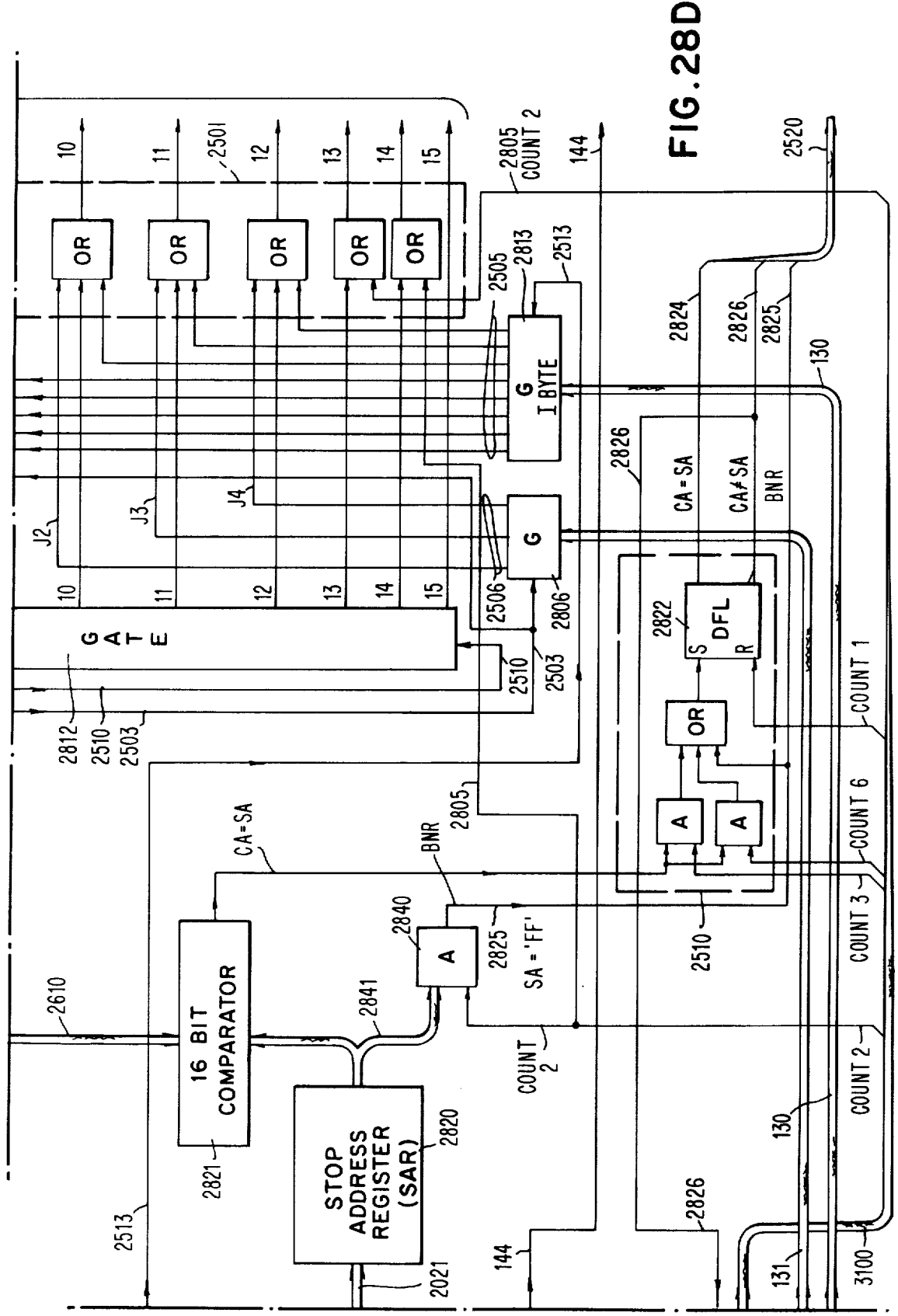

IMA TO MEMORY DATA CONTROL (IMDC)

MEMORY TO IMA DATA CONTROL (MIDC)

BITS 0-7

BITS 8-15

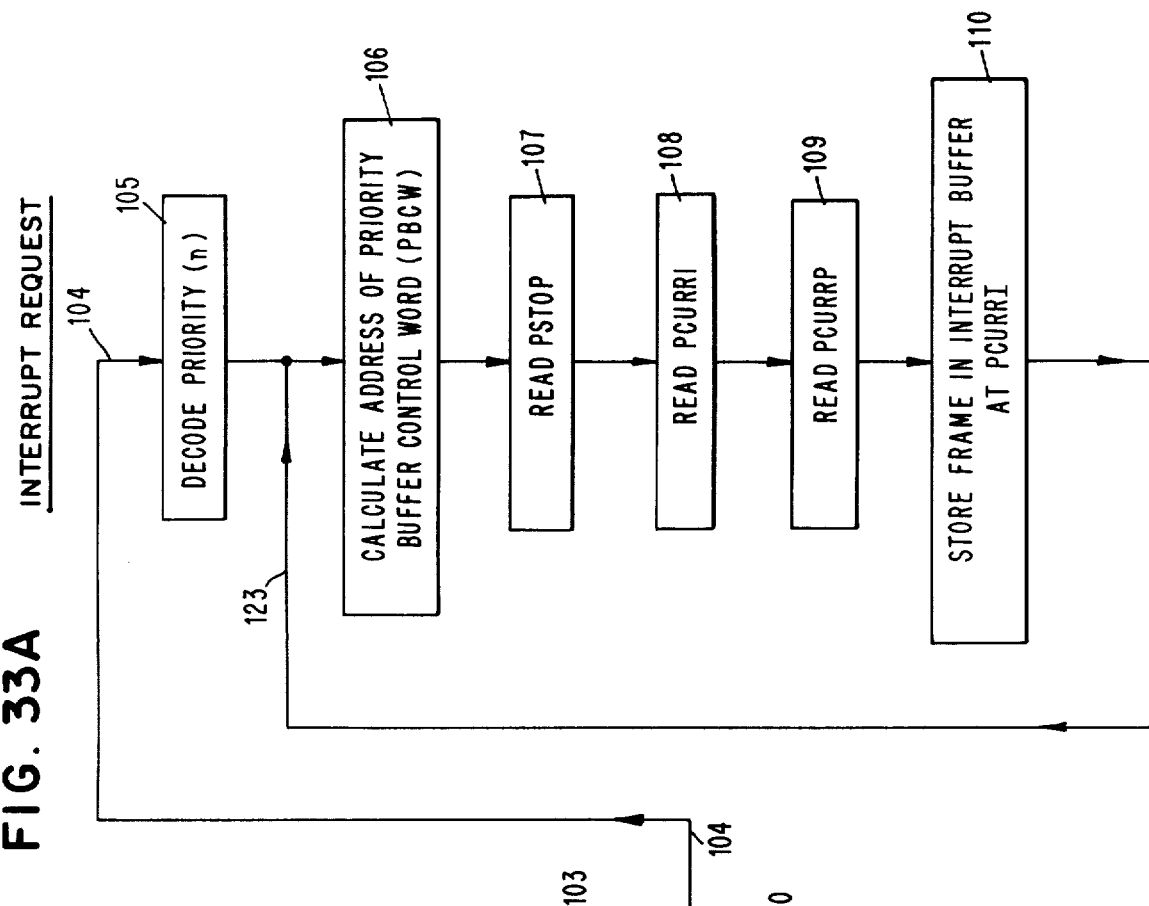
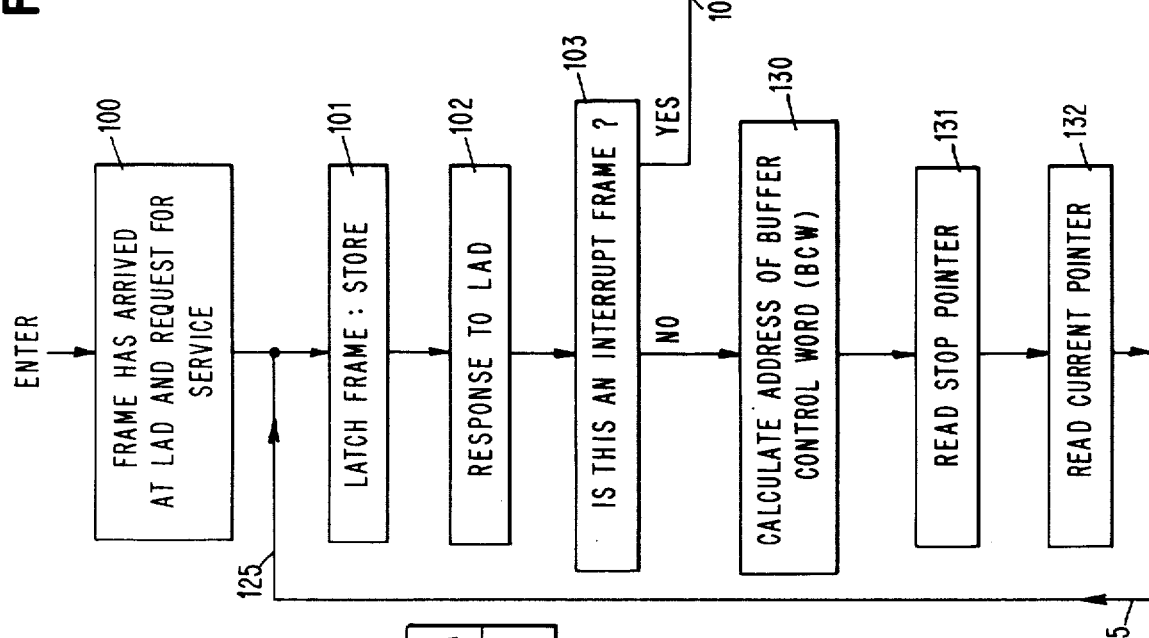
FIG. 33A
FIG. 33
| FIG. 33A |
| FIG. 33B |
| FIG. 33 C |

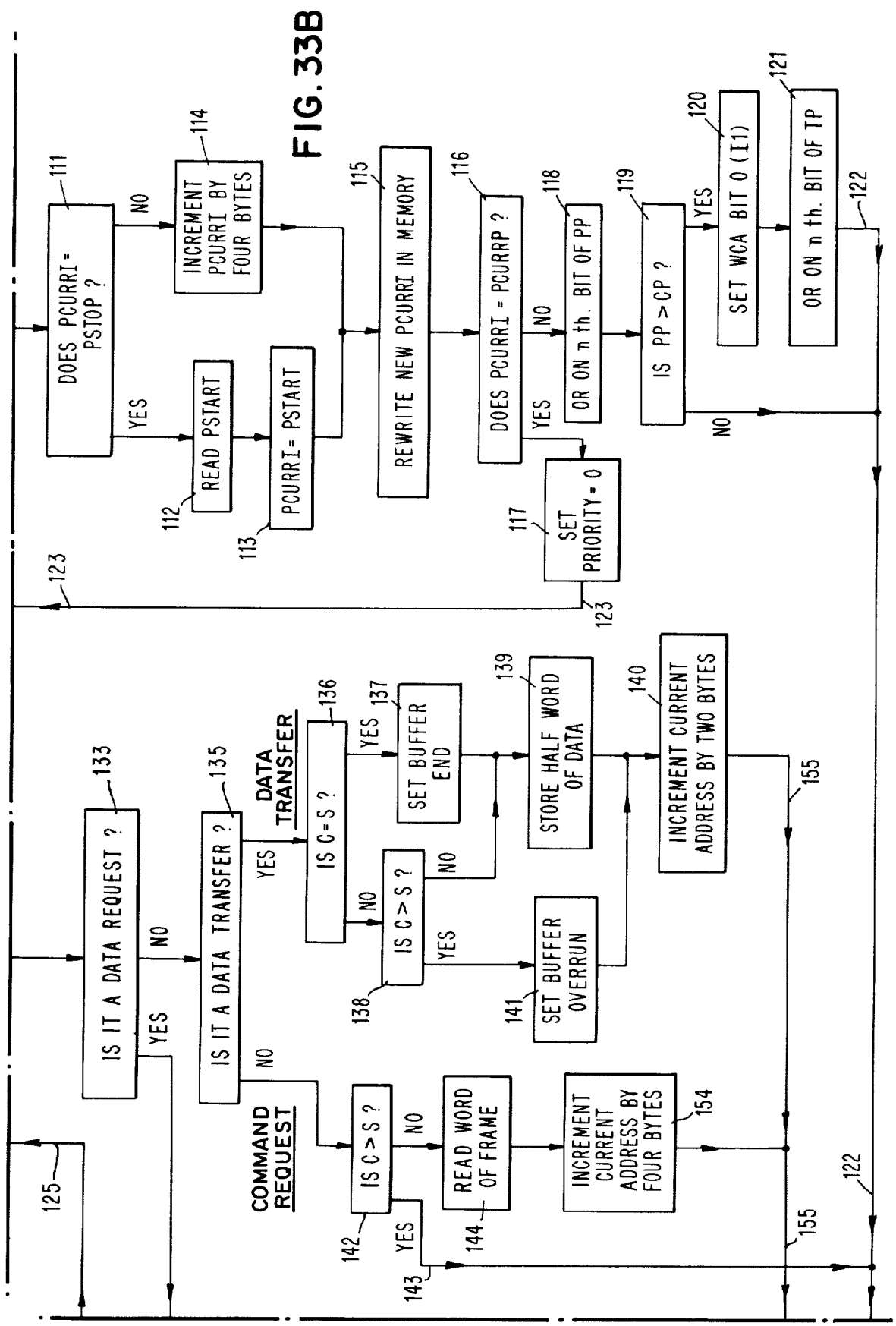

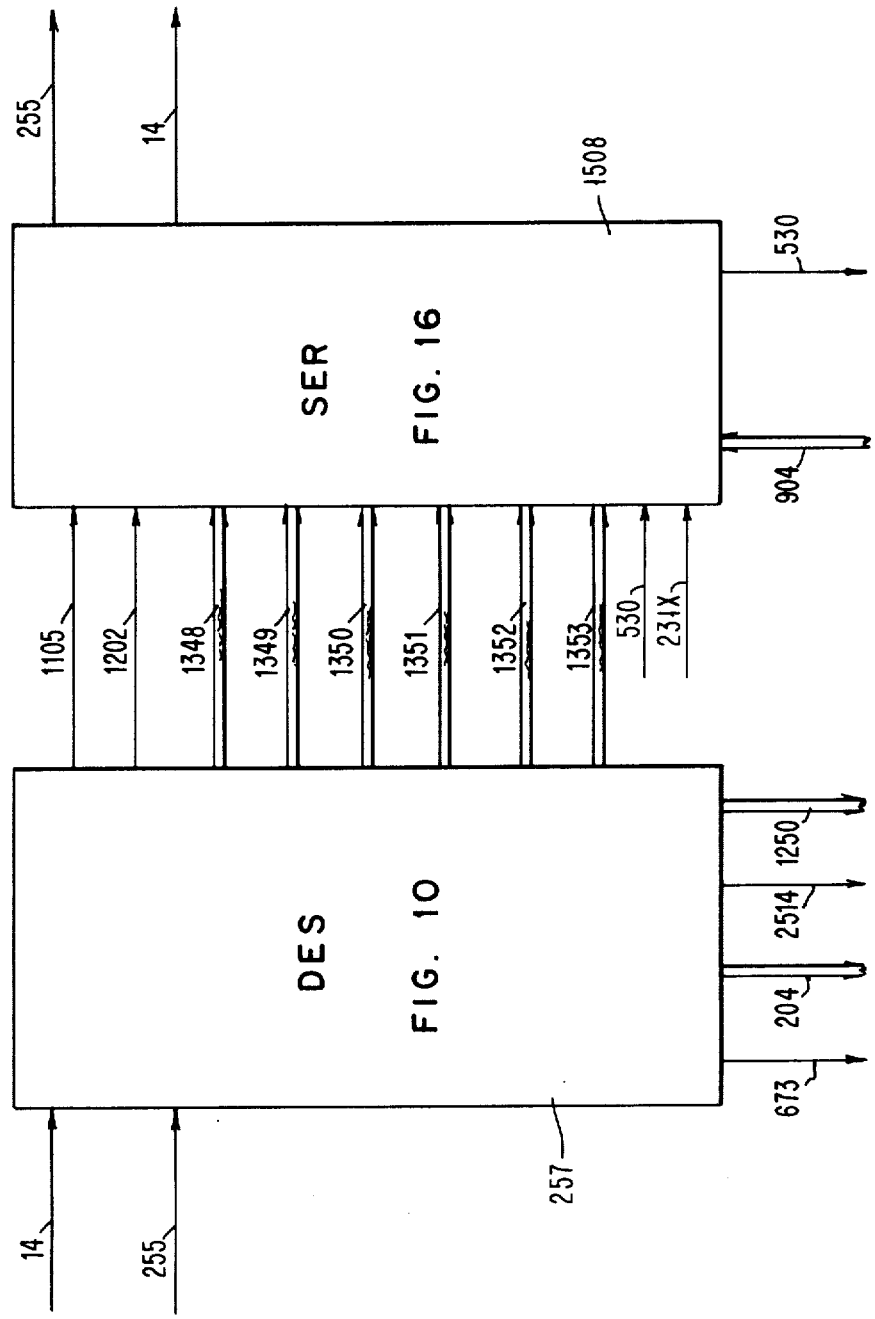

ASYNCHRONOUS, HIERARCHICAL LOOP COMMUNICATION SYSTEM WITH INDEPENDENT LOCAL STATION CONTROL OF ACCESS TO INBOUND TIME PORTIONS WITHOUT CENTRAL CONTROL

BACKGROUND OF THE INVENTION

1. Field of the Invention

This invention relates to digital data communication systems and their method of operation with hierarchical closed cable loops which emanate from and return to a central controller adopted for connection to a central processing unit. More particularly, the invention relates to a hierarchical loop communication system in which the assignment of frames to individual devices is based upon availability of frames and instantaneous demand. Further, this invention relates to such systems in which the hierarchical loops are asynchronous.

2. Description of the Prior Art

U.S. Pat. No. 3,732,543 of Rocher et al. shows a hierarchical loop system in which a definite time slot is allocated to each station, on a rotating basis as a function of demand.

U.S. Pat. No. 3,731,002 of Pierce shows another hierarchical system.

An object of this invention is to provide simultaneous inbound and outbound communication within a loop system without inbound outbound contention for service.

Another object of this invention is to provide a loop to computer interface affording sharing, of access to the memory of the computer.

Another object of the invention is to permit access by devices on the loop to inbound frames upon an unassigned demand basis.

BRIEF DESCRIPTION OF THE DRAWINGS

FIG. 1 shows the relationship between FIGS. 1A and 1B. FIGS. 1A and 1B shows a schematic block diagram of a loop communication system in accordance with this invention.

FIGS. 4A-4D show a detailed electrical schematic block diagram of a General Device Adapter (GDA) Outbound (OB).

FIG. 5 shows the relationship among FIGS. 5A-5F.

FIGS. 5A-5F show a detailed electrical schematic block diagram of the GDA Inbound (IB).

FIG. 7 shows the relationship between FIGS. 7A-7F.

FIGS. 7A-7F show a detailed electrical schematic block diagram of the LAD OB transmission unit.

FIG. 12 shows the 3 bit counter and shift registers within the FCR of FIG. 11A.

FIG. 13 shows the relationship between FIGS. 13A and 13B.

FIGS. 13A and 13B show the counter and decoders unit, free frame detector and frame timing generator of the deserializer of FIG. 10.

FIG. 14 shows an electrical logic schematic for the cyclic redundancy check (CRC) checker of the deserializer of FIG. 10.

FIG. 15 shows a table which illustrates operation of the CRC checker of FIG. 14.

FIG. 16 shows a block diagram of a serializer which is a portion of a SERDES unit shown in FIG. 34.

FIGS. 17A-17E show the detailed electrical schematic in block diagram form for the serializer of FIG. 16.

FIG. 18 shows the relationship between FIGS. 18A and 18B.

FIGS. 18A and 18B show the independent serializer which drives the secondary loop which incorporates its own timing clock and decoders.

FIG. 20 shows the relationship among FIGS. 20A-20D.

FIGS. 20A-20D show the electrical schematic in block diagram form of the Indirect Memory Access Channel (IMA), CPU and memory of the data processing system.

FIG. 24 shows the relationship among FIGS. 24A-24C.

FIGS. 24A-C show details of the process registers for the J Byte shown in FIG. 21.

FIG. 25 is an overall electrical schematic in block diagram form of the Address Register Control Unit (ARCU) included in the IMA as shown in FIG. 20A and as shown in detail in FIGS. 28A-D.

FIG. 28 shows the relationship among FIGS. 28A-D.

FIGS. 28A-D show the details of the electrical schematic of FIG. 25 of the ARCU.

FIGS. 33A–C show the algorithm of the IMA hardware.

FIG. 34 shows the block diagram of the SERDES units formed from the deserializer of FIG. 10 and the serializer of FIG. 16.

DETAILED DESCRIPTION OF THE PREFERRED EMBODIMENT

Figures 1, 1A:
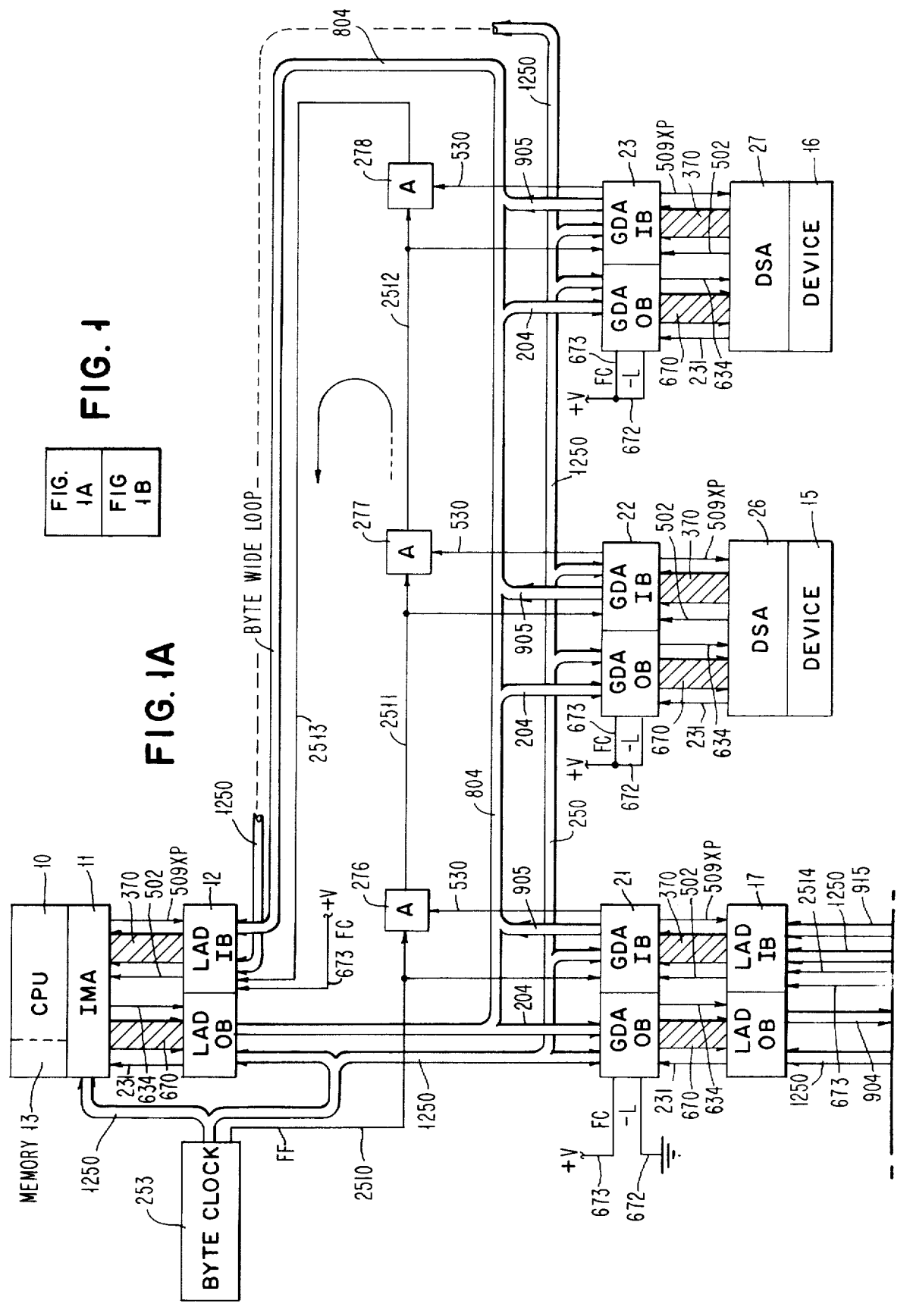
Figure 1B:
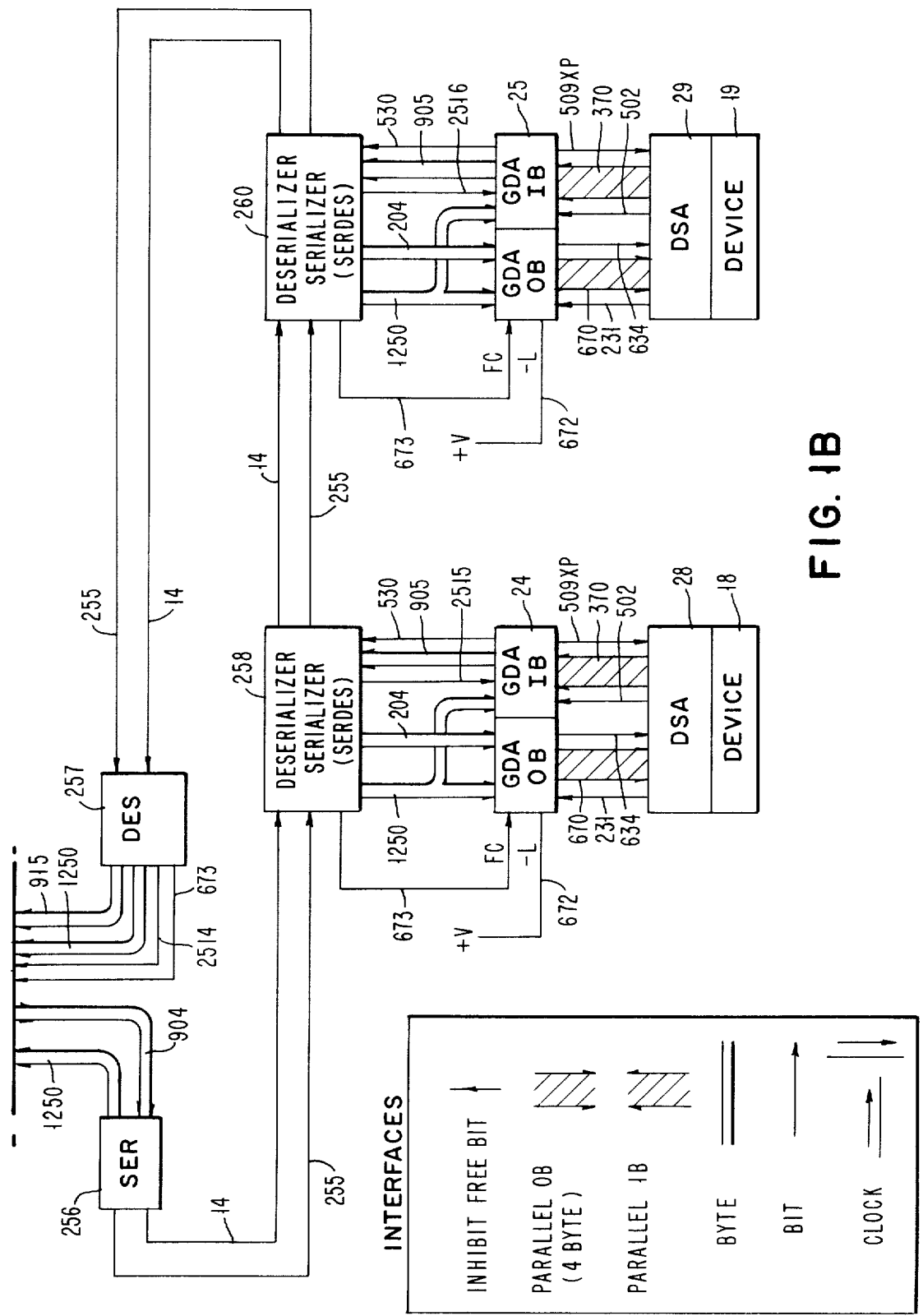

A system in accordance with this invention is shown in FIGS. 1A and 1B which connects a Computer Processor Unit (CPU) 10 via an Indirect Memory Access channel (IMA) 11 to a multiplicity of devices. This system is based on a loop configuration with the IMA 11 connected to a loop adaptor (LAD) 12 which drives the primary loop 804. A lower speed (serial) loop comprised of clock line 255 and data line 14 (referred to also as the secondary loop) is driven from the primary loop 804.

On each loop, each frame consists of two parts, an inbound half and an outbound half, each half capable of carrying 2 bytes of information. In addition, each half-frame carries an address byte, a control byte, and on the lower speed loop, a check byte. The primary loop frame is thus 64 bits long, and the lower speed loop frame is approximately 96 bits long. (This includes a sync and free frame byte to be described below.)

The primary loop 804 operates at a frame rate of approximately one frame every 3–5 microseconds. At this rate, the primary loop 804 has a bit rate of 12.8–21.3 megabits per second. Since each frame averages 32 bits of data, the effective data rate of the primary loop 804 approaches 10.65 megabits/second.

On the secondary loop 14,255, the frame rate is one frame every 80 microseconds, which corresponds to a bit rate of 1.25 kilobits per second and a data rate of 417 bits/ second. Slower or faster loops can be included.

A schematic block diagram of the system configuration is shown in FIGS. 1A and 1B. Primary loop 804 provides part of the communication between CPU 10 and two devices 15, 16 and secondary loop 14,255. The secondary loop 14,255 also has two devices 18, 19 connected to it. The components used in FIGS. 1A and 1B may be assembled in a large variety of configurations.

The indirect memory access channel 11 (IMA) provides a computer-to-loop interface along with the loop adaptor 12 (LAD). All LADS are similar.

LOOP DISCIPLINE

Exclusive of checking and line control, the loops carry eight byte frames. Each of these frames is divided into two halves, an inbound half and an outbound half. The inbound half of a frame carries data only from the devices 15, 16, 18, 19 inbound towards the CPU 10 whereas the outbound half carries data only from the CPU 10 to the devices 15, 16, 18, 19.

Each loop has a clock generator 252 or SER 256 which creates frame timing signals at a rate appropriate to the loop. The primary loop clock 253 must have a greater frame rate than the clock in SER 256 shown in FIGS. 18A–B.

When there is an outbound message to a LAD outbound section (OB) of a LAD 17 from the IMA 11 via the general device adaptor (GDA) 21 to which the LAD 17 is attached, the LAD OB 17 transmits this message in the next outbound half-frame on the secondary loop 14,255.

Figure 2:
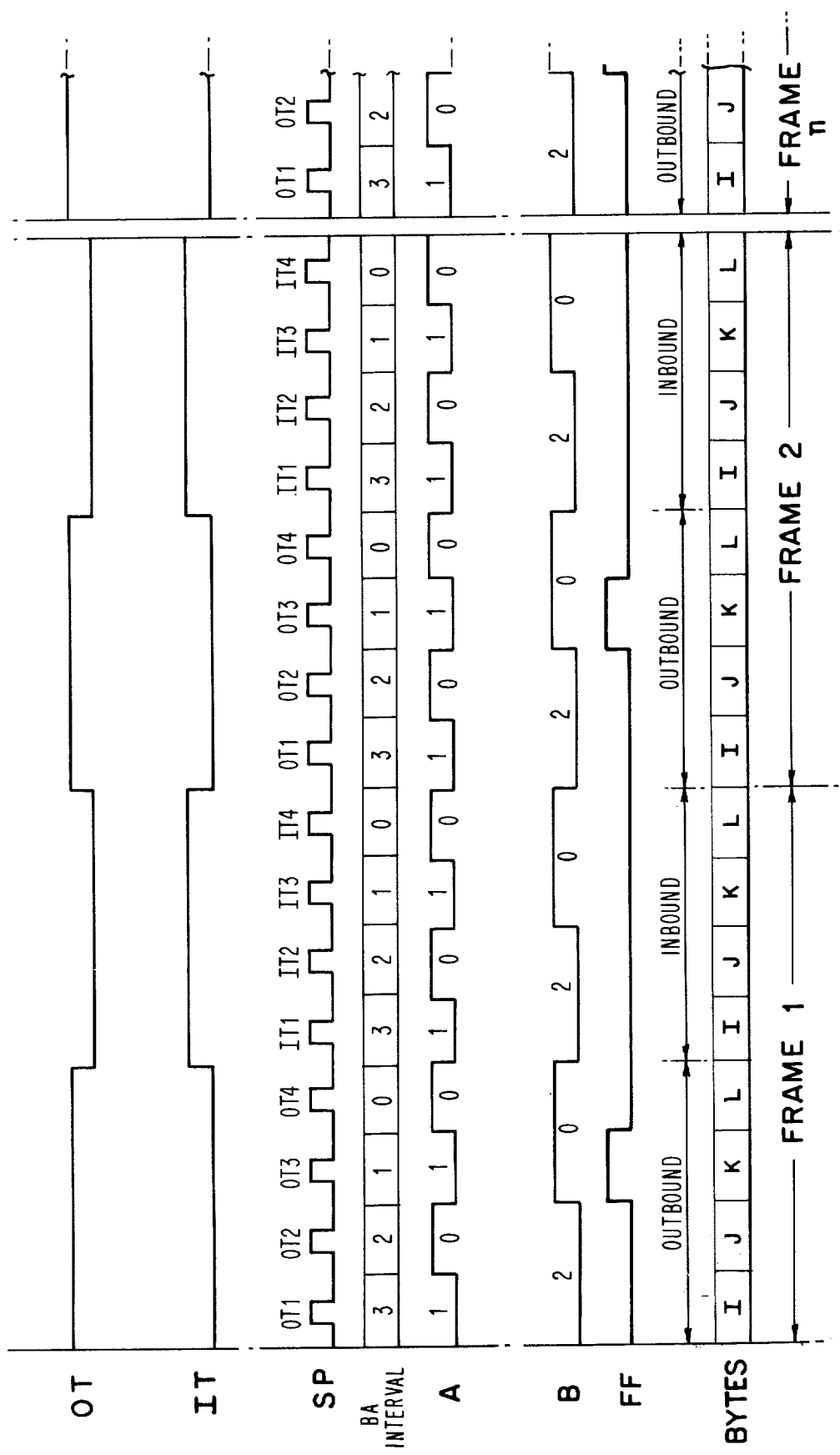
FIG. 2 is a timing diagram for the clock of the primary, byte wide high speed loop in FIG. 1A.
Figure 19:
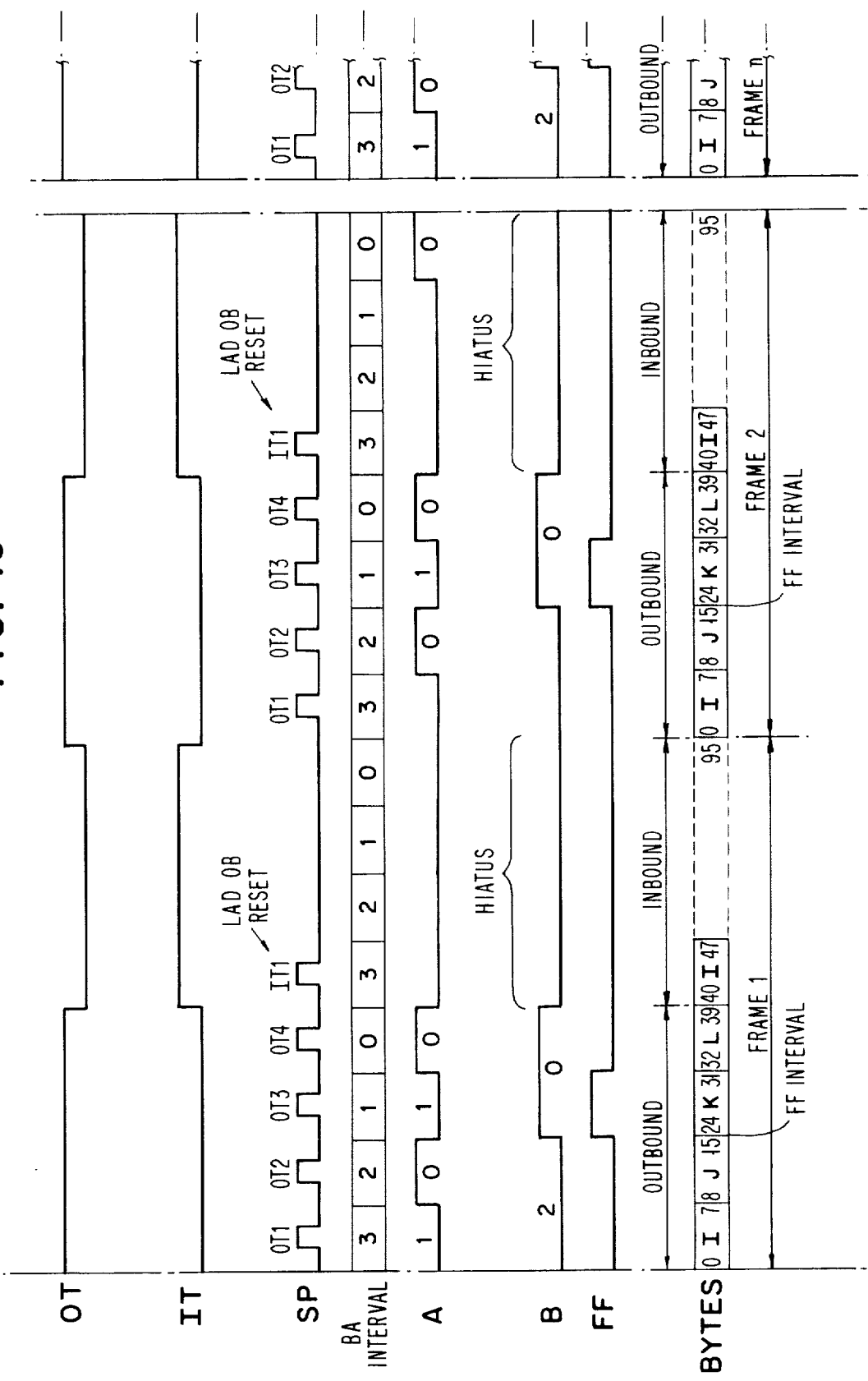
FIG. 19 shows the clock timing diagram for the secondary loop, generated by the serializer of FIGS. 18A and 18B.

For a device 15, 16, 18, 19 to send data to the IMA 11, it must transmit its data on an empty inbound half-frame. To enable a device to determine whether it may use an inbound frame, each of the loops has some wires, all of which include 2510, 2511, 2512, 2513, 2514, and 2515, 2516, (251X where X = 0–6) dedicated to the transmission of the free bit. The free bit FF initiated at K time in each outbound frame by the clock 252, as shown in FIG. 2, or SER 256 as shown in FIG. 19, when presented to a GDA inbound, indicates that the next inbound frame is free and may be used by the associated device to transmit its data to the IMA 11 or GDA (loop 14,255). The GDA 21 will supply the data to an inbound frame to the CPU 10 on primary loop 804 via LAD 12 IB, cable 370 and the IMA 11 when it receives a free frame signal for loop 804 via line 2510.

A device via its GDA 21-25 can seize a free frame, and when it does, it must also suppress the free bit (or bits) so it will not pass to the next GDA on the loop, because the frame cannot be used by more than one GDA and its associated devices at a time. For this reason, each of a set of line drops in the primary loop 804 which are ANDS 276, 277, 278 or for the serial loop 14,255 SERDES 258 or 260, has the capability of inhibiting the free bit signal on the basis of a request signal sent to it fromm its associated GDA. Thus, each line drop gates the free line 2510-2512. There is an equivalent SERDES function described below. For the other lines, the GDA merely OR's its data onto the line during the inbound part of the frame. This causes no difficultly, since a free frame contains only zeroes.

IMA INTERFACE OPERATIONS

In response to an inbound frame, the IMA 11 secures the information to be placed in an outbound frame, from the memory 13 of CPU 10, as appropriate. Neither the IMA 11, nor CPU 10 ever originates a frame spontaneously. Rather, each free inbound frame half reaching LAD 12, 17 is converted to a command request. Program originated frames are buffered in memory until such a request arrives.

There are seven types of inbound frames, each of which requires a specific action on the part of the IMA 11. These frames are:

Data Request: Update the memory 13 buffer control word and send the next 2 bytes of data from memory 13 to the requesting device.

Data Request Without BCW Update: Don't update the buffer control word; send the same 2 bytes of data from the memory 13 to the requesting device as were sent in the last device request.

Data Transfer: Update the buffer control word and store 2 bytes of data of memory 13 from the transmitting device.

Data Transfer Without BCW Update: Don't update the buffer control word; store 2 bytes of data from transmitting device and store in the same memory 13 buffer location as previously.

Command Request: Send a command from the buffer associated with the requesting device of memory 13 if there is a command in the buffer.

Interrupt: Queue the interrupt request from the device in the appropriate queue of memory 13, and interrupt CPU 10.

Count Requests: Count the number of count requests and send a buffer end BE signal after a predetermined number of count requests via a buffer control word (BCW) in memory 13.

In the above functions, the device 15, 16, 18, 19 is identified by its address (ID), which is an integral part of the frame half. In practice, one device may have several ID's, but the interface operation is transparent to this possibility.

Data Transfers and Data Requests

Inbound frames always contain the ID of the device using the frame. A buffer in memory 13 is associated with each ID. The buffer is used to store the data portion (two bytes) of the inbound frame for a data transfer and is used to obtain the data portion of the outbound frame for a data request. In each of these two operations, the ID on the outbound frame is the ID received in the inbound frame. The control byte of an outbound frame may indicate the occurrence of a buffer end BE as a result of the requested operation. An acknowledgement is sent in response to every data transfer. Buffer end BE, buffer overflow BO, and buffer-not-ready BNR are signalled, when they occur, by appropriate control bits in the outbound frame. Note that an outbound frame transmitted in response to a data request may carry both the data requested and the buffer end BE indication.

Command Requests

Command request differ from data requests by requiring 4 bytes from the associated buffer in memory 13. These 4 bytes supply the entire frame: an ID byte, a control byte, and two data bytes. Thus, the response to a command request may go to a different device from the one making the request, (e.g., LAD 17 IB causes GDA 21 IB to make a command request resulting in an OB frame for device 18).

Command requests are used to ask for program-originated commands to the device. The program inserts its command in the appropriate buffer. A command request buffer will normally be associated with each loop adaptor (LAD) 12, 17. The primary loop adaptor (LAD) 12 is connected to the IMA 11 port. Other loop adaptors (LADS) can be connected to general device adaptors (GDA's) on the primary loop 804 or on any of the other loops, e.g., loop 14,255. The use of a command request from a loop adaptor (LAD) as a request for any program-originated frames to that loop ensures that frames are sent at a rate the loop can accept.

Interrupts

Just as command requests enable the CPU 10 (through the IMA 11) to communicate with the devices, interrupt requests permit the devices to communicate directly with the CPU 10 (through the IMA 11). Each interrupt request frame carries the ID, the priority of the request (in the control byte), and the device status (in the data bytes). The IMA 11 queues the interrupt in the appropriate queue and notifies the CPU 10 that an interrupt of a particulay priority has arrived.

If after sampling, the priority of the new request is higher than that of the current program, the CPU 10 interrupts the current program and transfers control to the interrupt service routine. At any interrupt level, the interrupt service routine is uniquely identified by the ID of the interrupt request.

Two memory 13 buffers are associated with each interrupt level. This allows chaining of interrupt buffers by the IMA 11 so that under normal operation, one buffer is always available if the other one is full. If both buffers are full or neither buffer is ready, the appropriate acknowledgement is addressed to the ID of the device originating the interrupt.

Chaining

No CPU 10 or IMA 11 function is required for buffer chaining. Buffer chaining will be a device 15, 16, 18, 19 function (except for interrupt buffer chaining). The device 15, 16, 18, 19 will change its ID in order to change buffers. This will usually occur, if at all, in response to the memory 13 buffer end BE signal.

General Device Adaptor (GDA) (21-25)

Figure 9:
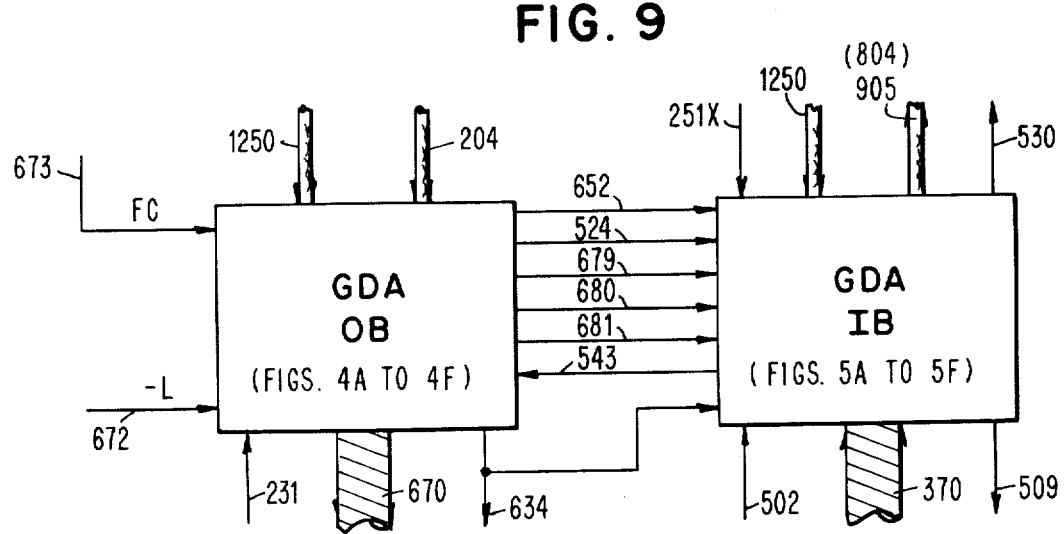
FIG. 9 shows a simple electrical block diagram of the cable connections to and between the GDA OB and the GDA IB.

The GDA 21-25 shown in FIG. 9 is divided into two parts, an outbound part (GDA OB) of FIGS. 4A-D and an inbound part (GDA IB) of FIGS. 5A-F. The function of the outbound OB part of the GDA is to read the outbound frame halves to recognize address data, to store the frame if the address is recognized as its own and to signal the device specific adaptor DSA 26-29 (defined below) or LAD 17 connected to its output that a valid frame has arrived via line 634 known as the Data Ready line. This last step will await the completion of checking if such is part of the loop implementation. Line FC 673 indicates whether frame checking is used or not by a GDA 21-25. Frames which do not check properly are ignored by the GDS 24, 25 on the secondary loop.

Figure 4B:
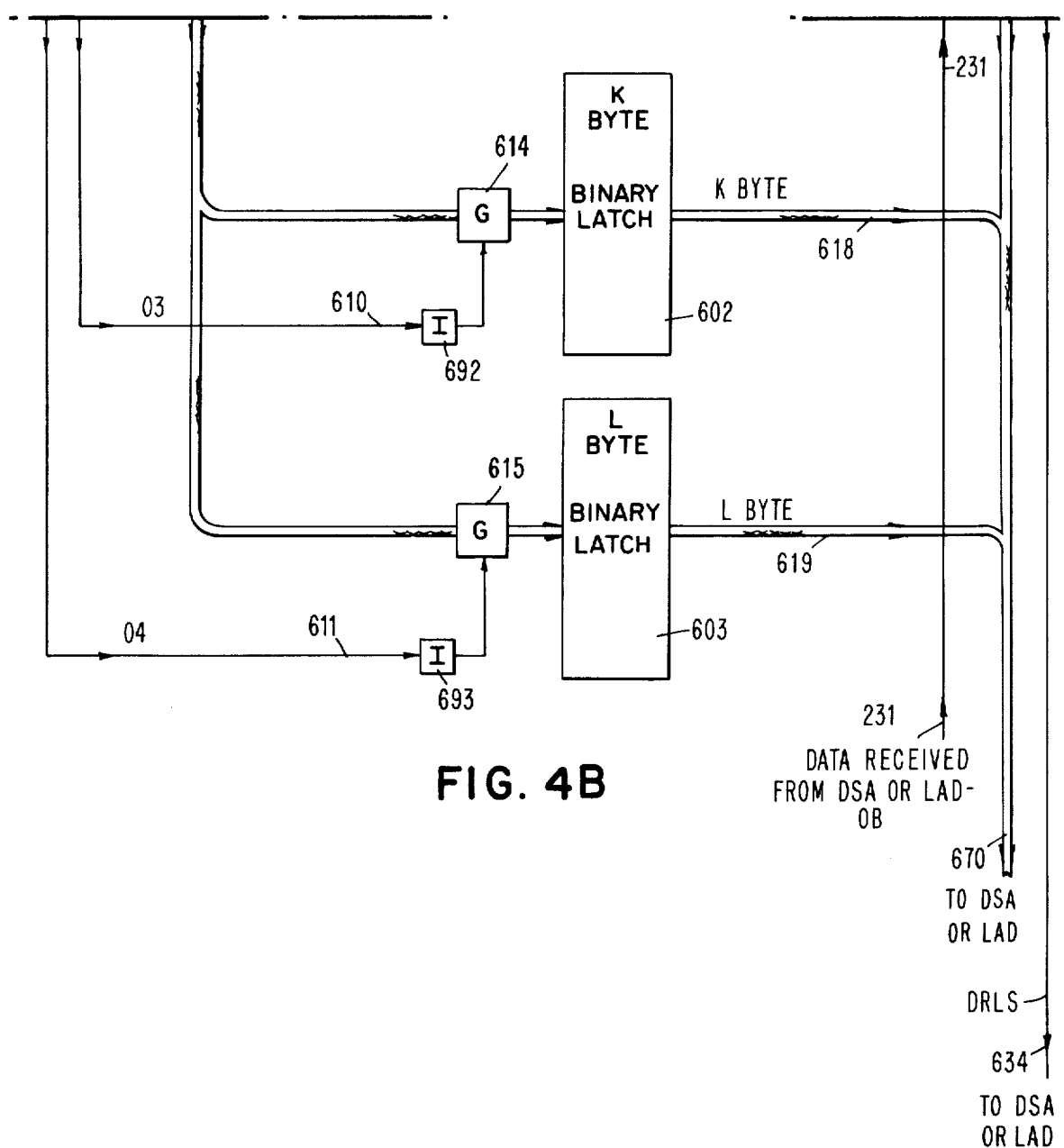
Figure 4:
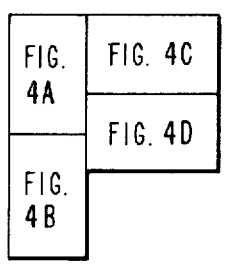
FIG. 4 is a showing of the relationship among FIGS. 4A-4D.
Figure 4A:
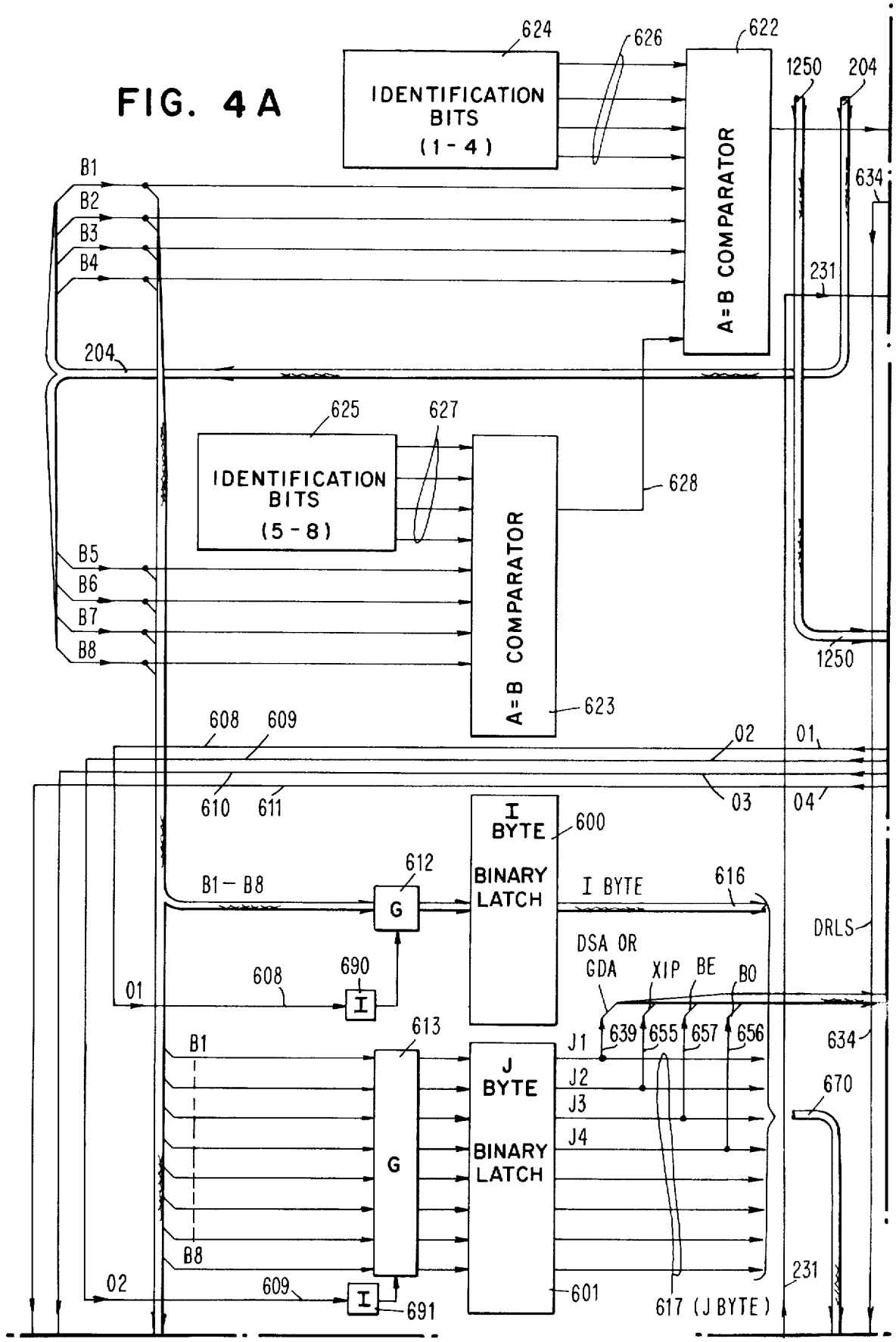

When the GDA 21-25 recognizes an ID (address) via comparators 622, 623, FIG. 4A, it stores the data in latches 600;14 603 for the outbound half frame record for the loop. The GDA 21-25 sets a data-ready latch DFL 635 FIG. 4C which alerts one of the DSAs 26-29 or LAD 17 on data-ready line 634 via FIGS. 4A and 4B that there is new valid data to be supplied from the loop through one of the GDAs 21-25 to the DSAs 26-29 or LAD 17. The DSA 26-29 or LAD 17 sends a data-received signal on line 231 to a GDA OB 21-25 to reset its data-ready latch 635.

Figure 4C:
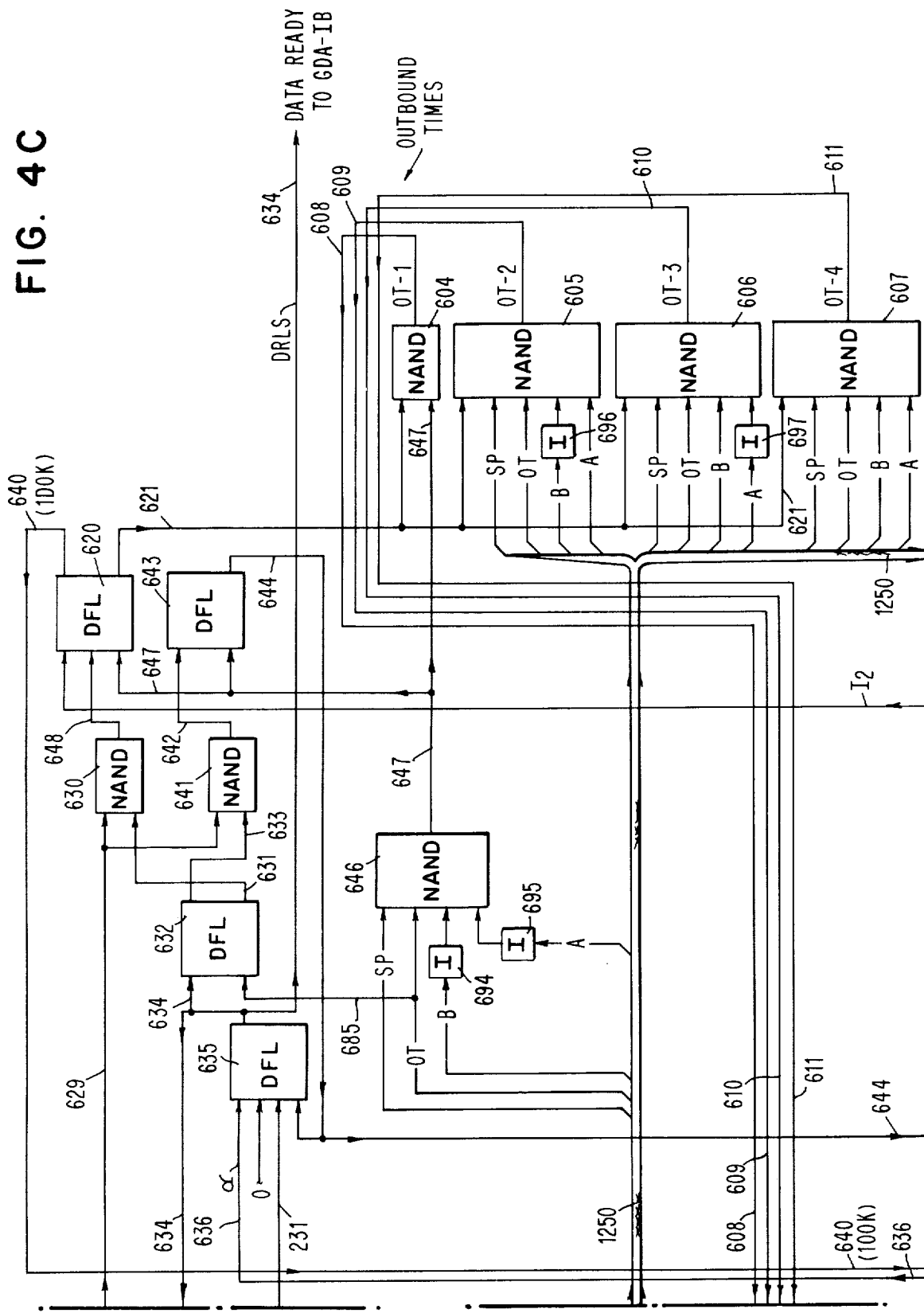

A valid, second message reaching the GDA OB 21-25 while the data-ready latch 635 in FIG. 4C is set cannot be handled in buffer storage and thus will be considered an outbound overrun condition. When this occurs, the data latches 600-603 in the GDA that contain the previous frame's data are not changed, but an outbound overrun latch 645 in FIG. 4D is set. That turns on OVR line 652 to the GDA IB in FIG. 9.

Inbound Overrun Condition

The inbound overrun condition comprises a condition in which a DSA 26-29 or LAD 17 wants to transmit a frame inbound and the GDA associated with the DSA or LAD accepts it and shortly later the same DSA or LAD desires to transmit another frame inbound but the GDA has been unable to transmit the first frame. This is known as an inbound overrun condition. The DSA or LAD must store and transmit an appropriate inbound overrun interrupt to CPU 10 when possible.

The logic in the upper left-hand corner of FIG. 5A describes a contention scheme between a request for transmission from the DSA 26-29 or LAD 17 in FIGS. 1A or 1B on line 502 and a signal indicating a transmission request (XR/GDA) on line 524 from FIG. 4D to FIG. 5A and on FIG. 9 reflecting a GDA OB condition which requires an inbound transmission, e.g., buffer end BE, buffer overrun BO, etc. Priority is given to DSA transmissions over GDA transmissions. When either the GDA or the DSA desires to transmit, an appropriate inhibit free bit signal FF is generated, and this is sent to line drop AND 276, 277, 278, respectively, as shown on the system configuration diagram of FIGS. 1A–B for the bytewide loop. The serial loop uses the deserializer-serializer SERDES 258, 260 for this function as described below. The AND 276, 277 or 278 inhibits the free bit from the next AND so that the next inbound frame is used by this GDA for transmission assuming that the frame is free. The GDA/DSA transmission requests are latched up in DFL's 508 and 526 in FIG. 5A. They are received by NAND 529. As soon as the transmission ends or the reason for transmission ends, at outbound J time in FIG. 2, the latches 508, 526 and 533 in FIG. 5A are reset. Consequently, this device inhibits the free bit F so long as the condition for which it desires to transmit persists. After that, it remains dormant until a new condition arises. A "free bit" is signal on line 2510–2516 (251X) indicating that the next inbound frame is, or will be, empty upon entering the device reading the free bit(s). This device can either inhibit the free bit(s) for the purpose of using the frame itself or the device can pass the free bit(s) on to the next GDA. A free frame which travels all the way i.e., is not used by any GDA (21–25), will result in a command request XR from buffer in memory 13.

Figure 7A:
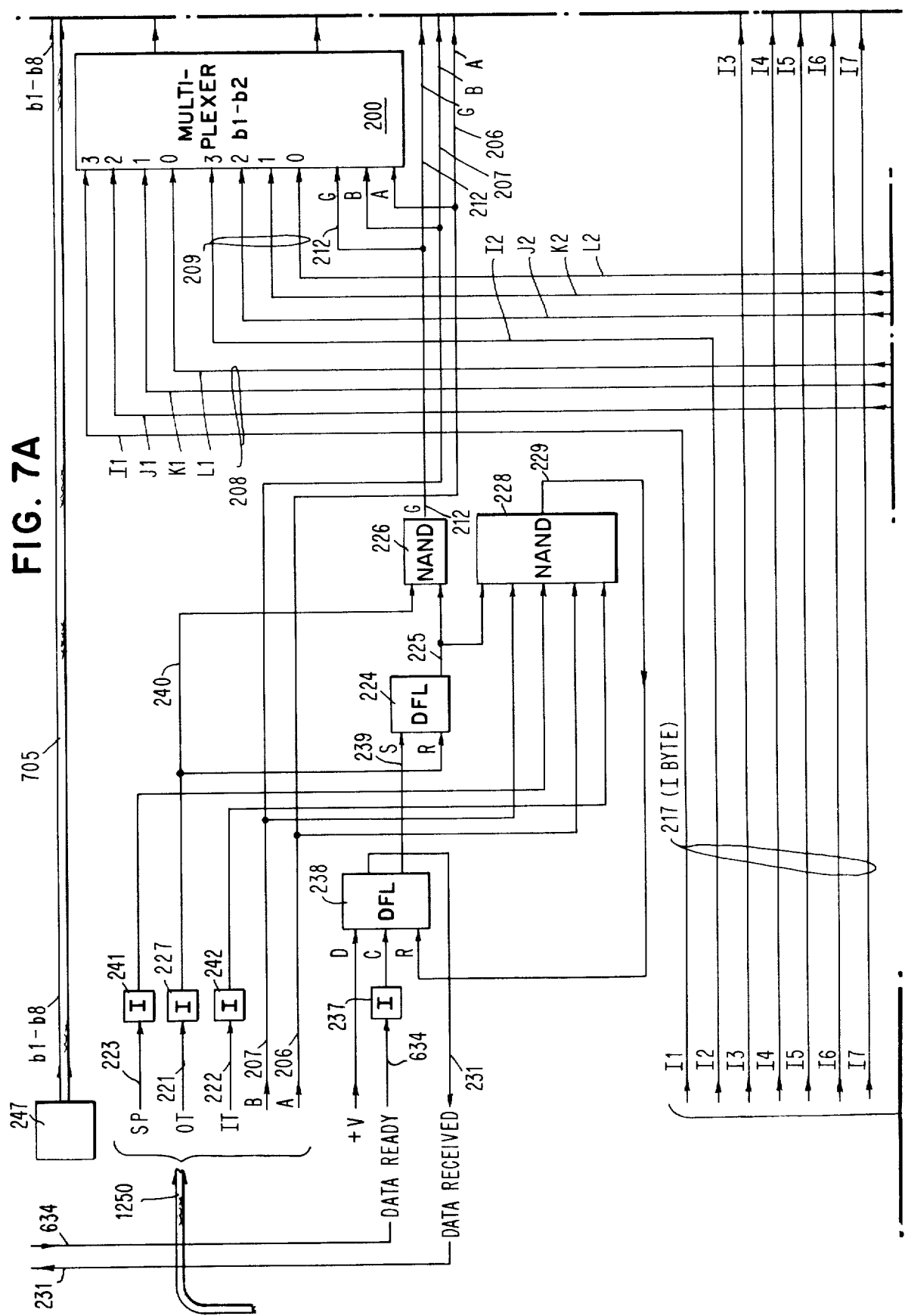
Figure 7B:
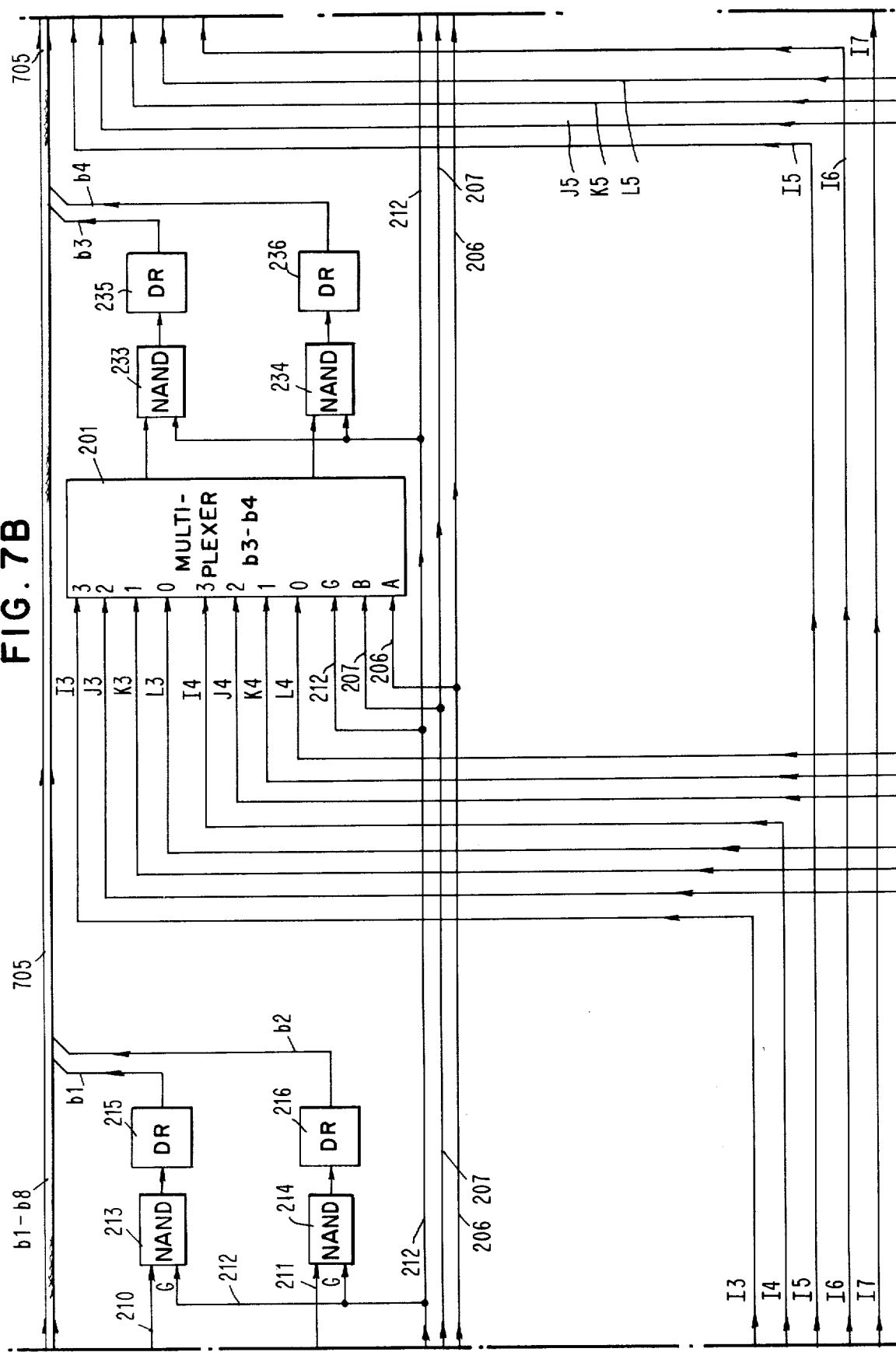
Figure 7C:
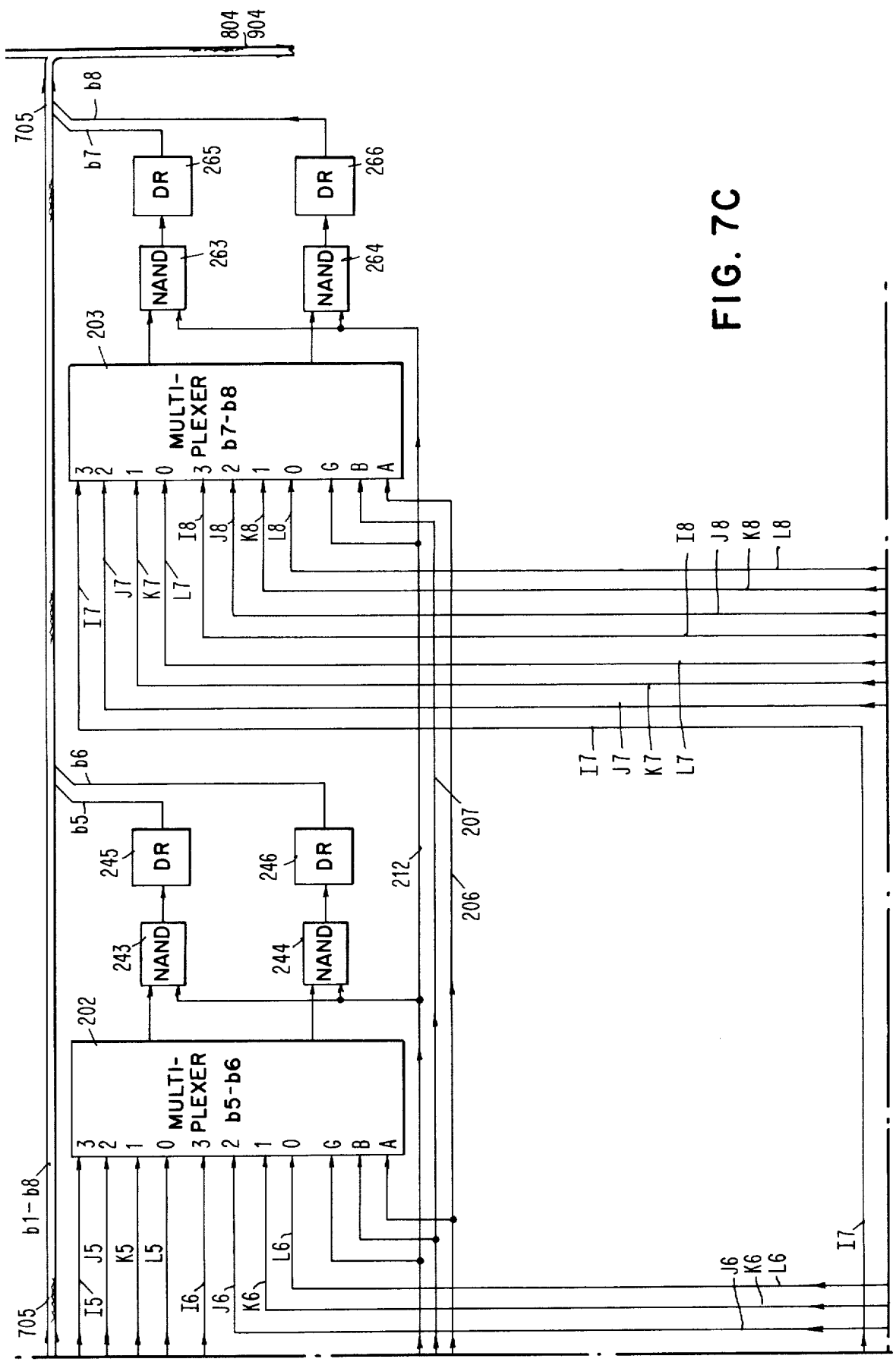
Figure 7D:
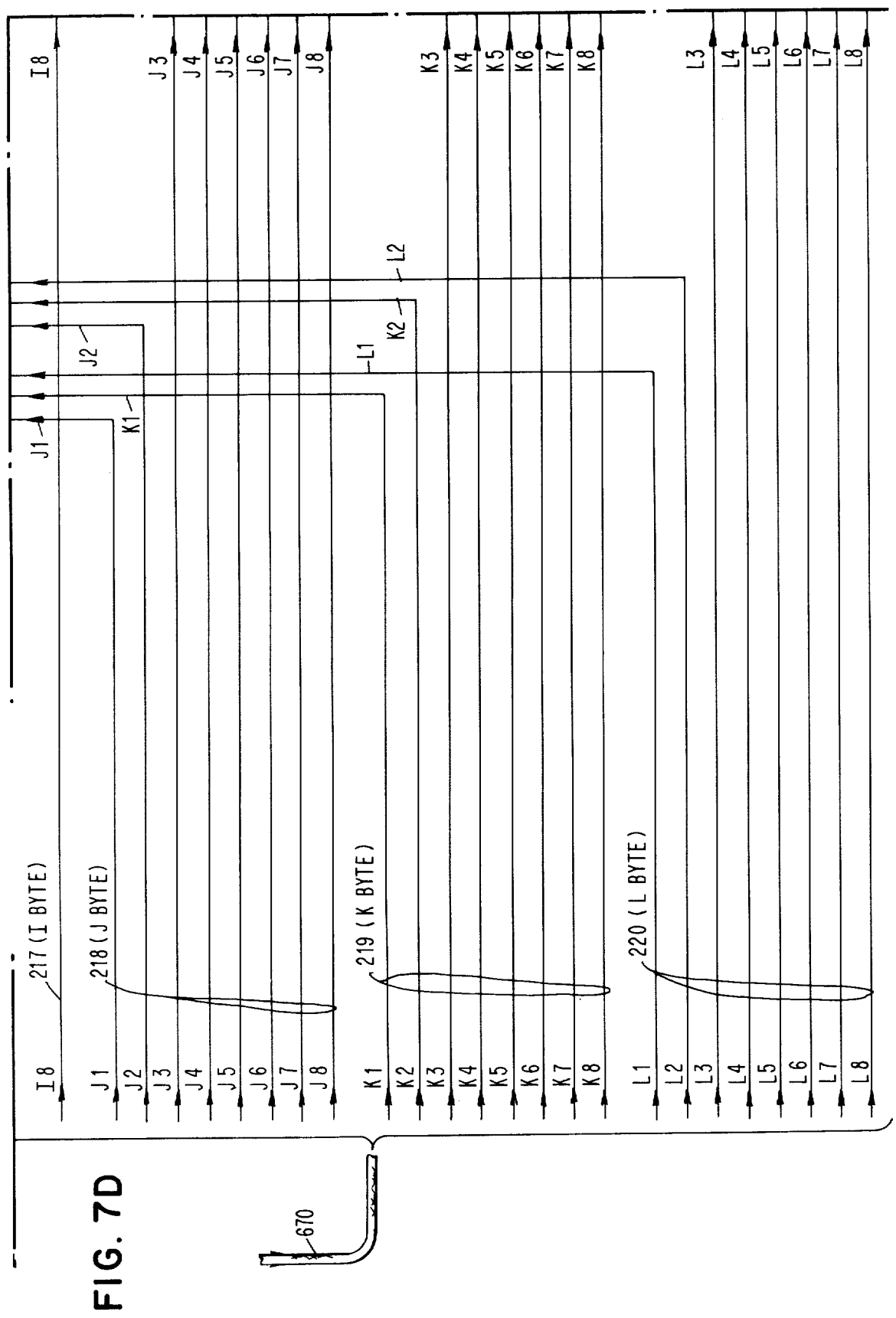
Figure 7E:
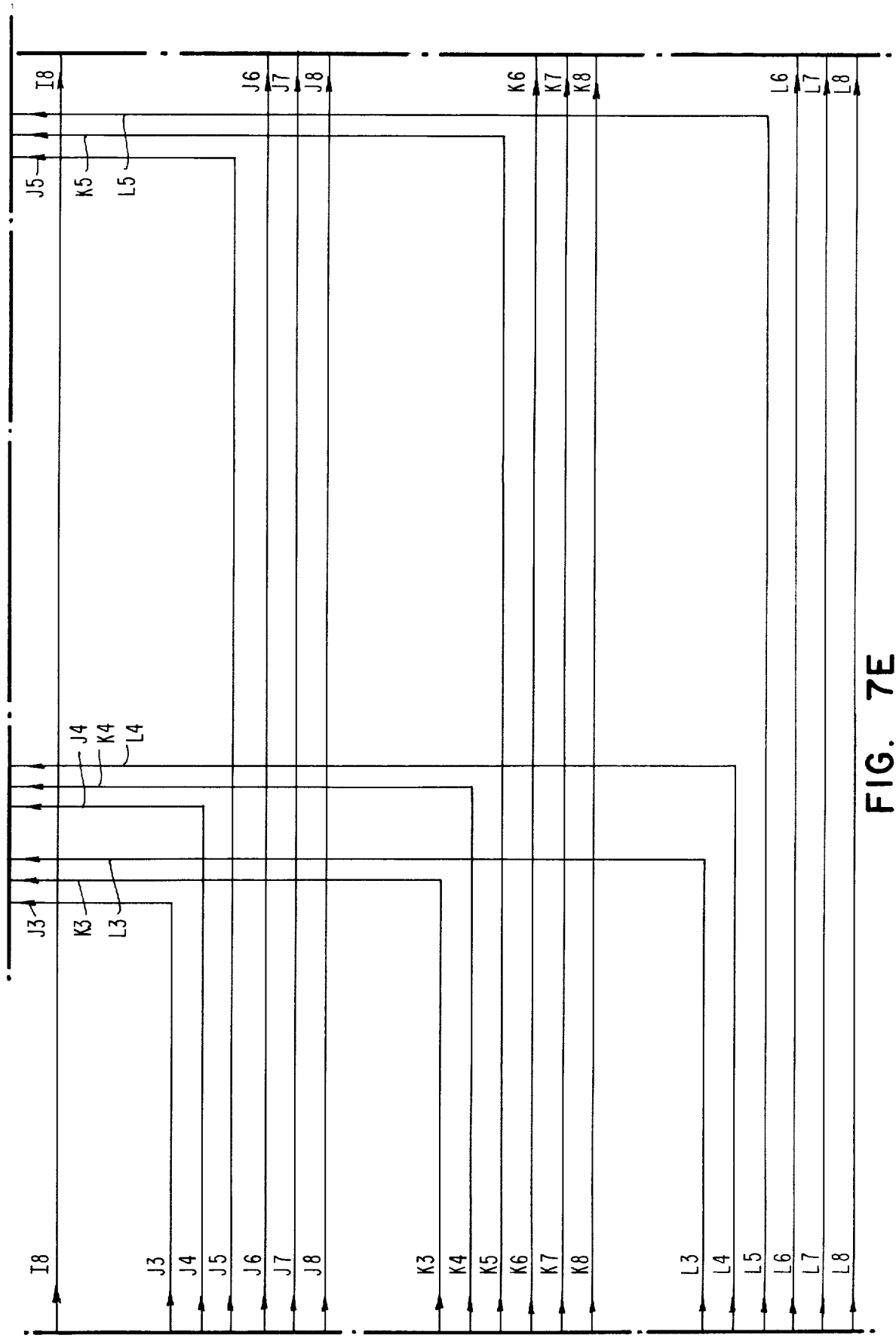
Figure 8:
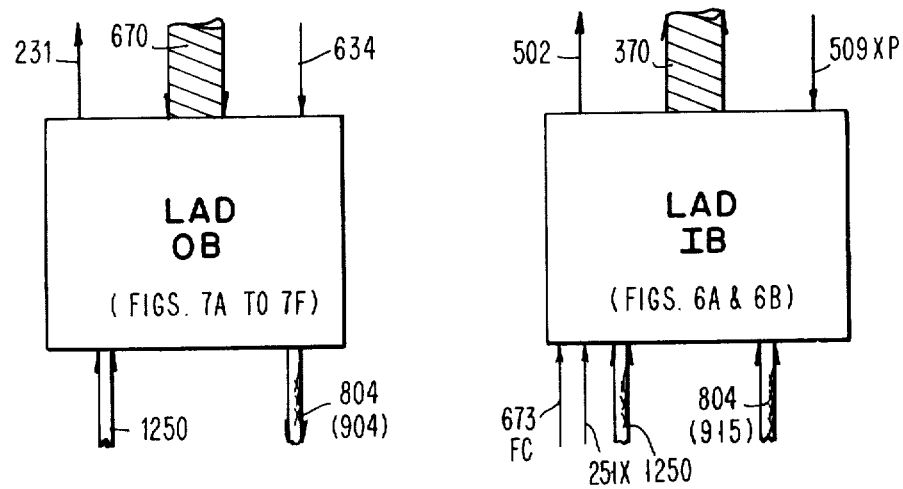
FIG. 8 shows a simple electrical block diagram of the cable connections to the LAD OB and the LAD IB.

The data selectors in FIG. 5B are used to distinguish between whether the DSA is to transmit or the GDA OB is to transmit. Data selectors 570–572 are clocked out at a particular time, and depending upon the condition, i.e., buffer end, buffer not ready, overrun, or buffer overrun, this information is put into the appropriate data selector 570–572 in the GDS IB, and if the GDS OB was the transmitter, then this infomation is put into the multiplexers 550–553 at the appropriate time and put on the bus. If, on the other hand, the DSA is the transmitter, whatever information is to be sent inbound from the DSA is put on the bus 205 for delivery to bus 804 or 905. The inbound multiplexers 550–553 described here work like the LAD multiplexers 200–203 in FIGS. 7A–7C described below (under LAD OUTBOUND) with each multiplexer handling 2 bits and generating either I, J, K and L bits serially at the appropriate time as shown by FIG. 2 for inbound time IT.

When a DSA wants to transmit, it must be able to transmit 32 frame bits to the GDA. The DSA sends the GDA IB a transmission request XR/DSA signal on line 502 to inverter 500 (FIG. 5A). The GDA IB returns a transmission pending DSA signal XP/DSA on line 509. When XP/DSA 509 drops as DFL 501 is reset, it is a signal to the DSA or LAD that an entire free frame has been captured and has been used for an inbound transmission. Now the DSA or LAD can either reinitiate a new transmission sequence or remain dormant, according to its needs at the time.

Each GDA has a transmission ID (identification code) Unit 590 (FIG. 5B), and a receiving ID 624–5 (FIG. 4A), and this is wired up at the GDA level. However, to allow for multiple addresses, some of these bits can be handed back to the DSA crossing the DSA/GDA interface so that the DSA can select a particular ID for a particular inbound transmission. They can be chosen either by the DSA or hard wired in the GDA, where there is only one address for GDA initiated inbound transmissions. The same ID's usually are used for outbound transmission as for address recognition.

The GDA never used an L byte for inbound transmission because of lack of need, so the DSA L byte is used whether valid or not.

The GDA inbound multiplexer units 550–553 (FIGS. 5B, C have three (A, B, and G) gating inputs, two of which A, B tell which of a set of four bits will be used, and G is the actual gating signal.

The GDA's (21–25) contain the ID or ID's to be recognized for transmission of messages to DSAs 26–29 or LAD 17. More than one ID may be recognized by a GDA.

Some messages to a GDA OB may be for the GDA itself, such as a transmit status command (TSC). A TSC is a command from the CPU to inquire as to the status of the GDA, which is described below under "Control Byte," "outbound" where $J1 = 1, J2 = 1$, and $J5 = 0$. These messages for the GDA are availAble to DSAs 26–29 or LAD 17, but the data-ready latch 635 is not set and DR line 634 is not activated in FIG. 4C.

The inbound part of the GDA has the function of transmitting data to Memory 13 via IMA 11. This transmission may be initiated by the GDA to transmit to the IMA a BE, BO, BNR, or an overrun condition or may be in response to a transmit status command TSC. (The abbreviations BE, BO, and BNR are explained above.) For device-originated data transmissions, the GDA sets a transmission pending latch 501 in FIG. 5A which is reset when the transmission is complete. The GDA status latches which cause it to transmit are reset at the end of the GDA originated transmission.

The GDA 21 attached to LAD 17 will be able to transmit interrupts only for outbound overruns. All other messages such as BE, BO and BNR will not cause GDA 21 to transmit an interrupt. GDA 21 is transparent to these messages by one wiring change by which the −L line is grounded. When the GDA 21 transmits to IMA 11, it sets an inhibit-free bit latch 508 or 526 in FIG. 5A. These latches, when set, cause the line drop AND 276 to suppress the passage of free bits FF on line 2510 to line 2511 to the next GDA 22 on the loop and all successive GDA's. If a free bit FF arrives at GDA 22, it transmits the message from GDA 22 or DSA 15 and resets its inhibit-free bit latch 508 or 526.

It is possible for a number of GDA's to be located remotely from their DSA's and in close proximity to each other. Thus, a star configuration can be realized utilizing this architecture..

Clocks

The byte clock 253 (FIG. 1A) and the clock within SER 256 are used to control the frame rate of their respective loops. They generate empty frames and insert the free bit in the appropriate position. They also supply appropriate timing and control pulses to the LAD 12. The bit clock with SER 256 supplies the additional timing and control needed by all serializers deserializers which are conected to LAD 17.

Loop Adaptor (LAD)

The loop adaptor (LAD) also has two parts, an outbound part and an inbound part. The outbound part of the LAD generates the frames on the loop. It also takes parallel data from IMA 11 or GDA 21 to which it is attached and inserts this data into an outbound frame half.

For example, the LAD 17 is told when to transmit by a data ready signal on line 634 from the GDA 21. The IMA data ready signal is always tied up, since a frame of zeros will be transmitted if no other frame is required to be transmitted. The LAD OB indicates completion of transmission by returning a data-received signal from line 231 (FIG. 1A, 1B, 7A) to the GDA (OB) (FIG. 4C).

The inbound IB part of the LAD 12, 17 receives bytewide data from the loop (in inbound frame halves) via the bytewide loop 804 or DES 257 and passes these 32 data bits in parallel via bus 370 to the inbound part of the GDA 21 or the IMA 11 to which the LAD 12, 17 is attached. The LAD 12, 17 determines that it has inbound data by an internal transmission request XR signal on line 371 (FIG. 6A) which sets DFL 399 to send a transmission request XR signal on line 502 to the GDA IB 21 or IMA 11 which sets a transmission pending latch 320 (FIG. 6A) by sending a transmission pending XP signal on line 509 from the IMA or FIGS. 5A and 5B) from the GDA inbound. If the transmission pending XP latch 320 (FIG. 6A) is not reset at the beginning of inbound time on the loop driven by the LAD OB 17, an overrun signal is generated by NAND 344 in FIG. 6A.

The LAD may also originate inbound messages which it transmits only when the inbound frame half is unused. There are two such messages. First, an interrupt message resulting from an overrun condition on the loop 804, or 14, 255. The second is a command request XR. All unused inbound frame halves are converted into command requests XR's by the LAD if no interrupts are to be transmitted. This enables CPU 10 to send out program-originated data to devices on the loop 804, 14, 255 without interfering with other loop communication.

The GDA 21 which drives LAD 17 recognizes ID's for all the GDA's (24, 25) on the loop driven by the LAD and an ID for the LAD itself. The LAD ID consists of the common portion of the ID's of the devices on the loop, filled out with zeroes. The LAD requires an ID since it can originate messages to the IMA. The primary LAD, which is directly connected to the IMA, has the ID OO (hex).

Device Specific Adaptor (DSA)

The device specific adaptors DSAs 26–29 are tailored to the specific devices for which each is used. For simple devices, they are rather simple, whereas for complex devices, such as a disk, they contain more hardward than the GDSs.

Free Frame Inhibitors

The ANDS 276–278 and SERDES 258, 260 have the function of inhibiting the free bit(s) on line 251X or on part of the serial frame on request on line 530 from the GDAs. There is also an equivalent amount of circuit delay in the other lines of loop 804, etc. to equalize delays.

Serializer (SER) and Deserializer (DES)

Figure 10:
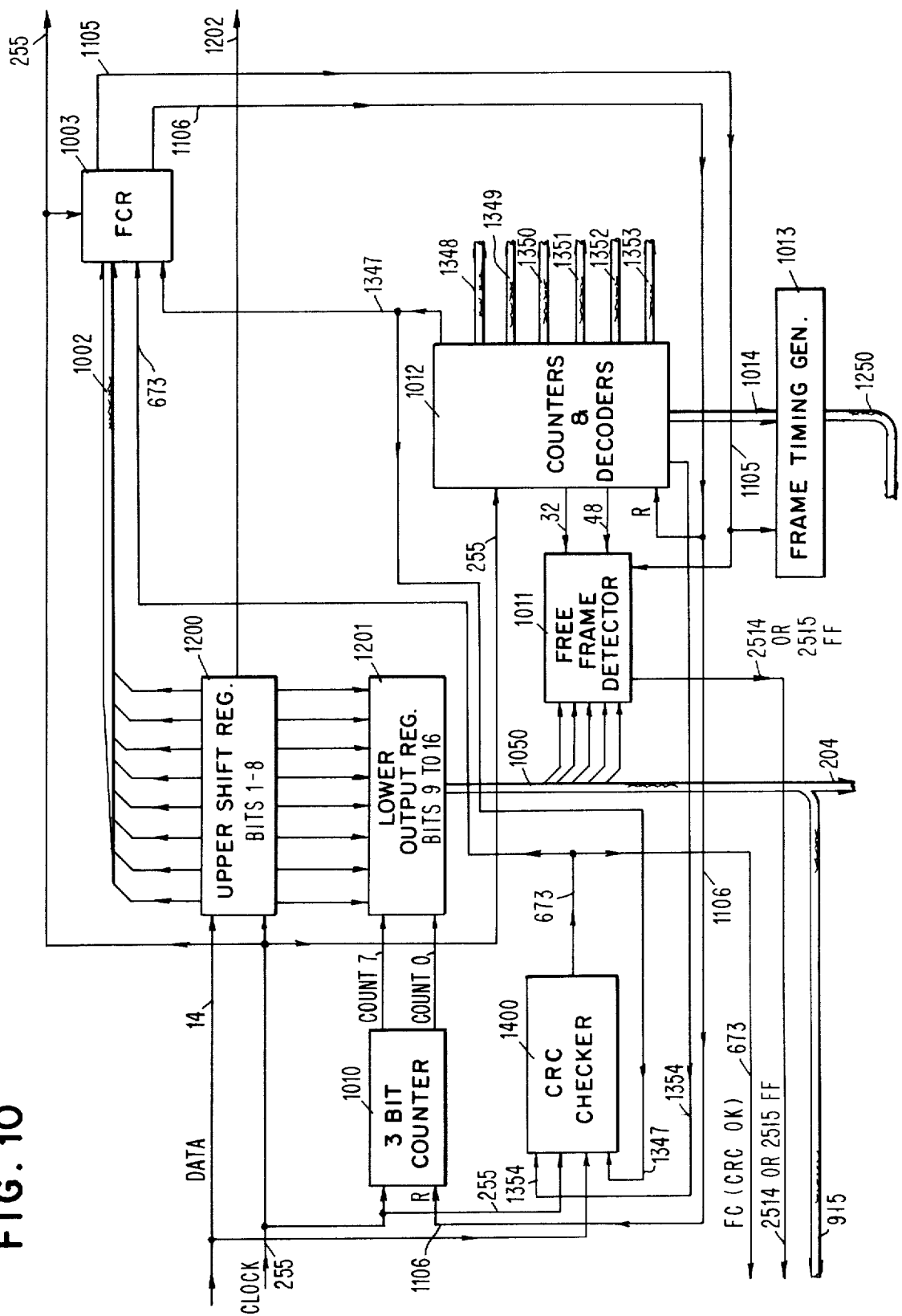
FIG. 10 shows the deserializer connected between the low speed, secondary loop in FIG. 1B and a LAD IB.

The deserializer 257 of FIG. 10 has the function of taking the serial loop 14 bit data and 255 clock and converting it to byte data. The deserializer 257 also prepares the timing signals used by the outbound GDA or the inbound LAD to control the byte flow.

Another function of the deserializer is to maintain frame synchronization and frame checking.

The serializer 1508 (FIG. 16, 17) or 256 (FIGS. 18A and B) takes the byte data and converts it to a bit stream. When connected to the LAD, it generates serial loop 255 clocking.

FRAME STRUCTURE

Each frame consists of four bytes I, J, K and L which are as follows:
I: ID (Identification by Address) Byte
J: CONTROL Byte K, L: DATA Bytes
more details on the use of these bytes follow:

ID Byte

To each GDA is assigned one or more ID's. There are 256 ID's with ID O assigned to the primary LAD. When a GDA has multiple ID's, they must be chosen as follows: If the ID is written s pqrstuvw, where p thru w are bits, then two ID's are assigned a GDA by keeping p thru v constant and gibving w its two values. For three or four ID's, p thru u are fixed and vw takes on the four possible values. Similar conventions apply for larger sets of ID's recognized by a given GDA.

The ID is used not only to identify a GDA and its associated device, but also to identify associated buffers in the memory and to identify the interrupt routine to be used in servicing the GDA. Two reasons for assignment of multiple ID's to a GDA are:

A GDA 21 connected between loops with an attached LAD 17 needs to recognize the addresses of all the GDAs 24, 25 on the serial loop 14, 255 driven by the LAD 17.

Buffer chaining may be accomplished by a device changing its ID in order to store or fetch data from another buffer.

Control Byte J

The use of the control (J) byte is indicated in the table below:

| J1 | J2 | J5 | (J3 and J4 are used for buffer status.) |
|----|----|----|----|
| 0 | 0 | X | Device data |
| 0 | 1 | X | Device command |
| 1 | 0 | 0 | Interrupt buffer full |
| 1 | 0 | 1 | Device data transfer acknowledgement |
| 1 | 1 | 0 | Command to GDA (TSC) |

Note: X denotes that either a 1 or 0 value is of equal validity

| J3 | J4 | | |
|----|----|----|----|
| 0 | 0 | | Normal |
| 1 | 0 | | BE (Buffer End) |
| 0 | 1 | | BO (Buffer Overrun) |
| 1 | 1 | | BNR (Buffer Not Ready) |

J6 is transmitted back to the device on data transfer acknowledgements and data requests exactly as it was transmitted to the IMA 11.

Inbound

| J1 | J2 | J3 | J4 | |
|----|----|----|----|----|
| 0 | 0 | 0 | 0 | Normal data request |
| 0 | 1 | 0 | 0 | Normal data transfer |
| 0 | 0 | 1 | 0 | Data request without BCW update (2) |
| 0 | 1 | 1 | 0 | Data transfer without BCW update |
| 0 | 0 | 1 | 1 | Command request |
| 0 | 0 | 0 | 1 | Count request |
| 1 | P1 | P2 | P3 | Interrupt of priority P1P2P3 (0–7) where 0 is the highest priority and 7 is the lowest priority |

Notes:
(1) Combinations 0101 and 0111 are not used.
(2) BCW (Buffer Control Word)

The notations used in the above tables are defined as follows:

Device Data: The K and L bytes contain data for the device;

Device Command: The K and L bytes contain a command for the device;

Interrupt Buffer Full: IMA 11 response to a device-generated interrupt stating that the interrupt buffer queue was not ready or was full;

Device Data Transfer Acknowledgement: IMA 11 response to device data transfer;

Command to GDA: Signal sent to a GDA to transmit present status of all latches.

BE: Memory operation has led to a buffer end condition;

BO: Memory operation has led to a buffer overrun condition;

BNR: Buffer was not ready for memory operation;

Data Request Without BCW Update: A device may read the same buffer location without modifying the start address (SA) (see IMA) so that the same frame is sent on a continuous basis;

Data Transfer Without BCW Update: A device may transfer data into the same buffer location without modifying the current address (CA) so that the same buffer location is accessed on a continuous basis;

Command Request: To avoid overrunning a loop with frames, a LAD will transmit a command request XR to the IMA 11 whenever it gets a free inbound frame;

Count Request: Count requests result in the IMA 11 counting such requests and signalling a buffer end (BE) after a predetermined number of them.

K and L Bytes

The K and L bytes carry information to and from the DSA. In order to provide data transparency, the appropriate code in the J byte may be used to specify whether the K and L bytes are in the mode which contains data or commands for the device.

Figure 5D:
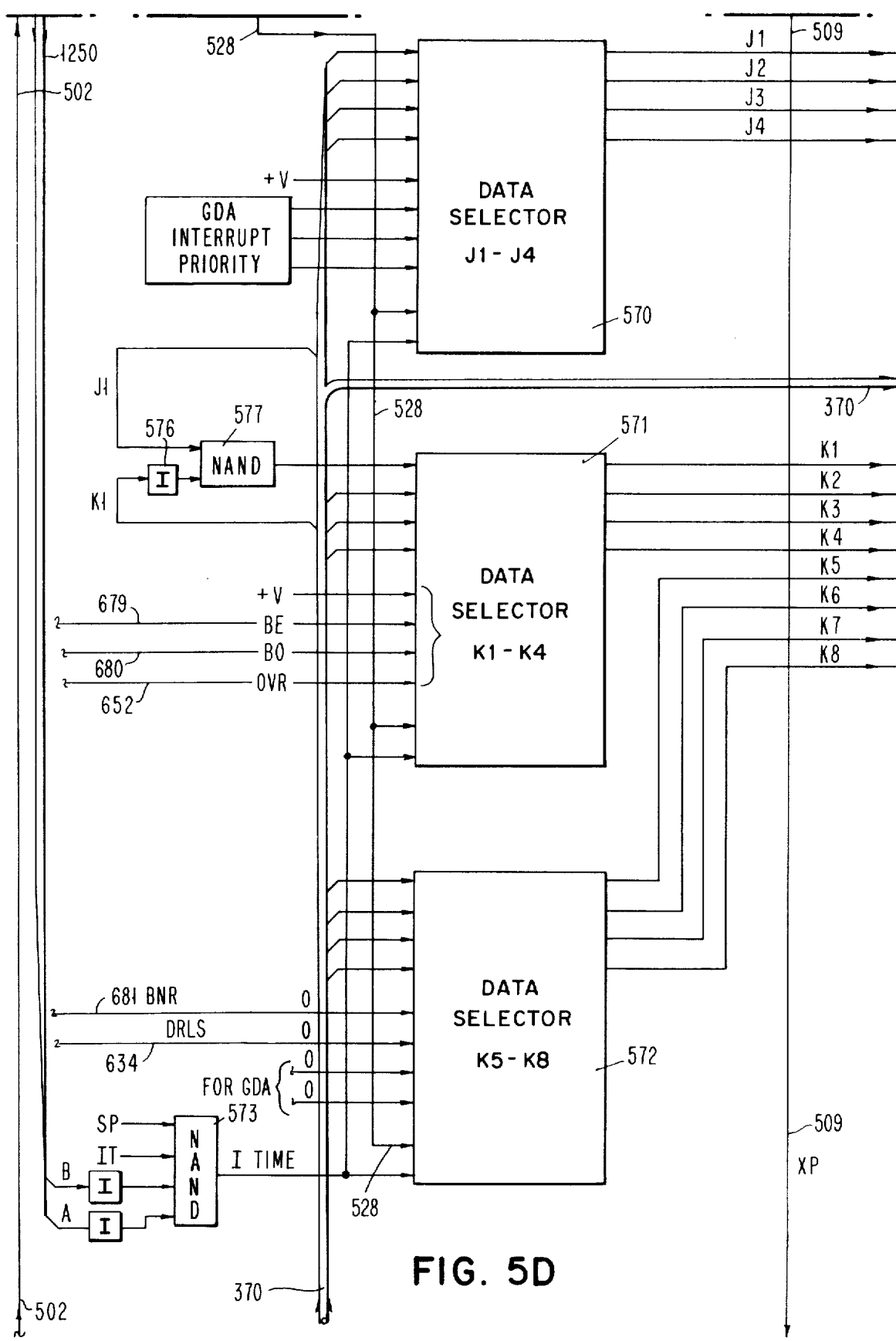

In the data mode, the K and L bytes carry data from the DSA to the CPU 10 for data transfer operations. In the command mode, interrupt requests originate either in a DSA 26–29 or in a GDA 21–25. For interrupts originating in a GDA, inbound bytes K1 through K6 are used to designate 1, BE, BO, OVR, BNR, DRLS, respectively, where BE, BO, and BNR from GDA OB on lines 679, 680, 652, FIGS. 4D, 5D and 9 are as previously defined. Whenever the GDA transmits an interrupt frame, K1 of the frame is equal to 1, as indicated by the +V input to data selector 571. Every DSA interrupt frame has the K1 bit = 0. This is guaranteed by inverter 576 and NAND 577. By examining the K1 bit, it is possible to determine whether an interrupt was generated by the GDA (which is defined above) or by the DSA which is dependent on the DSA's implementation. OVR = 1 from line 652 from GDA OB indicates a loop overrun where the GDA OB received a second frame before the DSA outbound was finished with the previous frame so the frame must be transmitted again by the IMA 11. DRLS = 1 on line 634 from GDA OB means that the data ready latch 635 in FIG. 4C is on. The L byte and the rest of the K byte is used to carry device status and may also contain data.

INTERFACES

Parallel Outbound

The parallel-outbound interface (FIG. 1A) 670, 231, 634 from IMA 11 (or GDAs 21–25) consists of 34 wires. Thirty-two wires 670 carry the I, J, K, and L bytes of the OB frame half down to the LAD OB (or DSA). One wire 634 carries a data ready signal outbound. The last wire 231 carries the data received signal back from the LAD OB (or DSA) to the IMA 11 or the GDA 21–25 OB. The IMA 11 or GDAs OB 21–25 also will maintain the data in buffer storage for the LAD or DSA 26–29 until it receives the data received signal on line 231.

Parallel Inbound

The parallel-inbound interface to IMA 11 or a GDA 21–25 consists of 34 lines 370, 502, 509. Thirty-two lines 370 carry the I, J, K, L bytes of the inbound half frame up. One is used for transmission request 502, and the last 509 carries the transmission pending XP signal outbound to the DSA 26–29 or LAD 12, 17.

Byte Interface

The byte interface carries data, one byte at a time, from LAD (OB) 12 on bus 804 to the GDA's (OB) 21, 22, 23. It contains four outbound bytes on a multiplexed basis. This is done similarly by SERDES 258, 260 on serial loop 14, 255. Bus 804 also contains inbound byte data supplied by trunks 904 in FIG. 1A. SERDES 258, 260 also connect to trunks 204 and 905 for outbound and inbound serial loop 14, 255 transmissions, respectively.

The byte interface to the GDA 21–25 contains 21 wires. Eight wires 204 supply outbound data, and eight wires 905 supply inbound data to bus 804. Bytewide bus 804 multiplexes inbound and outbound data, FIGS. 1A, B, 7C. SERDES 258 and 260 have two unique buses. The other five wires 1250 are supplied by the byte clock 253 or SERDES 258, 260 via SER 256 or DES 257 and consist of:

SP : Sampling pulse. Indicates when outbound data is to be sampled.

OT : Outbound time

IT : Inbound time

B : First bit of byte count in frame half

A : Second bit of byte count

In addition, there is the free bit (FF) line 251X. It carries an FF pulse indicating that a signal can be sent by a following GDA during the next free frame interval, if a previous GDA has not seized the frame thereby blocking the FF pulse.

Bit Interface

The serial frame for serial loop 14 is 96 bits long and is organized as follows:

0–7 : Sync byte (47 in hex)
8–23 : I & J Bytes of Outbound frame
24–25 : Unassigned
26–30 : Free Frame (FF) Bits (11111)
31 : Unassigned
32–47 : K and L Bytes of Outbound Frame
48–55 : Outbound frame cyclic redundancy check (CRC) (not including unassigned or free bits)
56–87 : Inbound frame
88–95 : Inbound cyclic redundancy check (CRC)

Response Time

In the loop discipline, the frame rate is determined by the frame generator. For the primary loop, this rate must not exceed the frame handling capacity of CPU 10 or the IMA 11. Furthermore, since some devices may require prompt turnaround for their data requests (e.g., disks), the latency (i.e., time between end of a frame in which a terminal sends a message to the IMA 11 and the start of reception of a frame of a response from the IMA 11 by this same terminal), must be small. It is assumed that data sent on outbound frame halves is prepared by the IMA 11 within one frame time from the time the inbound frame half has arrived from loop 804, so that no inbound frame halves need to be queued (except for the interrupt queuing, which also occurs within one frame time).

It is desirable for the frame period (time between successive frames) to be as short as three microseconds, if possible. A frame period greater than eight microseconds will impact the use of the system in some situations.

Buffer Handling

There is a buffer control word BCW (32 bits) associated wth each ID. This word contains the current address in the buffer and the stop address in the buffer as well as the Process Address and Start Address (see below). These addresses are capable of addressing the entire memory 13 attached to CPU 10.

While the CPU 10 is setting up a buffer in memory 13, a device may attempt to access that buffer. To prevent the IMA 11 from accessing that buffer, the stop address is set to zeros. The IMA 11 detects this and sends back a buffer-not-ready (BNR) signal.

Indirect Memory Access (IMA)

In the case of a normal data transfer operation, the following steps occur:

A check is made for buffer-not-ready BNR.
The current address is compared with the stop address.
If the current address equals the stop address, a buffer overrun is generated and the data is not stored.
If the current address does not equal the stop address, the current address is incremented two bytes and the data is stored at the current address.
If the current address now equals the stop address, a buffer end is generated.
If either buffer end or buffer overrun occurred, an appropriate message is transmitted in the acknowledgement.
An acknowledgement frame is sent to the device.

In the case of a data transfer without buffer control word update, the following happens:

A check is made for buffer-not-ready.
The data is stored at the current address.
An acknowledgement frame is sent to the device.

In the case of a normal data request operation, the steps are as follows:

If the appropriate buffer was not set up, buffer-not-ready is transmitted by the IMA.
The current address is compared with the stop address.
If the current address equals the stop address, a buffer overrun is generated and no data is transmitted. If no buffer overrun occurs, the current address is incremented 2 bytes, and the data is read from the current address.
If the current address now equals the stop address, a buffer end bit is set.

The outbound message is created for data transmission with or without buffer end, buffer overflow, or buffer-not-ready.

A data request without buffer control word update is handled in the following way:

A check is made for buffer-not-ready.
Two bytes of data are read from the current address.
An outbound frame is sent to the device.
A count request is handled as follows:
A check is made for buffer-not-ready, and buffer overrun.
The current address is incremented 2 bytes.
If the current address equals the stop address, a buffer end bit is set.
If there was a buffer end, buffer-not-ready, or buffer overrun, an outbound frame is sent to the device.

A command request operation requires the following steps:

The IMA 11 tests the command request queue latch to test whether there are any commands in the queque. If there are no commands, no other memory 13 accesses are wasted looking for non-existent command requests. If there are, the current queue address is compared to te queue stop address.
The commannd is read from the current address.
The current address is incremented 4 bytes.
The outbound message is transmitted.

Interrupt Handling

As was previously described, the interrupt request is queued in its entirety (I, J, K, and L bytes) into one of the two queues corresponding to the interrupt's priority. The IMA 11 sends a signal to the CPU 10 that an interrupt has occurred. The service routine compares its operating priority with the priority of the incoming message to determine whether it should handle the new priority immediately or not.

Each interrupt priority has one queue. If the queue if full, an interrupt buffer overrun message will be transmitted by the IMA 11 to the device, and similarly an interrupt buffer-not-ready message will be transmitted if neither buffer is ready. If neither of the last two conditions are met, it is unnecessary for the IMA 11 to acknowledge the interrupt.

Handshaking

When the LAD 12 has an inbound frame for the IMA 11, it first transmits the data to the input lines of the port and then sends a data-ready signal. When a data-received signal is sent from the IMA 11 to the LAD 12, the LAD 12 resets its data-ready level. The time interval between the setting of data-ready and the data-received signal cannot exceed one-half of the frame period.

The IMA 11 will cycle data to LAD 12 at the loop 804 frame rate. Absence of data represents OB frames containing all zeroes.

Program Communication

The application and interrupt service programs must be able to access the buffers, buffer control words, and interrupt status information.

It is also desirable for an interrupt service program to be able to raise its priority on a temporary basis. It should also be able to lower its priority as appropriate.

FIGS. 1A and 1B show the overall loop system in block diagram form. Communication is provided from memory 13 and CPU 10 to GDA units 21–23 via IMA 11, LAD OB 12 and bytewide loop 804. There is common clock synchronization provided tO IMA 11, LAD 12 and GDA units 21–23 from byte clock 253 via cables 1250. Bytewide loop 804 is presumed to be sufficiently short so that all data is instantaneously seen by GDAs 21–23 and no timing delays are incurred via bytewide loop 804 transmissions. On line 2510, a signal known as a free frame FF is generated by clock 253 for each frame at K time as can be seen in FIG. 2, which is detected by each GDA 21–23 in succession. When a free frame has been detected by a GDA and a GDA IB has made a decision to transmit, it provides a negative signal on line 530 which inhibits AND 276, 277 or 278 as the case may be so that the FF signal is blocked to inhibit transmission by the following GDAs for the inbound portion of the frame in question. At the appropriate time, the GDA which has made the decision to transmit will transmit data onto the inbound half frame on loop 804. LAD 12 OB communicates with IMA 11 via a Data Ready (DR) signal on line 634, a Data Received signal on line 231 and the 32 bit bus 670 from IMA 11 to LAD OB 12. For inbound transmission from LAD IB 12 to IMA 11, line 502 is a Transmission Request (XR) line, line 509 is a Transmission Pending (XP) line, and bus 370 is the four byte bus containing all inbound data sent from the LAD IB 12 to the IMA 11. Note that GDAs 21–23 have lines 673 (FC) and 672 (−L). The notation −L and the fact that the line is grounded indicates that a GDA OB is connected to a LAD and will not transmit interrupts upon detection of buffer ends (BE), buffer overruns (BO), etc. This prevents GDA 21 which recognizes all frames for GDAs 24 and 25 from responding to an interrupt directed to GDAs 24 and 25 which can respond directly for themselves. Line 673 (FC) indicates whether the frame has checked properly or not. GDAs 24 and 25 receive FC signals from SERDES 258 and 260 on line 673. Since there is no frame checking on the byte loop 804, the FC line is tied up for GDAs 21, 22 and 23, as all frames are presumed to be valid.

GDAs 21–25 transmit either to a LAD 17 or DSAs 26–29 via line 231, 670, 634, 370, 502, and 509 (XP) in a similar fashion as LAD 12 communicates with IMA 11. Serializer 256 in FIG. 1B communicates to LAD 17 via timing cable 1250 which generates timing for the LAD as well as providing timing signals for the secondary loop on line 255. Data is received by SER 256 from LAD OB 17 on cable 904 and data is sent from SER 256 to SERDES 258 on line 14. Deserializers 258 and 260 are required to achieve frame synchronization (as described below) from the timing signals on line 255 and in turn to generate timing signals on line 1250 from the SERDES 258, 260 to GDAs 24, 25, respectively. Free frame bits FF recognition must be sent via lines 2514 and 2515, respectively, and to inhibit further transmission of free frames via respective lines 530. The SERDES 258, 260 are capable of serializing data from GDAs 24, 25 on a bytewide bus 904. At the end of secondary (serial) loop 14, 255, deserializer 257 functions like the deserializers of SERDES 258, 260 to provide a bytewide bus 905 with data and appropriate timing signals on line 1250 as well as FF signals on line 2514. Thus, LAD 17 has the same kinds of interfaces as LAD 12. Frame check is derived by SERDES 258, 260 and delivered to GDAs 24, 25 via line 673.

Interfaces from GDAs 22–25 to DSAs 26–29 are all identical and their interfaces are comparable to the IMA 11-LAD 17 interfaces described above.

Figure 3:
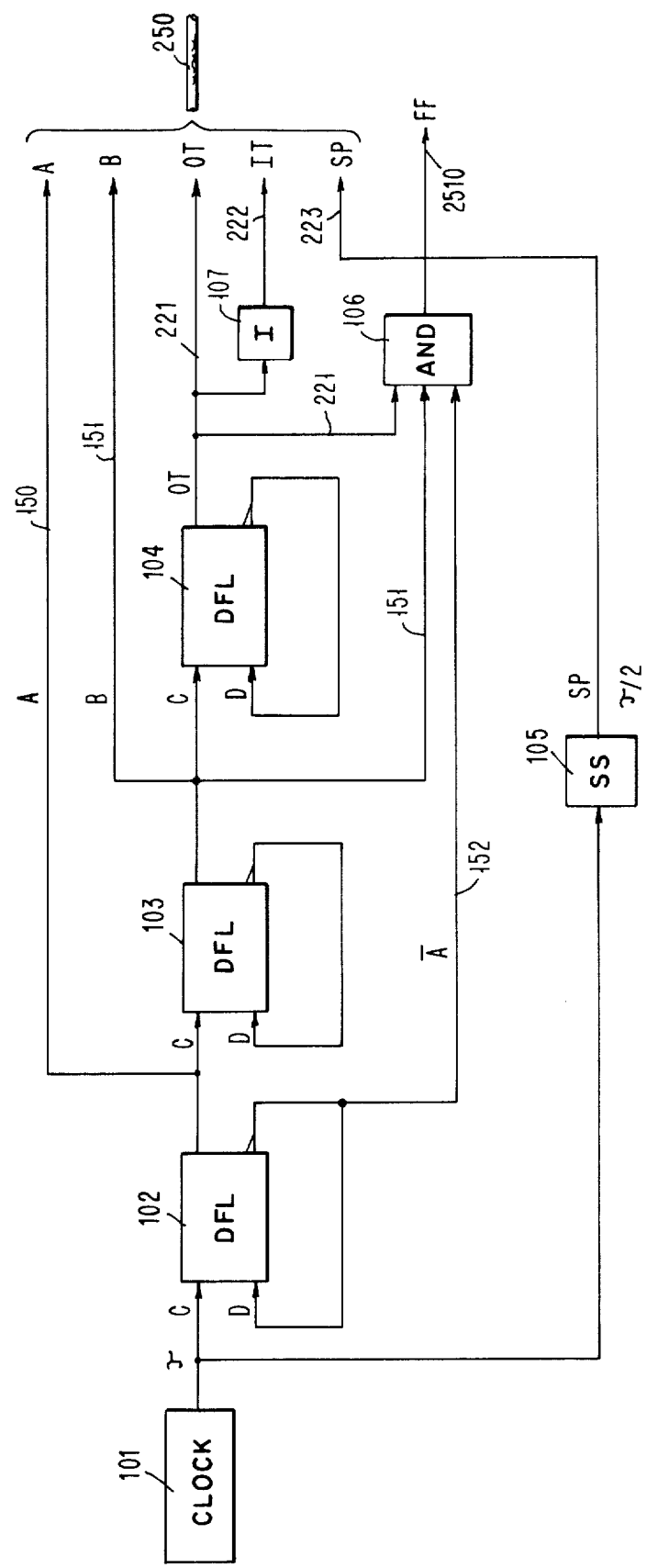
FIG. 3 is the clock for the primary loop.

FIG. 3 shows apparatus for the generation of timing signals for the bytewide loop 804. A free running oscillator serves as clock 101. The clock 101 has a frequency of period T which is preferably 21.3 MHz. This frequency is divided by 2 via DFL 102 to form A time 150, divided by 4 via DFLs 102 and 103 to form B time 151, and divided by 8 via DFLs 102, 103 and 104 to form outbound time OT 221. Since inbound time IT on line 222 is the inverse of OT, it is formed via an inverter 107. Note that AND 106 provides free frame time (FF) 2510 as a combination of OT 221, B 151 and not A time 152. Also, single shot 105 forms an SP synchronization pulse on line 223 at T/2 time which is 93.9 nanoseconds delayed from the T pulse and lasting about 20 nanoseconds. The values produced are shown in FIG. 2 as a function of time.

LAD OUTBOUND

The LAD outbound OB unit shown in FIGS. 7A–7F allows the IMA 11 or the GDA (OB) 21 between the bytewide loop 804 and serial loop 14, 255 to transmit frames to outbound devices 18, 19 (remotely located). The IMA 11 and byte clock 25 generate outbound frames on the bytewide loop 804 and at the appropriate time, the LAD latches the I, J, K and L bytes. The GDA 21 or IMA 11 sends a Data Ready Signal on DRLS line 634 saying that there is data ready for LAD OB on bus 670 and that the LAD OB has been supplied on lines 670 with sufficient data to generate a complete frame of data.

Multiplexer-LAD Outbound Transmission

Four parallel multiplexers 200, 201, 202, and 203 are adapted to transmit data from input lines 670 to bytewide data bus 705 2 bits in parallel at a time from each multiplexer. One purpose of the LAD OB is to convert 32 parallel data input lines 670 from the GDA or IMA to 8 parallel output lines on bus 705, $b1$ to $b8$ which connects to bus 804 or 905. Thus a parallel-to-serial conversion is provided. Each multiplexer selects a pair of input lines 0,0; 1,1; 2,2; or 3,3 depending upon which of four possible binary values exists for the moment on the selector lines 206, 207 carrying binary values A and B. In multiplexer 200 the upper set of lines $I_1$, $J_1$, $K_1$, and $L_1$ 208 are multiplexed to upper output line 210 and a lower set of input lines $I_2$, $J_2$, $K_2$ and $L_2$ 209 are multiplexed to lower output line 211. Multiplexing does not occur until the gate line G, 212 is negative, since the multiplexer operates on a negative logic input gate. When the outputs are negative on output lines 210, 211 indicating a logical 1, then if gate line 212 is on (negative) NAND circuits 213, 214 produce a positive pulse amplified by driver's DR 215, 216 to provide negative logic signals on lines $b1$, $b2$ of bus 705. The four multiplexers all operate simultaneously to produce the other four parts of an outbound frame in the same way to produce an output on the eight lines $b1$–$b8$ of bus 705. Such a frame comprises a byte of data in parallel with 2 bits supplied per multiplexer.

In addition, it should be noted that input lines 670 include I byte lines 217, J byte lines 218, K byte lines 219 and L byte lines 220. The lines for any of those bytes are split up equally in groups of two among the four multiplexers. The BA input lines of the multiplexers 200–203 are arranged such that for a BA input signal of 3 (binary 11, $b = 1$, $A = 1$), 11), the entire I byte is transmitted to bus 705. For a BA internal signal of 2 (binary 10 for signal $B = 1$, signal $A = 0$), the J byte transmitted. For a BA internal signal of 1 (binary 01 $B = 0$, $A = 1$), the K byte is transmitted and for a BA internal signal of 0 (binary 00 $B = 0$, $A = 0$), the L byte is transmitted. The sequence of BA internal values 3, 2, 1, 0 is cyclic as shown on FIG. 2. For example, two I bits are fed into each multiplexer and at the appropriate time all eight I bits are gated out simultaneously onto bus 705. Later for different BA combinations, all 8 of each of the I, J, K or L bits are gated out of the multiplexers 200–203 onto bus 705.

When the frame generator in FIG. 3 signals a positive potential for outbound time OT (See FIG. 2) on line 221, inverter 227 (FIG. 7A) provides a zero input to NAND 226 which will therefore provide a positive output on gate line 212 to gate G of the multiplexers (201–203), so they will be turned on and ready to transmit data, only if the value on line 225 from DFL 224 is positive. This indicates that it is outbound time.

NAND 228 has a positive output except when A and B are 0, SP is 0, and IT is 0, which occurs at L time in the outbound frame when the SP pulse has occured. In addition, the DFL 224 must have its 0 output on line 225 at a positive potential, which commences when OT line 221 goes negative at the beginning of inbound time.

The data ready input signal on DRLS line 634 coming down to LAD OB is a positive potential which is inverted by inverter 237 and is supplied to DFL 238 to produce a positive signal on line 239 to turn the lower output line 225 of DFL 224 to a low (zero) value so that NAND 226 will pass any positive signal on line 240 which will occur during inbound time when the OT signal on line 221 is negative, since inverter 227 inverts the signal. NAND 226 provides a signal on line 212.

The IMA 11 or the GDA 21 connected to couple the bytewide loop 804 to the secondary loop can transmit frames to outbound or remote devices by means of a LAD OB outbound. A positive bias source 247 provides a positive bias on each of the lines of bus 705 which thereby generates all zeroes on the bytewide bus 705 $b1 - b8$ and at the appropiate time the LAD latches the I, J, K or L byte by grounding desired lines on bus 705. For example, at I time the I byte is latched in the four multiplexers 200–203 with bits 11, 12 in multiplexer 200, 13, 14 in multiplexer 201, etc. Then the byte is put out on bus 705 and at J time, which is the next BA interval, the control (J) byte, is latched in the same multiplexers and the control (J) byte is transmitted upon bus 705. This process continues with bytes I, J, K and L each being serially transmitted upon bus 705, until the entire outbound OB half of the frame has been sent by the LAD.

Data ready on DRLS line 634 is a signal from the GDA or IMA saying that a valid set of bits on 32 data lines is ready to put out onto the bus 705.

The subsequent data received signal on line 231 indicates that all of the frame has been sent to bus lines 705 and the data received signal is sent back to the GDA 21 or IMA 11 to record that fact with that unit.

GDA OUTBOUND (OB)

Outbound frame bytes are to be received by the GDA outbound in FIGS. 4A–4D from cable 204 on bus lines $b1-b8$ by binary latch circuits 600, 601, 602 and 603 for the I, J, K, and L bytes respectively, assuming that they are properly addressed.

Assuming the address is proper and in view of the fact that the bytes arrive serially, NANDS 604, 605, 606, and 607 in FIG. 4C for outbound 1, 2, 3 and 4 times are respectively coupled to enable latches 600–603 sequentially as the result of responding to the sample pulse ST and outbound time pulse OT as well as the normal values A, B and inverted values $\overline{A}$, $\overline{B}$, permuted to provide for different pulses on lines 608, 609, 610, 611 to gates 612, 613, 614, and 615 in FIGS. 4A and 4B to gate lines $b1$ to $b8$ to the latches 600–603 one at a time, respectively. However NANDS 604–607 also have an input line 621 from ID OK DFL which indicates that the identification carried by the I byte of the current frame is correct so that the frame should be accepted by the GDA OB and stored in latches 600–603 for supply to the DSA or LAD via cables 616–619 to 32 bit bus 670.

The decision as to whether the frame should be stored in the binary latches is initiated by comparators 622, and 623 connected respectively to lines $b1-b4$ and $b5-b8$. In addition, identification ID bus circuits 624 for bit lines 1–4 are coupled by cable 626 to comparator 622, and ID bits circuits 625 for bit lines 5–8 are coupled by lines 627 to comparator 623 so that the comparator 623 provides a signal to comparator 622 indicating acceptance or rejection of the bits 5–8 on line 628 and comparator 622 indicates acceptance or rejection of the total identification in the I frame on line 629 to NAND 630, which provides an input to ID OK DFL 620, which responds to the fact that the GDA is not busy as indicated by a positive output on line 631 of DFL 632 which shows that the GDA is not busy, because line 634 is off so DFL 632 was reset by the outbound time OT signal on line 685 and remains reset, until DFL 635 is set by line 636, from the NANDS 637 and 638. NAND 637 checks for correct ID on line 640 from ID OK DFL 620, during Inbound I1 time, which will enable NAND 638 via line 650 if the DSA or GDA signal on line 639 is positive and in the case of the GDA on a serial loop, line 649 provided by the SERDES indicated a valid frame check FC. Thus DFL 635 is set only when the ID is OK, it is I1 time, the frame was properly checked, and the DSA properly accepted the previous frame. That causes DFL 632 to turn on its busy line 633. If a second frame is received with the same I byte before the first frame has been accepted by the DSA/LAD, NAND 641 is turned on when comparator line 629 is on. NAND 641 then turns on DFL 643 via line 642, which resets DFL 635 and turns on overrun DFL 645 in FIGS. 4C, 4D via line 644. The overrun signal passes by line 652 to the GDA Inbound FIGS. 9 and 5D. NAND 646 in FIG. 4C turns on NAND 604 at OT-1 Time or the initial outbound byte time in response to $\overline{A}$, $\overline{B}$, OT and SP pulses if DFL 620 is on. This same signal clocks DFL latches 620 and 643. Latch 620, when checked, passes out the data signal from NAND 630 on line 648 which sets line 621 on. For NANDS 605, 606, and 607 also, which operate at OT-2, OT-3 and OT-4 times respectively for $\overline{BA}$, $\overline{AB}$ and AB combinations of signals A, B, SP and OT, which are used to gate the I, J, K, and L byte latches 600–603.

For transmission of overrun OVR, buffer end BE, buffer overrun BO, buffer not ready BNR, and transmission request GDA(XR/GDA) signals lines 652, 679, 688, 681 and 524, respectively are provided. Line 650 and the DSA signal inverted by inverter 651 from line 639 to line 682 gates NANDS 653 and 654 for XIP line 655, and BO line 656. Line 650 and BE line 657 actuate NAND 658.

A transmission request (XR/GDA) signal on line 524 is set by NAND 659 in response to NANDS 653, 654, or 658 and DFL 643 in FIG. 4C via lines 660, 661, 662 or overrun line 644.

DFL 645 is set as described above and reset by line 543 carrying a signal described in connection with the GDA Inbound. DFL 663 is set by NAND 658 to indicate buffer end BE. NAND 654 sets DFL 664 to transmit the buffer overrun BO signal on line 680. Line 665 connects line 543 from FIG. 5A to reset DFL's 663 and 664.

—L inhibits GDA 21 from transmitting interrupts for BE, BO and BNR conditions. This prevents a double interrupt from being transmitted due to a BE frame directed to GDA 24, for example, since both GDA 25 and GDA 24 have to be capable of receiving the frame.

GDA INBOUND (IB)

The circuits of the GDA Inbound are shown in FIGS. 5A–5F. In FIG. 5A, DFL 501 is an edge-triggered flip flop responsive to negative signals from inverter 500. Its data input line 503 is connected to positive bias +V and its clock line 538 is connected to a transmission request (XR) line 502 from the DSA (XR/DSA) or LAD 17 through inverter 500, so that a negative XR/DSA (XR/LAD) pulse turns on DFL 501 to produce a positive signal on line 510 to NAND 506. A negative signal indicating XP/DSA is supplied by DFL 501 on line 509 to the DSA which communicates to the DSA the fact that its request for transmission is now pending or awaiting service. A NAND 518 is connected to cable 1250 to receive the SP, OT, B and $\overline{A}$ pulses (via inverter 539) during outbound K time to produce a positive value on line 520 at that time just before the free frame signal, if any at L time, so that the DFL's 508 and 526 reset by NAND 516 at J, OT time (A,$\overline{B}$) will record current GDA and DSA transmission request XR values in response to operation of either NAND 506 or NAND 525. NAND 525 will also turn on at that time if DFL 521 has received a transmission request XR/GDA on line 524 from the GDA Outbound. NAND 525 is used to record the fact that for a specific frame there is a DFL 521 (GDA OB) request to transmit also. If both the DSA (LAD) and GDA OB demand transmission request simultaneously there is a contention procedure in which DFL 508 and DFL 526 are set via lines 507 and 540 respectively. Then DFL's 526 and 508 can signal via lines 528 and 527 respectively to NAND 529 to activate the inhibit free bit line 530 connected to turn off the line drop AND 276, 277, 278 or notify SERDES 258 or 260 of seizure of the inbound frame by the GDA IB NAND 541 is turned off by the FF signal via inverter 542. If no "upstream" GDA wants to transmit an inbound frame, this GDA receives a free frame indication on line 251X and via inverter 542, AND 531 combines the receipt of a free frame indication with the desire of this GDA to transmit (as indicated on line 530) and prevents the free frame from going to the next GDA. DFL 533 is set via line 532 which then will cause this, and only this, GDA to transmit a frame during the inbound portion of this frame. NAND 535 produces a signal giving preference to the DSA over the GDA on line 523 in response to the XR/DSA output on line 528 indicating that the DSA will be transmitting, when a free bit on line 251X is available via inverter 542 to turn on NAND 531 if, and only if, a (inhibit free bit) request signal from NAND 529 exists simultaneously on line 530 so NAND 531 can trigger DFL 533 to give a positive value on line 534 to turn on NAND 535 when NAND 513 responds to an $\overline{A}, \overline{B}$, I time reset signal on line 515 while DFL 508 is off with line 528 positive because there is no DSA request. Thus NAND 535 signals the GDA OB line 543 (which goes to the outbound GDA to reset the BE, Bo and BNR latches — FIG. 4D) to turn on and resets GDA latch 521 via line 523. On the next frame DFL 508 will be reset by NAND 516 at J time to connect via lines 512 to operate NAND 511 to set DFL 501 if a free frame has been secured prior to I time of the next frame when NAND 513 turns on line 515. DFL 526 and DFL 533 are also reset by line 517 at J time. NAND 535 also resets DFL 521, although line 524 may remain on to prevent such resetting.

NAND 537 reacts to the DFL 533 signal on line 534 at inbound time IT by providing a GDA transmitting signal on G line 544 to the multiplexers 550, 551, 552, and 553 which transmit bits for the I, J, K, and L frame sequentially at the appropriate times over lines $b1$, $b2$ for multiplexer 550, lines $b3$, $b4$ for multiplexer 551, lines $b5$, $b6$ for multiplexer 552, and lines $b7$, $b8$ for multiplexer 553. The multiplexers are operated to select I, J, K, and L lines respectively by permutations of A and B input line values. Initially at I time, A and B potentials are low, so lines I1 to I8 are connected from preset ID bit storage to bus lines $b1$–$b8$ to emit a fixed identification on bit lines $b1$–$b8$, at I time. NAND gates 554 and 556 are gated by line 544 through inverting drivers 555 and 557 to bus lines $b1$, $b2$ and when the multiplexer emits outputs, they are connected thereby to the bus lines. Similar NANDS 558, 560, 562, 564, 566 and 568 are connected through inverting drivers 559, 561, 563, 565, 567, and 569 to bus lines $b3$–$b8$ respectively, in the same way.

After I time, the data selector 570 for bits J1–J4 connects to multiplexers 550 and 551 and lines J5–J8 from cable 370 from the DSA connect to the multiplexers 552 and 553. Data selector 570 supplies data from the DSA or the GDA interrupt priority circuits depending upon the value of DFL 508 output on line 528, which when off indicates that there has been no DSA request for transmission, so the GDA lines are connected by selectors 570, 571 and 572 to the selector lines, which are clocked to reset and store the values present in the GDA or DSA at I time.

If the GDA lines are connected by selector 570, then GDA interrupt priority lines are connected to J1–J4.

LOOP ADAPTOR (LAD) INBOUND TRANSMISSION

Figure 6B:
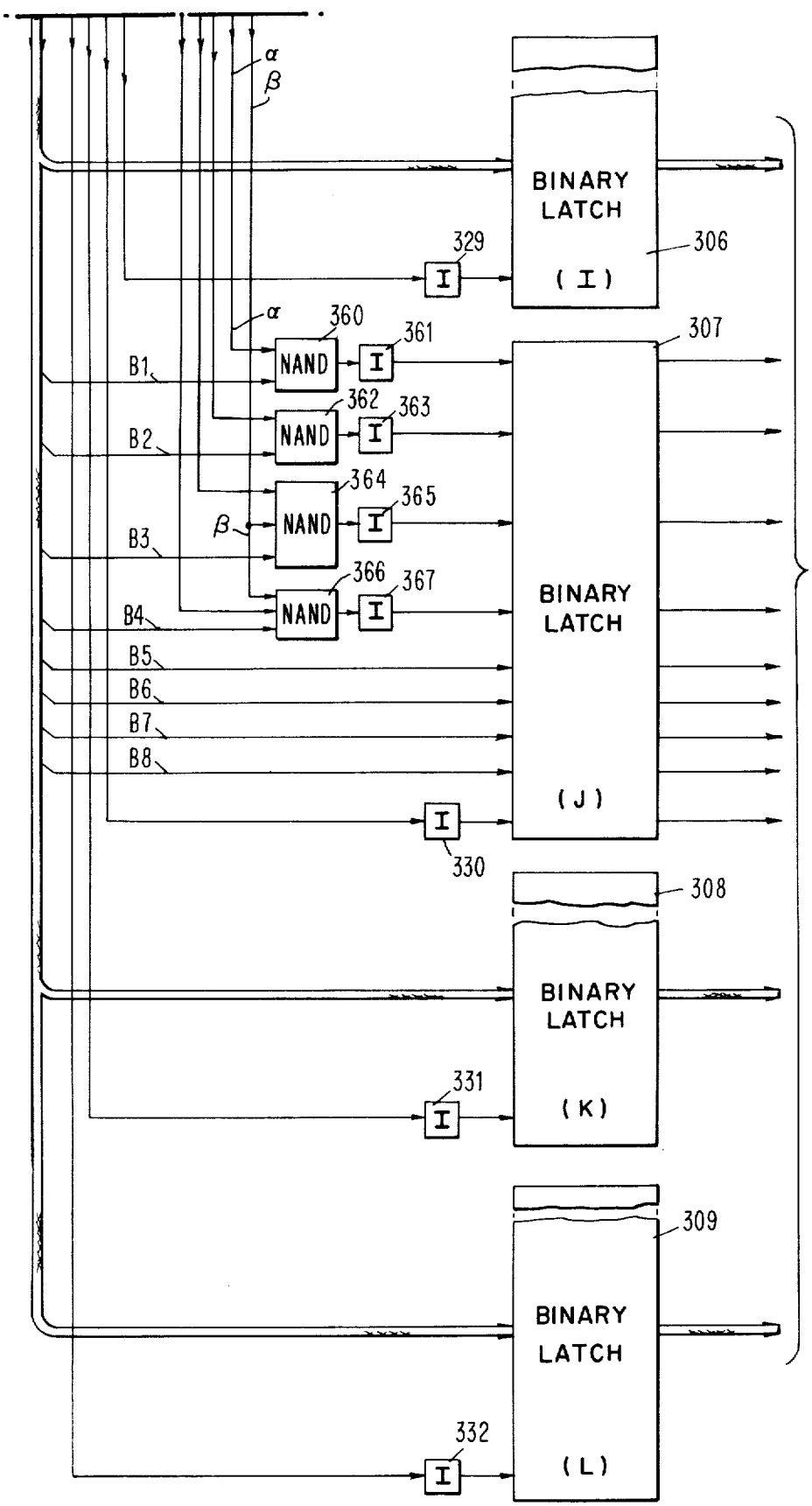
FIGS. 6A and 6B show a detailed electrical schematic block diagram of a Loop Adaptor (LAD) Inbound (IB) transmission unit.
Figure 6:
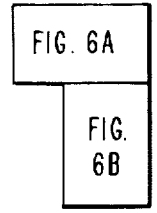
FIG. 6 shows the relationship between FIGS. 6A and 6B.
Figure 6A:
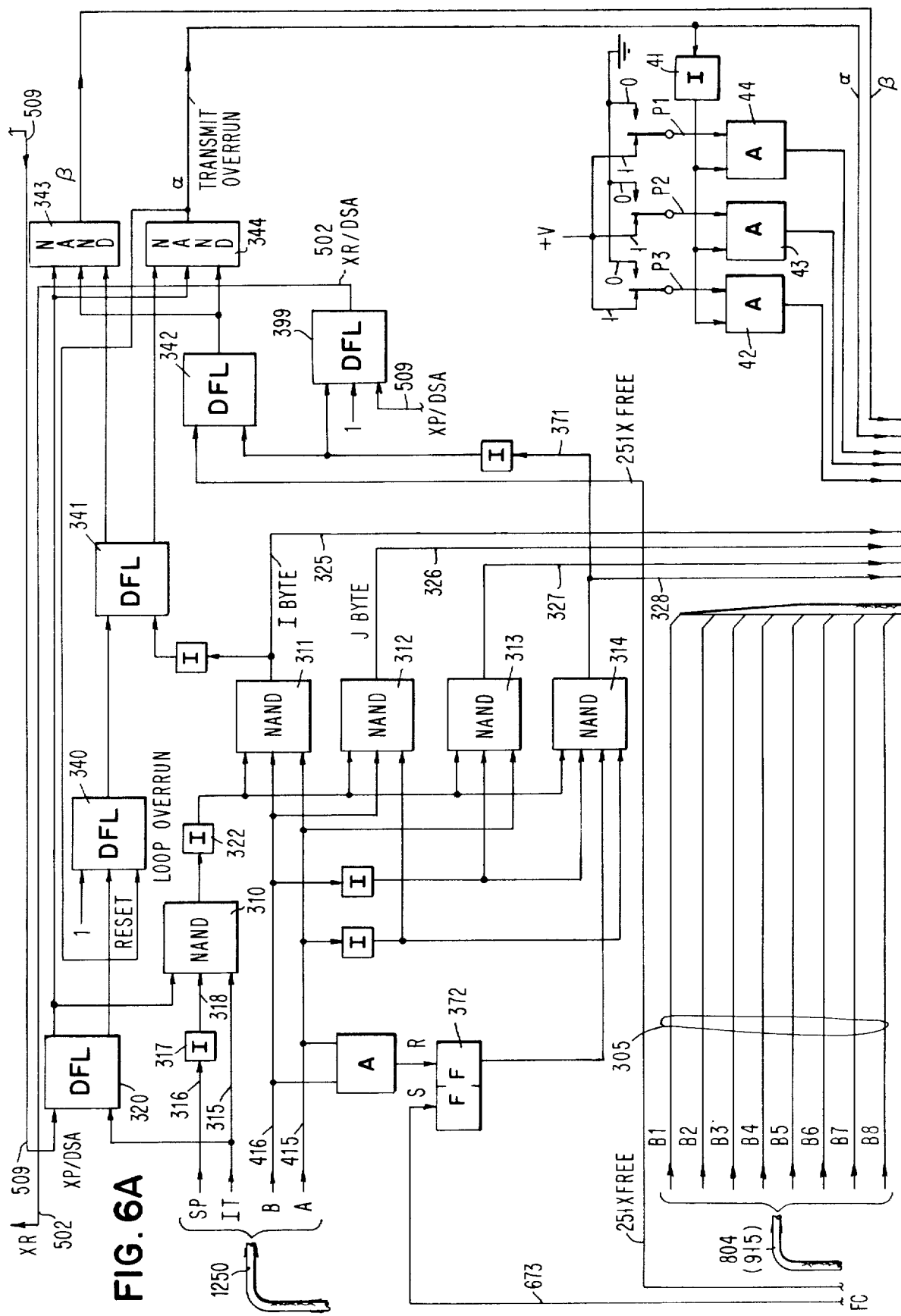

FIGS. 6A and 6B show the circuit of the LAD inbound. The bus 305 connected to cable 804 or 915 returning from the loop to the inbound portion of the LAD carries a frame into a one frame buffer register comprising bytewide latches 306, 307, 308, and 309 for each of serial bytes I, J, K, and L respectively of the frame.

When inbound time occurs, NAND 310 received a positive input on IT line 315, and at the moment of the positive sampling pulse SP, line 316 is positive driving inverter 317 too provide a negative input on line 318 to NAND 310. If no transmission pending signal is received on line 509 from the GDA IB or IMA 11, DFL latch 320 is reset by the inbound time signal IT on line 315, so line 321 is 0 providing NAND 310 with an input of a 1 and two 0s to provide a 1 output to inverter 322 which provides 0 inputs to NAND's 311, 312, 313, and 314, which produce 1 outputs most of the time except when their AB code is 1, 1 at which time the I, J, K or L byte clock line 325, 326, 327 or 328 respectively is turned on to 0 which yields a 1 from inverters 329, 330, 331, and 332 in FIG. 6B which provide clock inputs to set the respective latches 306, 307, 308, and 309, only one at a time in that order to receive the I, J, K, and L bytes of the frame respectively in sequence in serial order during a single inbound time interval, for each synchronization pulse on SP line 316. Note that a FF 372 is provided for storing whether a valid frame check FC occurred via line 673 from DES 257. If FF 372 was not set, NAND 314 remains off preventing inbound transmission of the frame. If the LAD 12 is connected to IMA 11, line 673 is tied to +V because no frame checking takes place on the bytewide loop 804.

The identification of every device on the loop feeding a LAD can have, for example, the first 3 bits of the I byte equal to 110 and bits 4-8 reserved for identification of the individual devices on the loop. The LAD inbound can have its I byte latches 1-3 permanently wired to certain specific fixed values, as for example, they could be set to 1, 1, and 0 and the other 5 bit locations 4-8 are used for address data received from devices on the loop. When the LAD itself transmits, under these conditions, then bits 4-8 are zeroes to identify it as a LAD transmission as opposed to a device on the loop transmitting because the devices would have some bits "on " from bits 4-8, but the LAD would have bits 4-8 as zeroes.

LAD INBOUND OVERRUN CONDITION

When a frame is received by a LAD, it is latched in the four latches 306-309 and the LAD attempts to transmit this on to the IMA 11 or to the bytewide loop 804 via the GDA 21 if the DES 257 indicated a valid frame via line 673.

If the LAD IB receives another frame before it transmits the first frame, it is in an overrun condition. This is so even if it has received only a free frame, that is, even when it receives a frame without any information, it is also in an overrun condition.

An overrun condition exists whenever the transmission pending signal XP exists on line 509 in FIG. 6A simultaneously with an inbound time signal on line 315, which means that another frame is being received so DFL 320 is on showing that an overrun condition exists. DFL 340 records the fact that an overrun condition occurred and it is reset only when NAND 344 transmits an interrupt (where J1 = 1) frame to IMA 11 indicating that an overrun condition has occurred. The inverter 41 turns on the ANDS 42, 43, 44 to connect the interrupt priority signals to lines J2-J4, respectively. DFL 341 receives the output of DFL 340 and it is clocked by I byte clock time from NAND 311. Then NAND 344 tests DFL 342 as to whether a free frame has been received at L byte clock time. If a free frame has been received, as indicated by a signal on the free bit line 251X, then NAND 344 transmits its overrun interrupt frame IB on cable 370 to the GDA or IMA. Once the overrun has been transmitted all the latches are reset to the normal state again.

LAD INBOUND

The clock lines 1250 decide when binary latches are to be latched or not. By gating the clock lines 1250 into various latches at the appropriate time the decision is made as to which 8 bits will be latched into which set of latches from bytewide bus 305. The NAND circuits 310-314 generate timing signals based upon the SP, IT, B and A clock waves which are all signals on timing lines 316, 315, 416, and 415 respectively. SP is a sample pulse for lines 316, 315, 416, 415. When an IT pulse occurs and the sample pulse SP pulse occurs, and there is no transmission pending via the DSA 509, the bit lines of bus 305 are sampled and placed in the appropriate latches 306-309 of the LAD.

With respect to the LAD inbound connection to the IMA 11, if LAD 12 has just received a frame, XP/DSA 509 is used to turn on DFL 320. If transmission is pending, then binary latches 306-309 have been previously loaded and they should not be overwritten. A overrun is noted via DFLs 340 and 341 and NAND 344. The clock waves generate times by NANDing with the appropriate elements. AB time, $\overline{A}B$ time, $A\overline{B}$ time, an $\overline{AB}$ time can be obtained for operating the latches serially in the proper order. NAND 311 responds to inbound time, the pulse not transmission pending, not B and no A, (0,0). NAND 312 responds to $\overline{B}$ and A. NAND 313 is operative for B, $\overline{A}$, and NAND 314 is operative for B, A.

The I byte is not modified before it is latched. The J byte is modified to show whether the frame is a free frame. If so, then the DFL 342 responds to the free bit line FF 251X showing that empty frames are coming in on the 8 byte lines. The latches can be stroked or not stroked. This corresponds to transmitting a command request XR inbound. Note that a GDA 21 attached to a LAD 17 will change the I byte to that of the LAD for inbound transmissions so that the command request will have the proper I byte. A buffer in the IMA can be emptied into the free frame. If the frame is busy, it is to be transmitted into the IMA/GDA. In the case of an overrun, two successive inbound frames are received by the LAD before the LAD can transmit the first frame out to the IMA or GDA and a DFL 340 is set indicated by loop overrun. A free frame results in a transmission of an overrun if the DFL 341 has been set.

At the J byte input NAND 362 has a P1 input (interrupt priority 1) set by switches shown in FIG. 6A. This is gated into the IMA/GDA as described above. Value α corresponds to transmission requests in which case the LAD acts as a DSA and initiates a transmission request XR at the end of byte L time, after it has received something. It can report a complete frame was received, or a free frame has been received, leading to a command request or an overrun. The gating shown connected between lines 305 and binary latch 307 including NANDS 360, 362, 364, and 366 as gating necessary to transmit overrun, command requests or the interrupt priority.

FIG. 10 shows the deserializer 257 of FIG. 1B in block diagram form. Data line 14 and clock line 255 from the low speed loop enter the upper shift register 1200. Clock 255 clocks the data 14 bit-by-bit through upper shift register 1200 as shown in FIG. 12. Note that when eight bits have been accumulated in upper shift registers 1200, they are transferred into the lower output registers 1201 in response to appropriate control signals from 3-bit counter 1010. Register 1200 also has its data output lines connected via cable 1002 to the frame character recognition (FCR) unit 1003. FCR 1003 (shown in FIG. 11A in detail) provides the synchronization required by the deserializer 257 to properly recognize the timing boundaries of a complete frame, i.e., the beginning and end of each frame. FCR 1003 does this by sending a signal on line 1106 to the reset line of 3-bit counter 1010. Thus, counter 1010 is brought into synchronization with frame data on line 14. That insures that lower output register 1201 is properly loaded with respect to byte boundaries in register 1200.

Figure 13B:
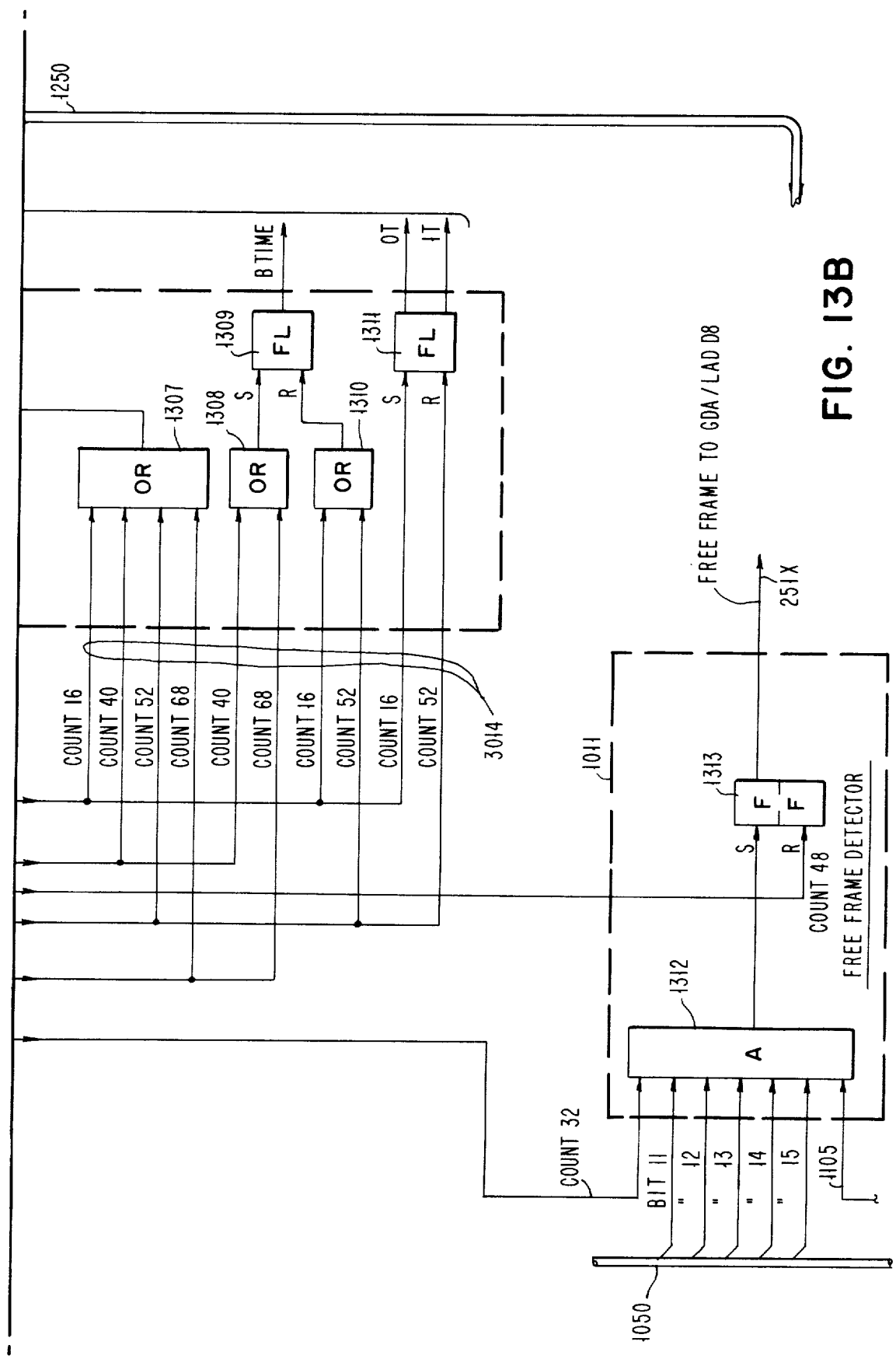

A free frame detector 1011 is loaded from the register 1201 via cable 1050 and it provides an indication of free frame FF bits in the proper frame bit positions which are 26'30 of a serial frame of the serial loop on line 2514 to LAD IB 17. Counters and decoders unit 1012 is driven by clock line 255. Unit 1012 provides a signal on line 1347 to FCR 1003 which produces an output on line 1106. The output on line 1106 resets unit 1012, to synchronize it, as well as counter 1010. This is described in greater detail below. The FCR unit also provides an input to frame timing generator 1013 on line 1105 which gates out the SP pulse on cable 1250 and the counters and decoders unit is connected via cable 1014 to connect 21 count signals to generator 10B as shown in FIGS. 13A and 13B.

Deserializer 257 requires a CRC OK signal on line 673 from its CRC checker 1400 shown in FIG. 14 as part of its frame synchronization process. When FCR 1003 is properly synchronized, it provides reset signals on line 1106 to counter 1010 and decoders 1012. FCR 1003 also provides signals on line 1105 to frame timing generator 1013 and free frame detector 1011. Generator 1013 drives the LAD with the appropriate timing signals via cable 1250 corresponding to the appropriate frame byte coming out of lower output register 1201 on cable 1050 (and 915 FIG. 1B). The LAD IB is designed to be totally asynchronous. For example, if generator 1013 is provided outputs on cable 1250 with all signals turned off or more generally if the SP pulse were missing, the LAD would not respond to any data supplied by register 1201 to cable 915 nor would it respond if A and B times occurred. The heart of the LAD IB 17 is triggered by the SP pulse. Without the SP pulse, the LAD IB 17 cannot function. If the deserializer is improperly synchronized, FCR 1003 will degate the SP pulse from generator 1013 and as a result the LAD will stop. On the total loop system, if a LAD IB stops, the associated GDA IB 21 will stall and the serial loop will cease temporarily to communicate with the IMA 11 and CPU 10 via the high speed loop 804. The bytewide loop 804 is asynchronous so it is not disrupted by this in any way. Counters and decoders 1012, when properly reset and synchronized, provide all of the timing signals required by the deserializer 257. Free frame detector 1011 provides an output on line 2514 to LAD IB 17 so the LAD IB can generate command frames. CRC checker 1400, when properly synchronized, will provide a valid CRC signal on line 673 to FCR 1003.

If FCR 1003 is not properly synchronized, the signal on line 673 will be used to try to return it to synchronization. Three-bit counter 1010 serves to load output register 1201 from register 1200. When there are seven new bits in register 1200, counter 1010 causes them to be loaded into register 1201 in parallel. When the eighth new bit is loaded into register 1200, it is brought immediately down to register 1201. Seven low speed loop bit times are provided in which to pass the data in register 1201, 1 byte at a time, to LAD 17 or a GDA, as appropriate. The deserializer of FIG. 10 is a general purpose device which can be used for the deserializer 257 as well as for the SERDES units 258 and 260 with appropriate connections to GDA 24 or 25.

SERIALIZERS

Figure 18B:
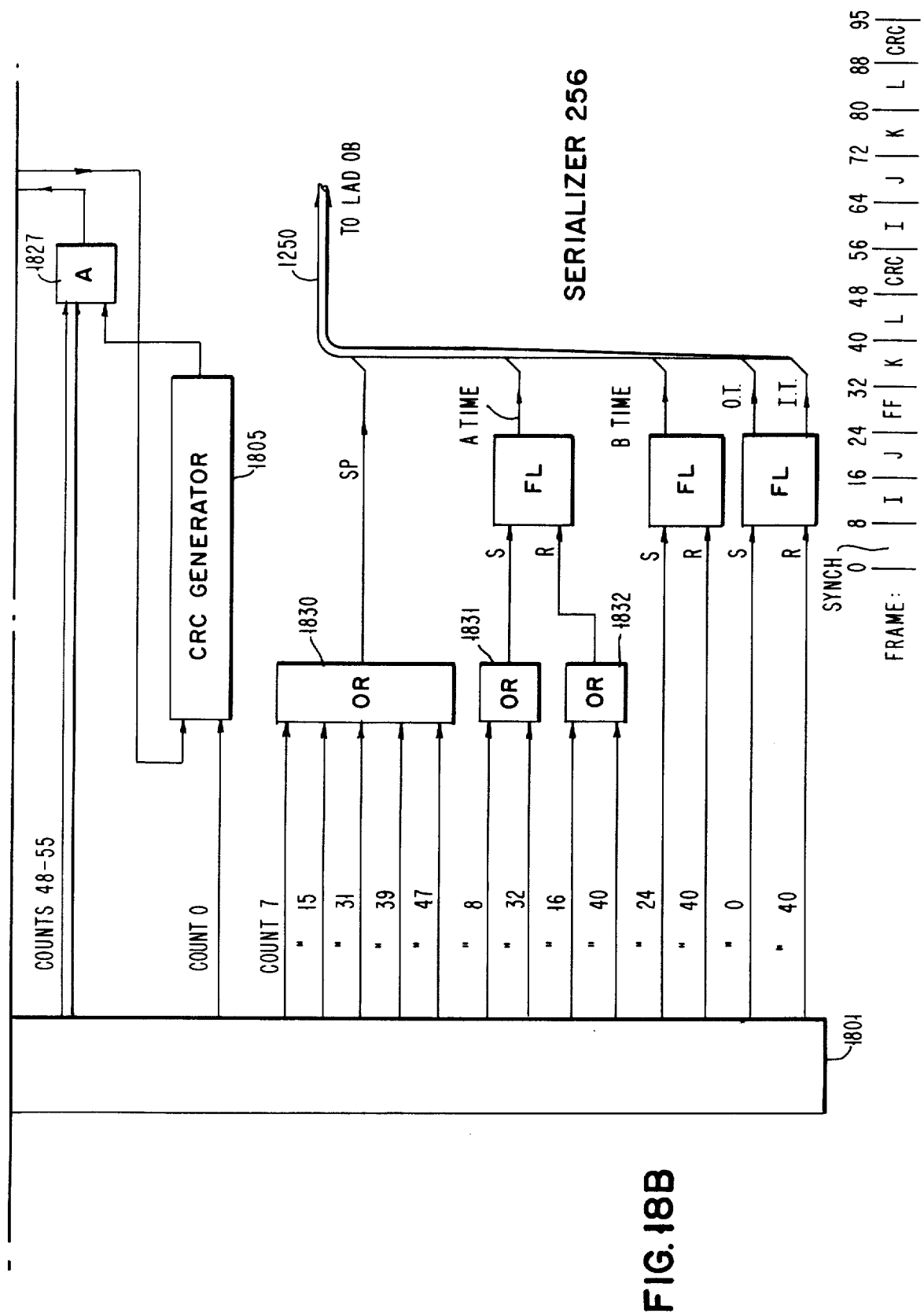

The serializer 256 of FIGS. 18A–18B requires unique timing which is not shared by the serializers in the SERDES units 258 and 260. It is the only serializer that takes a byte of data at totally different times because the bytes of data it receives are from an outbound frame, whereas the other serializers are adapted to provide bytes directed inbound in a sense. In other respects it is similar to other serializers because it must generate CRC signals and must supply signals to the LAD OB. In FIG. 10, data line 1202 is adapted to connect to the input to the serializer 1508 to a SERDES unit shown in FIG. 16.

SERDES

Frame Character Recognition Decoder (FCR)

Figure 11A:
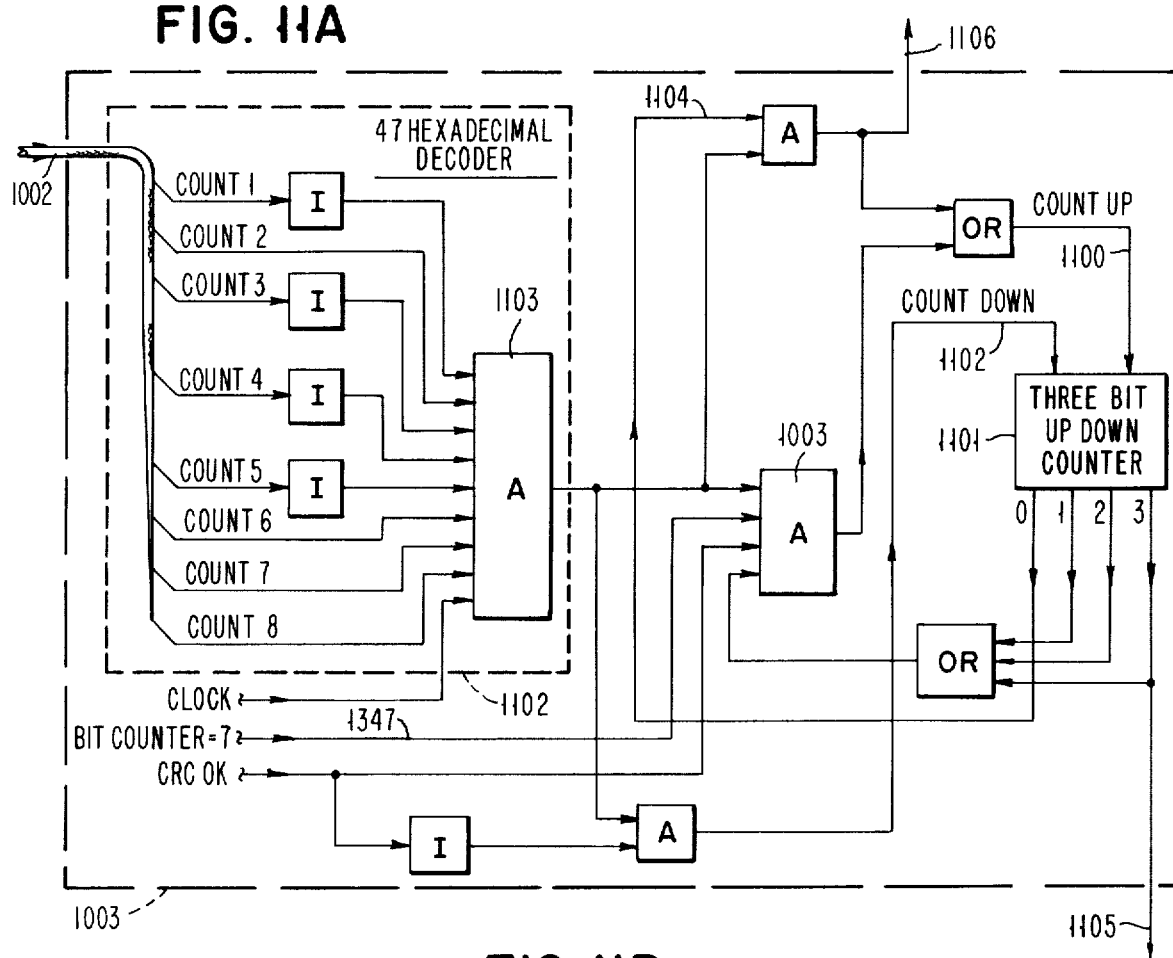
FIG. 11A shows the Frame Character Recognition Decoder (FCR) of the deserializer of FIG. 10.

FIG. 11A shows the FCR 1003 which includes a three-bit up-down counter 1101 that counts from 0 to 3 only, which means that it cannot count below 0 or above 3. In other words, it will not wrap around from count 0 to count 3, nor will it wrap around from count 3 to count 0. Basically, whenever a 47-bit hexadecimal (47 hex) pattern is detected, an input on line 1100 causes counter 1101 to count up. Whenever a bad CRC signal is sensed on line 1002, it will count down counter 1101. Counter 1101 has four output lines count 0, 1, 2, and 3.

Figure 11B:
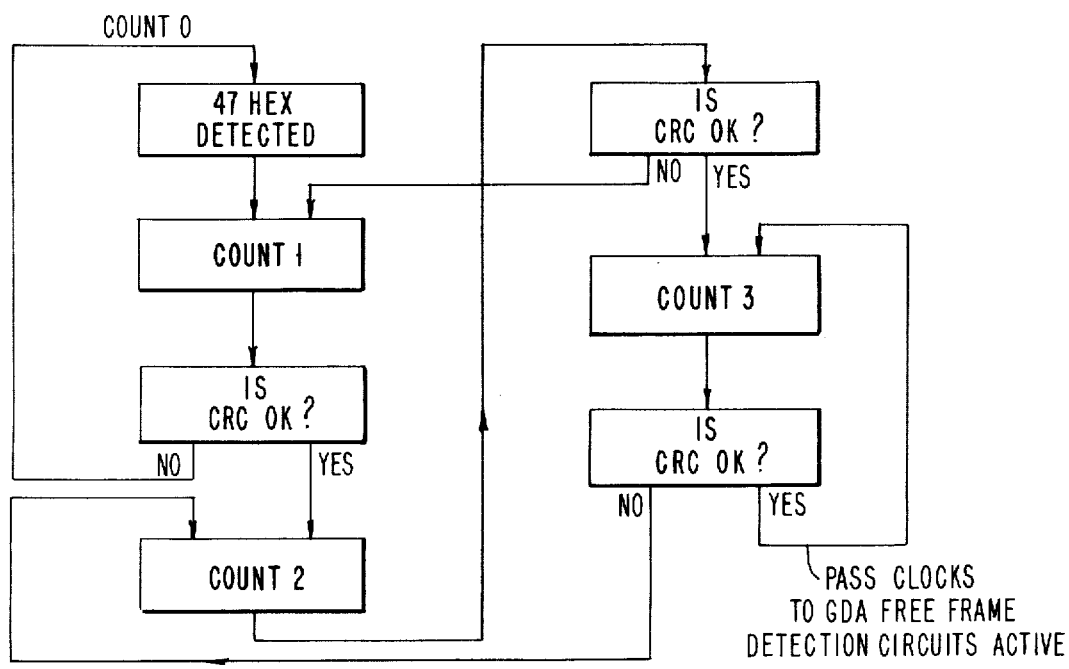
FIG. 11B shows the algorithm by which the FCR of FIG. 11A operates.

FIG. 11B shows an algorithm by which the FCR decoder 1003 operates. At count 0, counter 1101 looks for 47 hex. If 47 hex has been detected by decoder 1102, counter 1101 goes to count 1. Now, at count 1, one of two things can occur; that is, it can detect a bad CRC and it can detect another 47 hex. If a bad CRC is detected, the algorithm follows the arrow back to count 0. If a good CRC is detected, AND 1103 looks for 47 hex at the proper time, i.e., what it considers to be the beginning of the frame. Again if 47 hex is detected, AND 1103 also looks for another CRC. If 47 hex is not detected, no change occurs and the counter remains stable, since it is not getting any good CRC's and is not counting up and is not counting down. Consequently, counter 1101 is not in synchronization (synch). After having counted up three times, (finding 47 hex in the correct frame position and good CRC), counter 1101 will be in synchronization. A bad CRC, of course, will cause counter 1101 to count down. If enough bad frames have occurred, it will try to look for 47 hex all over again in a new bit position within the frame.

DESERIALIZER COMPONENTS

FIG. 12 shows the 3-bit counter 1010 and shift registers of deserializer 257. The 3-bit counter 1010 counts from 0 to 7 and constantly cycles. It receives a reset pulse from the FCR on line 1106 to cause the count to be set back to 0. Normally, it is counted by the clock pulse 255 which comes into the SERDES, and the clock pulse 255, as noted, also clocks data into DFL 1 and on through DFL8; that is, from DFL 7 to DFL 8, from DFL 6 to DFL 7. The DFL is constructed so that there are no Logically hazardous conditions whereby a bit is lost during a normal serialization operation. At count 0, the bit from DFL 8 is clocked in DFL 16 and at count 7, the bits from other DFL's through 7 are clocked into DFL's 9 through 15. This allows preservation of a byte of data for various manipulations, such as detecting free bits FF and also passing 1 byte at a time to the GDA or LAD interface without requiring it to be valid for more than 1 bit time.

FIGS. 13A and B show a 96-bit counter 1301 0 to 95 plus free frame detector 1011 and frame timing generator 1013 which are parts of the deserializer of FIG. 10. The serial loop clock 255 normally counts up the counter 1301. The reset line 1106 resets the counter to 7, as is well known in the art of digital logic. The decoder 1302 has various lines coming out, labeled count 16 and so on. These are obviously various decoders. Decoded values of 17, 25, 41, 49, 53, 61, 69, and 77 are supplied to an OR or to an AND which generates the SP pulse at count 3 of the 3-bit counter. The 0 to 95 counter 1301 is a wrap-around counter so that after 95, the next count is 0. Various flip latches ANDS and ORS will provide A time, B time, outboud time, inbound time and an indication of a free frame together with the proper register positions, and all of this is analogous to the normal timing required by a GDA.

The various decoded values for A time, B time, etc. show that A time and B time for the outbound frame correspond to an appropriate byte, being in the DFL's 9 through 16. However, the clock is "set ahead" a little bit for the inbound frame to make sure that the GDA is properly "armed" before the next inbound frame has to be serialized and transmitted on the loop.

At the bottom of FIG. 13B is a free frame detector 1011. It includes a flip flop 1313 which is set if the free frame FF bits are found in the appropriate places and register values from DFL's 9 through 15 of FIG. 12 via cables 1050 and 204 or 915. It is reset at the beginning of every frame so that a free frame is remembered for only one frame time whether it is used or not.

In FIGS. 13A –B decoder 1302 decodes counter 1301 and provides the various decoded signals for the various other operations required by the serializer and deserializer. Appropriate lines and bus lines emanate from decoder 1302. Frame timing generator 1013 eventually provides the appropriate timing pulses required by a GDA or a LAD so that the appropriate byte can be decoded. Note that decoder 1303 decodes the appropriate pulses required for an SP pulse, as well as FL's 1306, 1309, and 1311 driven by OR's 1305, 1307, 1308 and 1310 and count lines 16 and 52 to provide A time, B time, outbound time, and inbound time. AND gate 1304 providing the SP pulse is gated only when line 1105 which carries count 3 from the FCR 1003 is active. Thus, when the SERDES is not in sync, line 1105 is inactive. Thus, no SP pulse is generated. Without the SP pulse, since both the LAD and GDA are asynchronous and driven by the SP pulse, they simply stop and no gating or timing occurs although A, B, OT and IT fluctuate in the usual way.

Free frame detector 1011 detects free frames from both the GDA and the LAD on line 251X. Detector 1011 contains AND 1312 which examines the bits 11-15 on cable 1050 at count 32 time together with the output of line 1105 which is the synchronization line from FCR 1003. Count 32 time is the time at which free frame bits 26-30 will be in the lower output register 1201 bit positions 11-15. AND 1312 sets flip-flop 1313 at the appropriate time when the bits 11-15 are all 1's at count 32 time and the FCR line 1105 is in its 1 state. Flip-flop 1313 is reset at count 48 time after the K and L bytes have passed so that a free frame signal detected for one frame will not be used erroneously for a different frame.

The CRC checker 1400 shown on FIG. 14 uses a simple algorithm. It feeds all the bits through the DFLs at the appropriate time; it makes a check for a predefined pattern which, in this case, is all 0's. If all the bits and the CRC byte have been fed through properly, and the CRC register 1401-1408 was appropriately initialized at the very beginning (not the CRC reset is equal to bit 7 time) then we should get all 0's. The table in FIG. 15 shows how the algorithm works; namely, say that for four zeros and four ones, 4 bit times later, the result would be all zeros if all zeros were coming in so the CRC register would then have all zeros and the AND 1420 would provide a CRC OK signal.

DFL's 1401-1408 form a shift register which is clocked from loop clock line 255 via AND 1410 and line 1411 in response to line 1354 from decoder 1302 which provides outputs at count times 8-24, and 32-56 for the I, J, K, and L outbound bytes as well as the cyclic redundancy check bits 48-55. Further, data is supplied to DFL 1401 of the shift register via XOR 1409 which has one input connected to loop data line 14 and another connected via line 1412 to the 1 position output of DFL 1408 so that if a 1 has been stored in DFL 1408, no data on line 14 can enter DFL 1401. FIG. 15 shows a CRC byte starting with four 1's and four 0's and how it progresses in the checker 1400 from time I to time V with the bits in reversed order of our usual way of counting in the shift registers. As successive bits pass in as zeroes to DFL 1401 from XOR 1409, eventually all of the bits are zero at time V. The 0 outputs of DFL's 1401-1408 are connected via lines 1424-1431 to AND 1420 which detects a condition in which all bits are 0 which causes the CRC OK signal to appear on line 673. The DFL's 1401-1408 are reset to zero in the 1 positions at count 7 by a signal on line 1347. This sets them up for the next frame checking sequence.

FIG. 16 shows the serializer 1508 which is a portion of the SERDES of FIG. 34. The serializer 1508 goes with the previous deserializer of FIG. 10. The data bits are fed through to shift register 1501 from the deserializer 257 on line 1202. If the particular attachment to the SERDES (a LAD or a GDA) is not transmitting, then all bits will just be funneled right through. Nothing will be changed.

Figure 17:
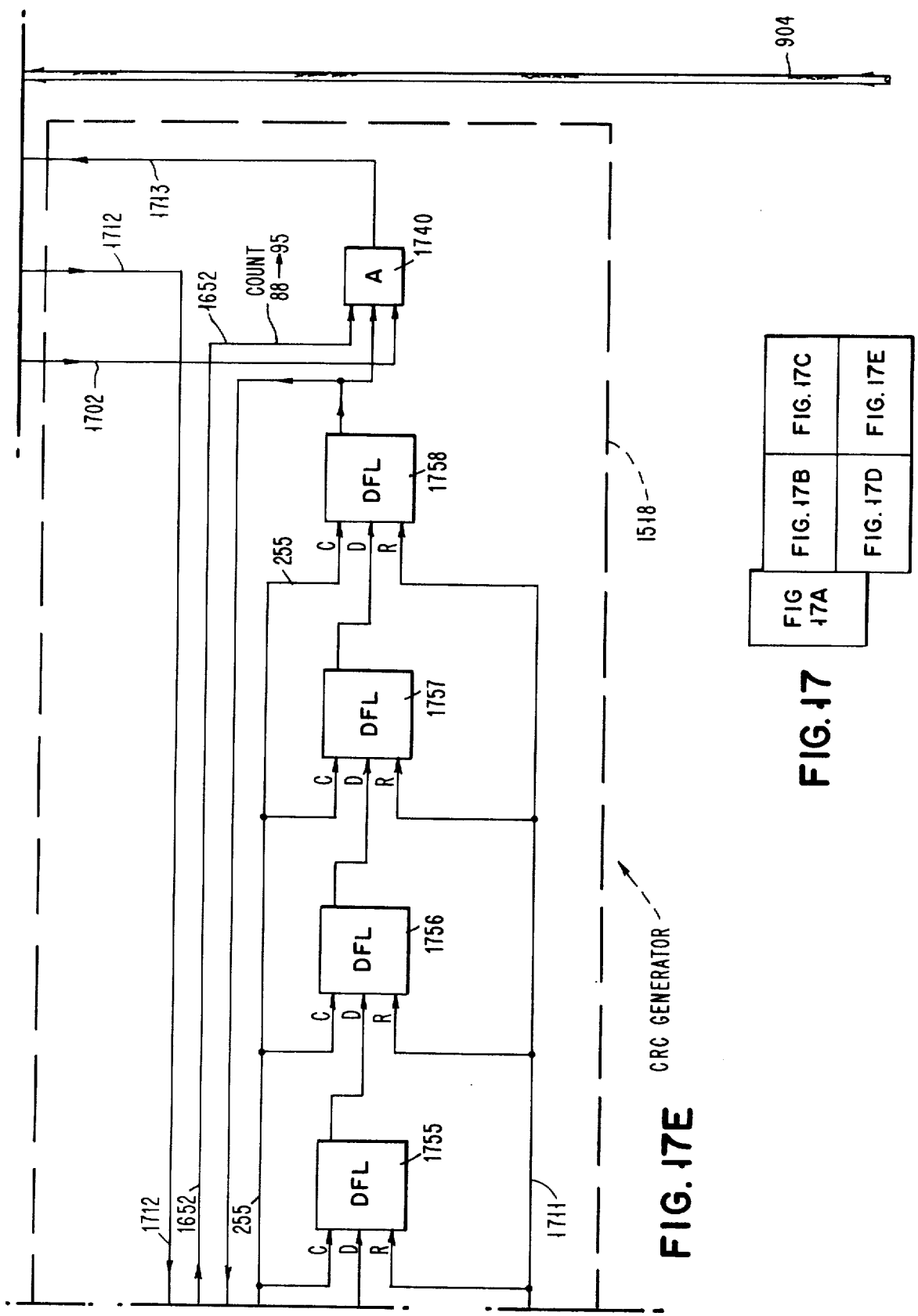
FIG. 17 shows the relationship among FIGS. 17A-17E.
Figure 17A:
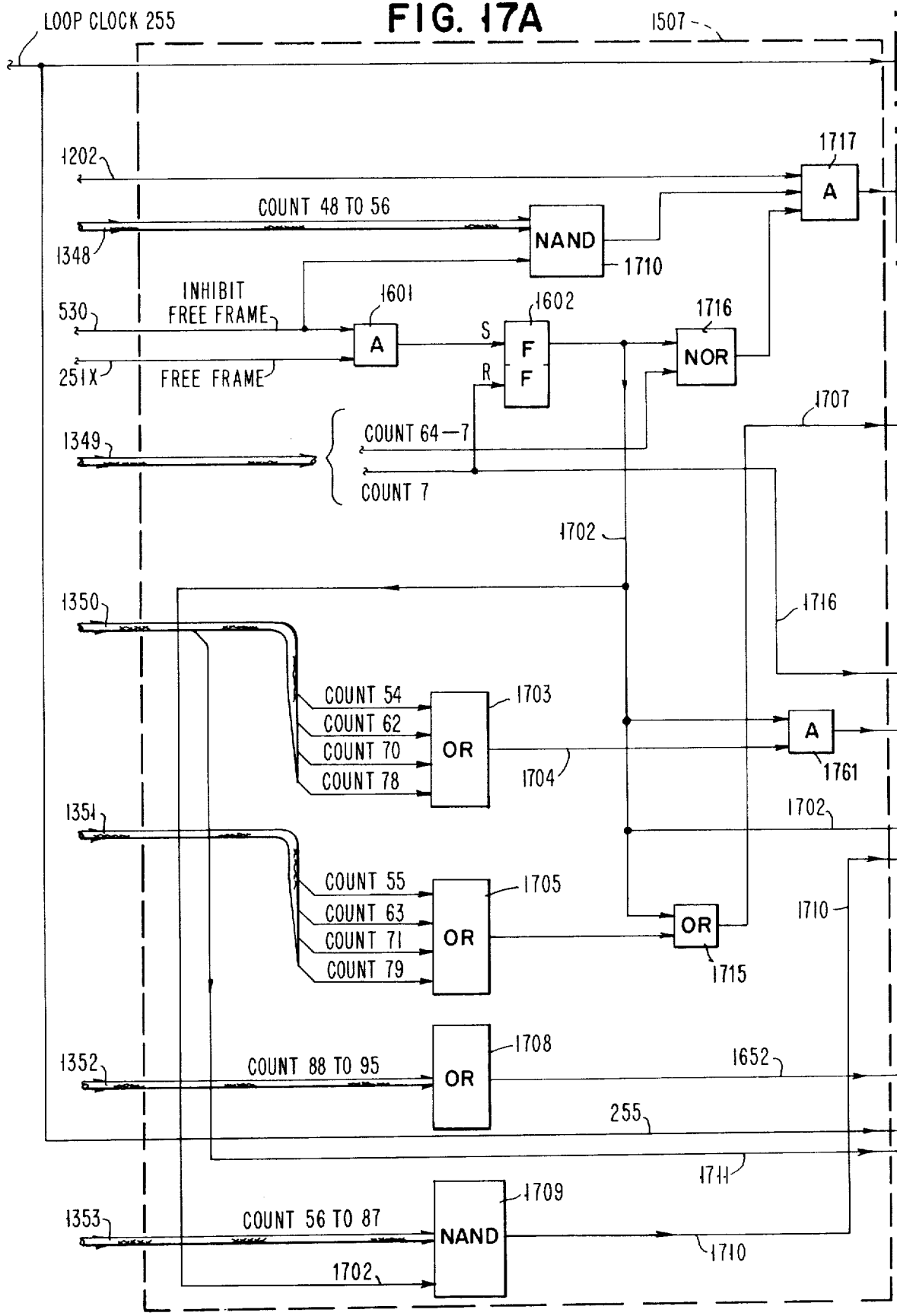
Figure 17B:
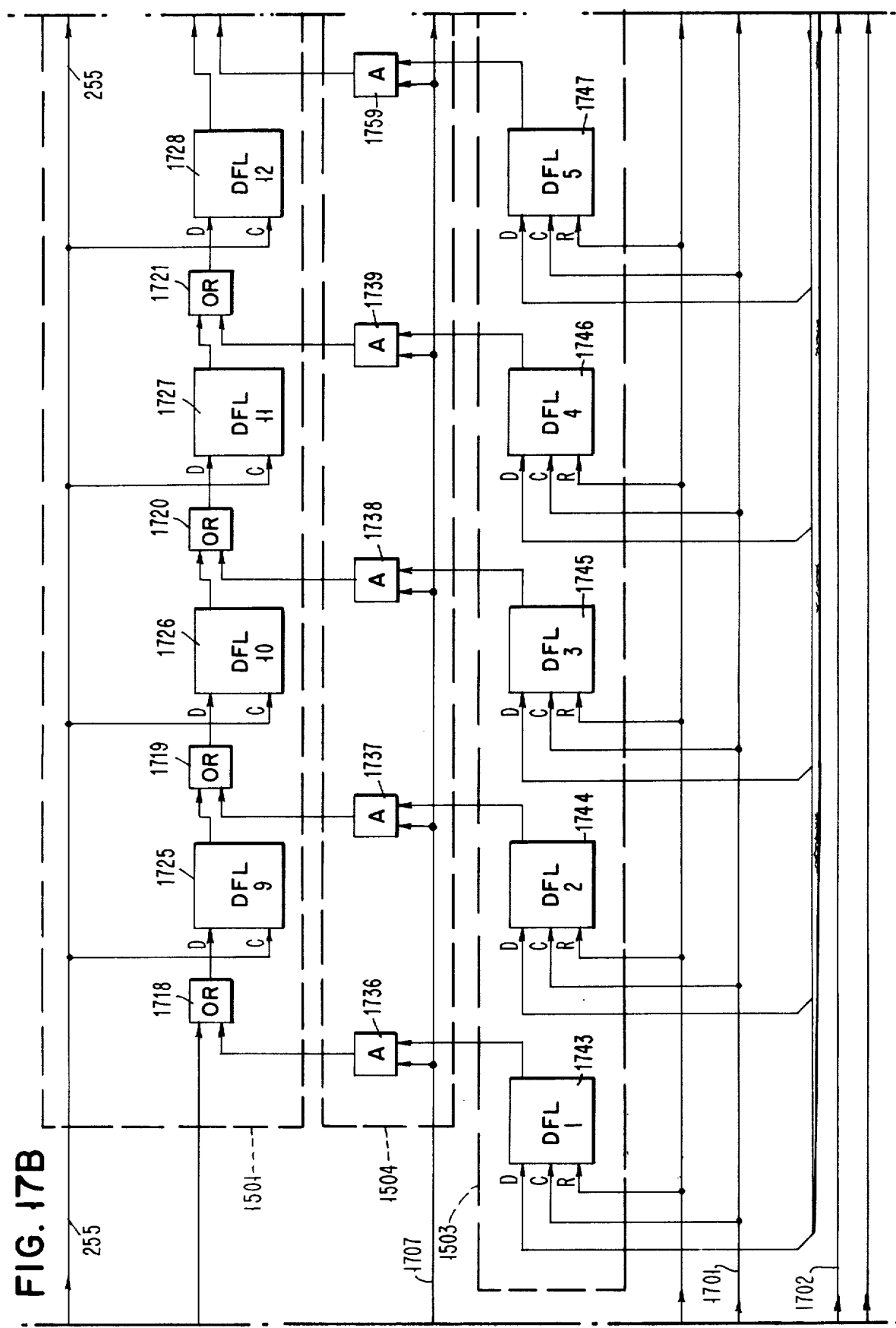
Figure 17C:
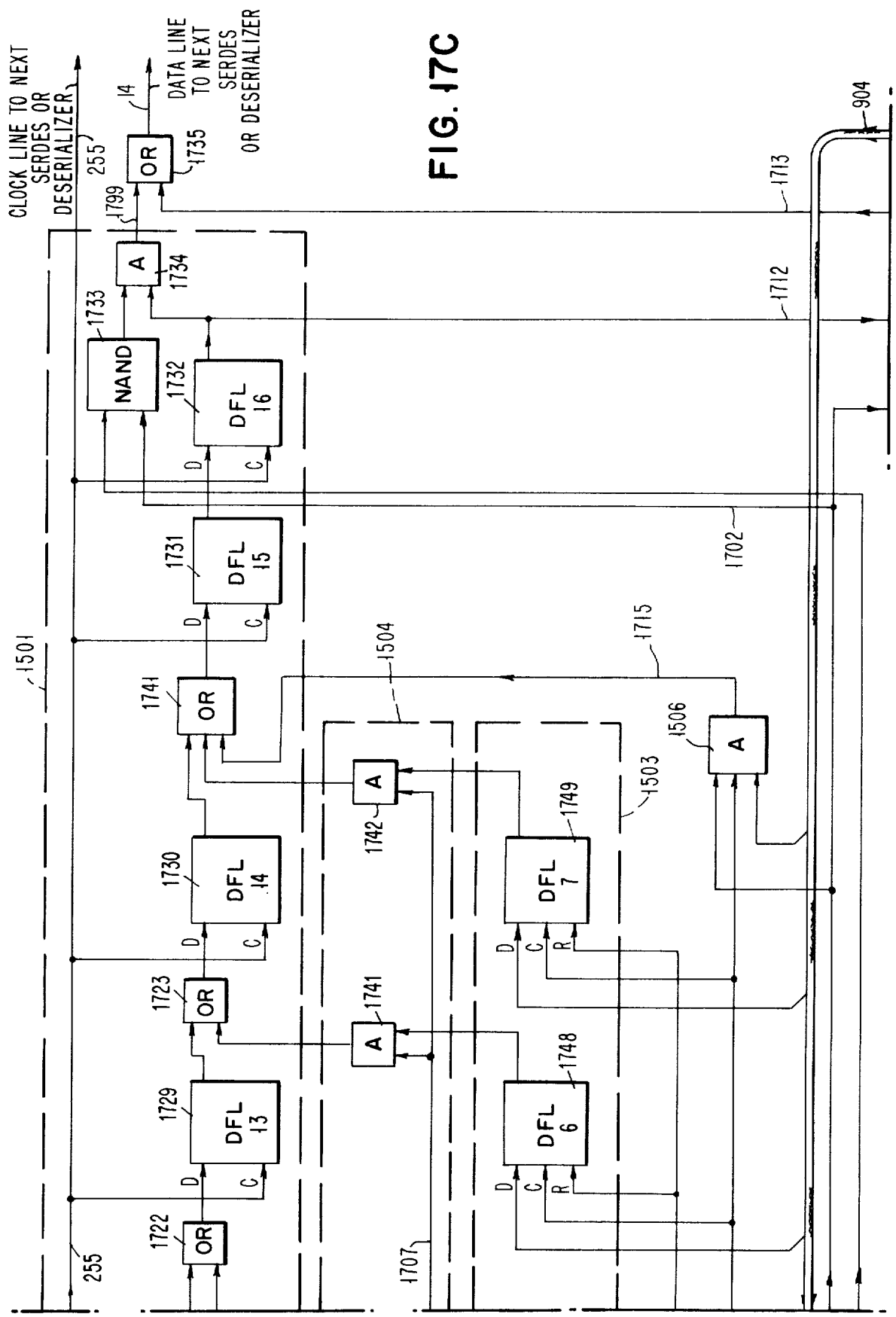

FIG. 16 and 17A-17 show the serializer of the SERDES composed of shift registers 1501 which includes DFL's 1725-1732 with one for each of 8 bit positions. Bytes are loaded in parallel into input registers 1503 with a DFL 1743-1749 for storing each bit of the byte supplied to registers 1503 on cable 907. Data in input registers 1501 is gated via gates 1502 (ANDS 1736-1742) into shift registers 1501. The data is serialized out of shift register 1501 1 bit at a time for each time that clock line 255 rises to pulse the clock lines of DFL's 1725-1732. NAND 1733 is provided to assure that all data has passed from the previous SERDES when the outbound portion of the frame time is appropriate for gating. The input registers 1503 include only seven DFL's to receive inputs from cable 907, but there are eight DFL's 1725–1732 in shift registers 1501. Thus the 8 bit is loaded in parallel directly into DFL 1731 via gate 1506 and OR 1724 while bits 1–7 are loaded into DFL's 1725–1730 via registers 1501 and gates 1502. CRC generator 1518 is analogous to the CRC checker of FIG. 14 except that its output is gated by ANd 1759 into OR 1714 to be passed out on data line 14, during counts 88–95, when line 1702 is "on". OR gates 1703, 1705, 1708, and 1709 provide appropriate timing signals for the serializer in response to inputs on cables 1350–1353 generated by the decoder 1302 shown in FIG. 14.

FIG. 34 shows the general interconnections of the serializer 1600 of FIG. 16 and the deserializer 1000 of FIG. 10 with line 673, cable 204, line 2514, cable 1250, cable 904, line 530 interfacing to a GDA and lines 14 and 255 with loop clock and loop data, respectively, coming into deserializer 1000 and leaving serializer 1600.

In FIG. 17A there in an AND gate 1601 combining the inhibit free frame and the free frame signals. If this is attached to a GDA, and the GDA wants to transmit, it must have received the free frame FF signal to set flip-flop 1602. Basically, flip-flop 1602 will set up the serializer portion to: (a) accept data from its attached GDA, LAD, and (b) to inhibit any data from passing through from the outbound portion of the SERDES into the inbound portion of the SERDES. Also it will set up the CRC generator 1518. At the appropriate time, the 8-bit CRC code will be gated via AND 1740 and OR 1714 onto the loop 14. Again, there is a need to set up the GDA to pretime the GDA so it will deliver the correct byte at the right time. The timing is carefully worked out so that at counts 54, 62, 70, or 78 which sould correspond to I, J, K, and L time, a byte is loaded into the bottom row of DFL registers 1503. Note that there are only seven DFL registers 1503. The 8th bit gets loaded into DFL 16 in the top row of registers 1501 because it must be transmitted immediately and, of course, it should be understood that transmission occurs in reverse order so that bit one (earliest) would be on the right and bit 8 (latest) would be on the left. In an I-byte is loaded and it is desired to transmit an I-byte, the first bit of the I-byte enters the second to last DFL 15 and it is immediately clocked into the last DFL 16 at the right time and then out onto the loop 14. The other seven bits are loaded into their appropriate DFL's 1–7 on the bottom and then get reloaded into the top registers 9–15 and serialized out. After going through a couple of bytes, one can see that at count 54 the system loads the bottom registers 1503 from cable 904, in parallel. At count 55 ORs 1705 and 1706 and AND 1704 transfer data to the upper registers 1501. Now at count 54, the I 1 bit is loaded into the second to last DFL 15 via AND 1506, line 1715 and OR 1741. At count 55, the bit moves into the last DFL 16 and at count 56 the bit goes out on the loop. The next bit is loaded into the DFL 7 of the bottom set of DFL registers 1503 at count 54. Then the bit transfers into the DFL 15 at count 55. As the first bit is transmitted onto the loop 14, the bit goes into the last DFL 16, and so on. The loading of the DFL 1501 is inhibited with a line 1707 which is generated from a combination of the bit times, and also line 1702 so that when this GDA is not transmitting, nothing will be loaded into the DFL's above and data will be passed through the SERDES 258, 269 without change. Also, note that the bottom of the CRC generator 1518 is gated at the right time into the data line to the next SERDES, and at that time only. Any of the previous DFL's on the top are prevented from transmitting their data, and one can think of this as simply data which is just thrown out at the last DFL. If this SERDES is not transmitting, then obviously lines going into the OR gate on the top right-hand corner, will be at zero, the other lines will have been met in such a way that all the data is just flushed through.

FIGS. 18A–18B show a serializer adapted for connection between the LAD OB sending data from the high speed loop to the low speed loop deserializer-serializer (SERDES) 258, 260 units. Serializer 256 has its input attached via cable 904 to the LAD OB and drives all succeeding SERDES units 258, 260 on the serial loop 14, 255. The serializer 256 creates the synchronization byte which is used by all succeeding SERDES 258, 260 following it on the loop 14, 255 to adjust to proper bit synchronization with respect to the frame. It also creates the free frame FF bits to be used by all SERDES 258, 260 so each can supply its associated GDA 24, 25 with a free frame signal so the GDA's can contend for all free frames on the serial loop to transmit to the CPU 10, via IMA 11, LAD 12, GDA 21 and LAD 17 in inverse order. The bit counter is not attached to a Frame Character Recognition unit (FCR) becuae it is the first bit counter on the serial loop and every succeeding SERDES must get into synchronization with it. Thus it automatically generates the standard of synchronization to which other units must conform.

Decoders 1801 provide various counts 7, 15, 31, 39, 47, etc. which in turn provide timing signals A, B, OT, IT, and SP for the LAD OB on cable 1250 in FIG. 18B. These timing signals (A, B, OT, IT and SP) are supplied to the LAD OB such that it provides its outbound data to the serializer in time so that the serializer can put it on the loop for succeeding SERDES to decode the bytes accurately. This scheme is analogous to the transmission scheme used by serializers farther down the loop except that the first serializer is required to serialize outbound data whereas all succeeding SERDES deserialize outbound data and serialize inbound data. The bit serializer portion 1802–1804 of this serializer and the CRC generator 1805 are completely analogous to the SERDES units except that there is no inhibit free bit unit or frame character recognition unit and the timing is simplified because this serializer takes the data, serializes it and appends the proper CRC code to it. The only inbound timing given to the LAD OB is for the purpose of resetting the LAD OB so the LAD is notified that the frame has been serialized. No other inbound timing is necessary either for the serializer or its attached LAD OB.

Figure 20D:
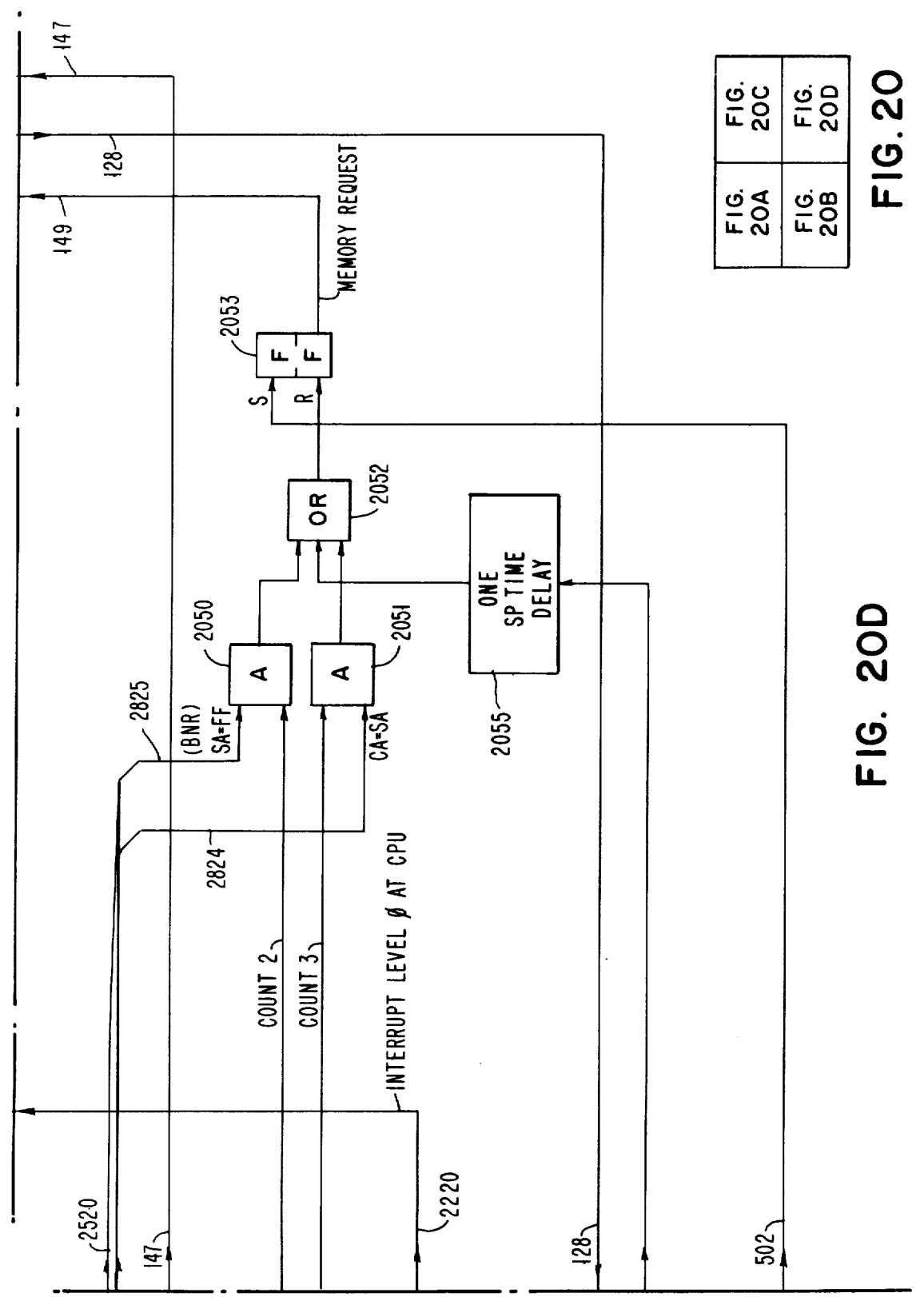
Figure 20A:
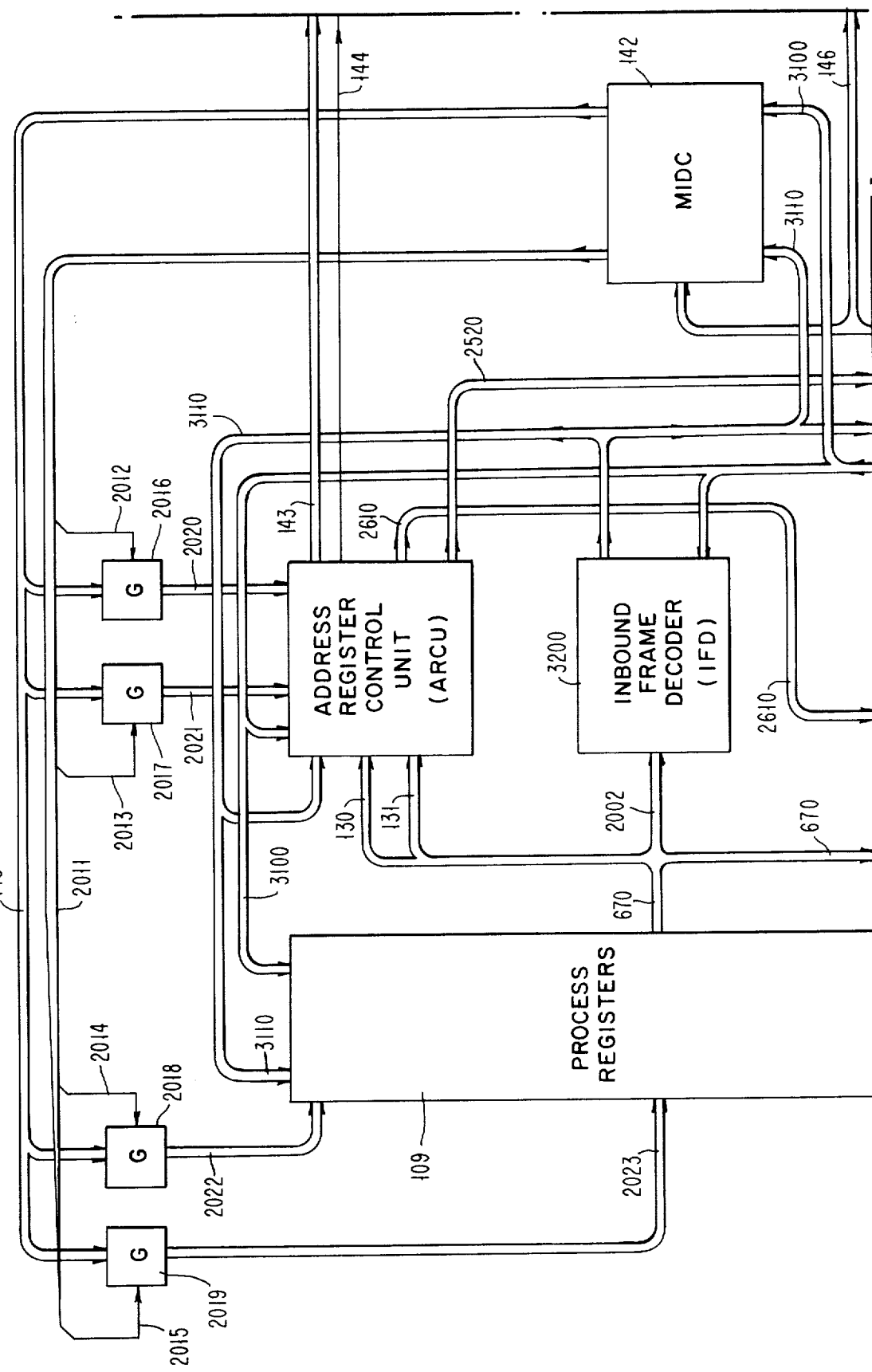
Figure 20B:
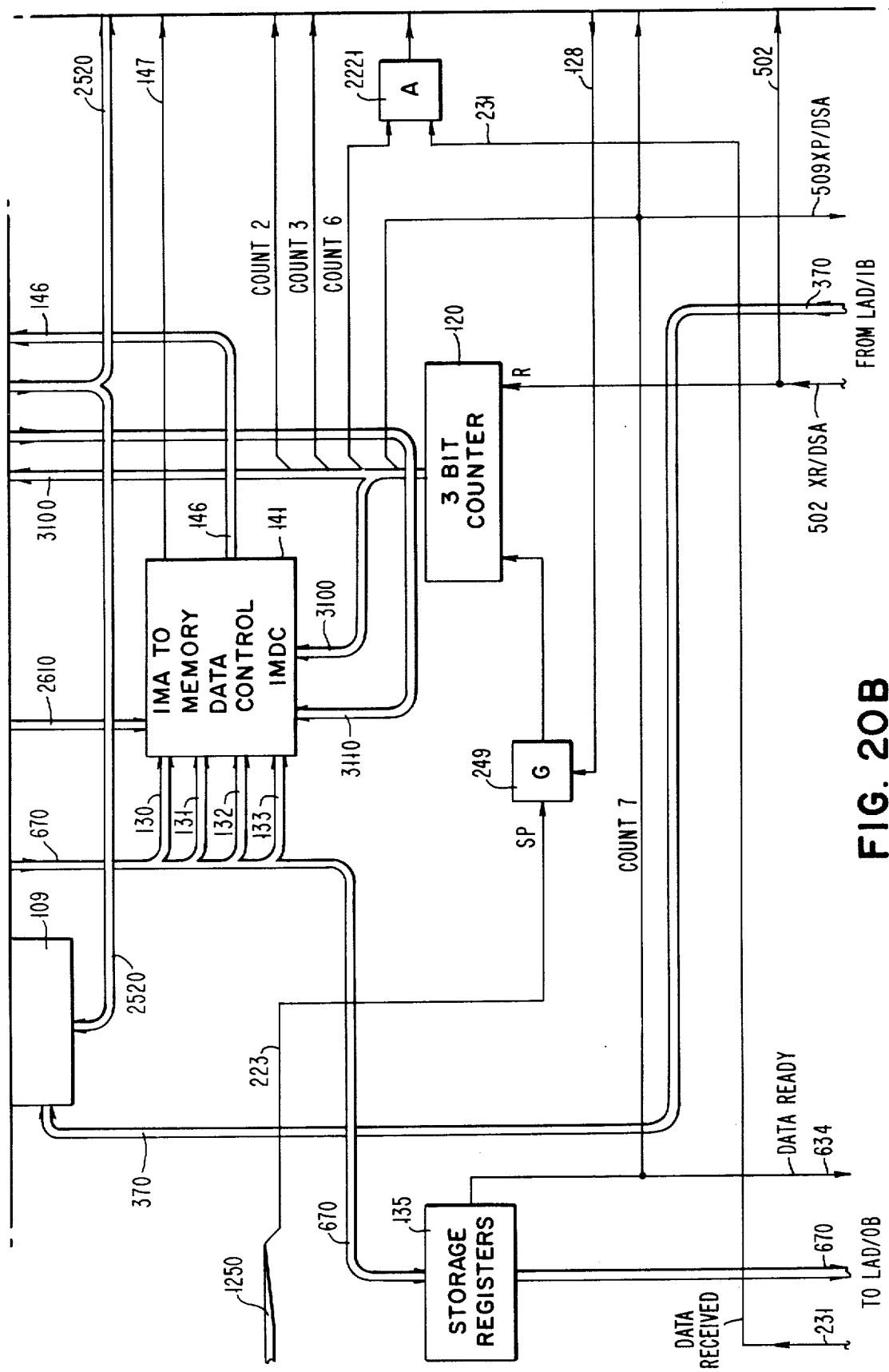

FIGS. 20 A–D show the overall design of IMA 11 plus CPU 10 and memory 13 and the data flow between them. The main function of IMA 11 which is shown in FIGS. 20A, B, and D only is to substitute an outbound frame for the appropriate inbound frame it has received after due processing. The inbound frame is stored in the resisters of LAD IB 12 for presentation to IMA 11 pursuant to IMA 11 processing. After due processing, the IMA 11 stores the outbound frame in IMA storage DFL registers 135 as shown generally in FIG. 20B. These sets of registers (storage registers 135 and LAD IB 17) are required for inbound and outbound frame storage due to the fact of the unknown length of the bytewide loop and the fact that the inbound frame and outbound frame need not necessarily be in perfect synchronization.

Figure 32:
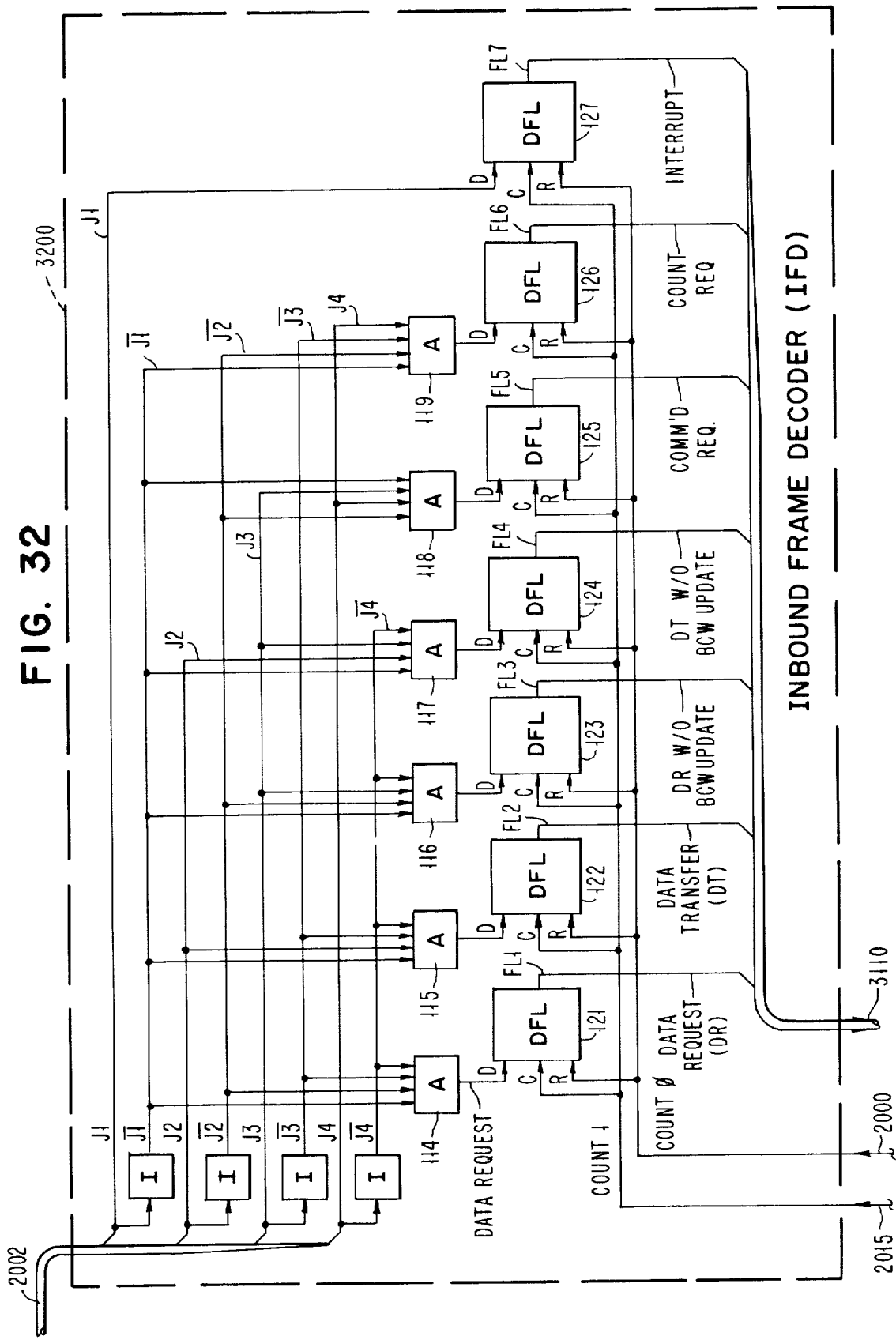
FIG. 32 shows the electrical schematic diagram for the inbound frame decoder (IFD) of FIG. 20A.

FIGS. 20A, B, and D show the IMA in block diagram form with an overall cable and inter-cable connection of the IMA 11 and its various logic blocks which do the processing. Upon receipt of an inbound frame by process registers 109 on cable 370 from LAD IB 12, bits J1–J4 are supplied via cables 670 and 2002 to decoder 3200. A determination is made by inbound frame decoder (IFD) 3200 shown in FIG. 32 as to what kind of a frame has been received. There must be a frame received even if there have been no inbound transmissions by any device, since LAD IB 12 converts an empty frame into a command request XR. Thus, in normal operation, the IMA 11 is guaranteed receipt of some kind of an inbound frame. In FIG. 32, the AND gates 114 through 119 generate the data request, data transfer, etc. types of frame indications from bits J1–J4 and their complements. These indications are appropriately stored in flip latches 121 through 127 whose outputs are designated FL1–FL7. Also, in FIG. 20B the XR/DSA line 502 emanating from LAD IB 12 will cause the memory request line 149 to memory control unit 162 in FIG. 20C to be activated by flip flop 2503 in FIG. 20D. When access to memory 161 in FIG. 20C shared with CPU 10 has been granted via line 128 by memory control 162, an SP clock pulse on line 223 from cable 1250 begins the cycle of 3 bit counter 120 in FIG. 20B which counts eight times from count 0 through count 7. Also, note that counter 120 is reset to 0 with XR/DSA line 502 so that counter 120 is automatically set at count 0 but will not count until gate 249 is opened when memory grant line 128 is activated by memory control unit 162. Notice that counter 120 is driven by the SP clock because the counter must go through count 7 before the next inbound frame is received. This insures that the IMA 11 will get eight memory cycles (the maximum required) to process a frame. Since there are eight SP pulses per frame, this should be adequate since memory request and memory grant signals normally will occur in the nanosecond range, and the byte-wide loop 804 is running in the microsecond range. Therefore, the leading edges of memory request and memory grant signals should be fairly close together and early enough with respect to the total amount of the time required to process an entire inbound frame. As long as the system is able to process an entire inbound frame during an inbound and outbound frame time, there is no problem in overrunning the IMA 11 with frames coming in on cable 370 from the loop 804. Note that CPU 10 also accesses memory 161 via memory data register 163 and memory address register 160 through conventional coordination by memory control 162. This is a commercially available type of direct memory access port known as a DMA. Memory control 162 always gives preference to IMA 11 whenever both CPU 10 and IMA 11 want a memory cycle.

At count 0, all of the flip latches 121–127 in FIG. 32 are reset so that at the rise of count 1, a new frame type is determined to be used for the entire inbound frame processing.

TABLE I

| | FL 7=1 (Interrupt) |
|---|---|
| Count 0 | Reset J byte decode |
| Count 1 | GET current address (CA) of BCW of level J2, 3, 4 |
| Count 2 | GET stop address (SA) of BCW of level |

TABLE I-continued

| | FL 7=1 (Interrupt) |
|---|---|
| | J2, 3, 4. If SA = 'FF' hex, set J3=J4=1 of OB frame for BNR. END processing. |
| Count 3 | Compare CA to SA; if CA=SA, create BO (J4=1) of OB frame and END processing. |
| Count 4 | If CA≠SA, store at CA I & J bytes of IB frame |
| Count 5 | Store at CA+2 K & L bytes of IB frame |
| Count 6 | Calculate CA+4 |
| Count 7 | Storage CA+4 at BCW of level J2, 3, 4 |

Figure 28A:
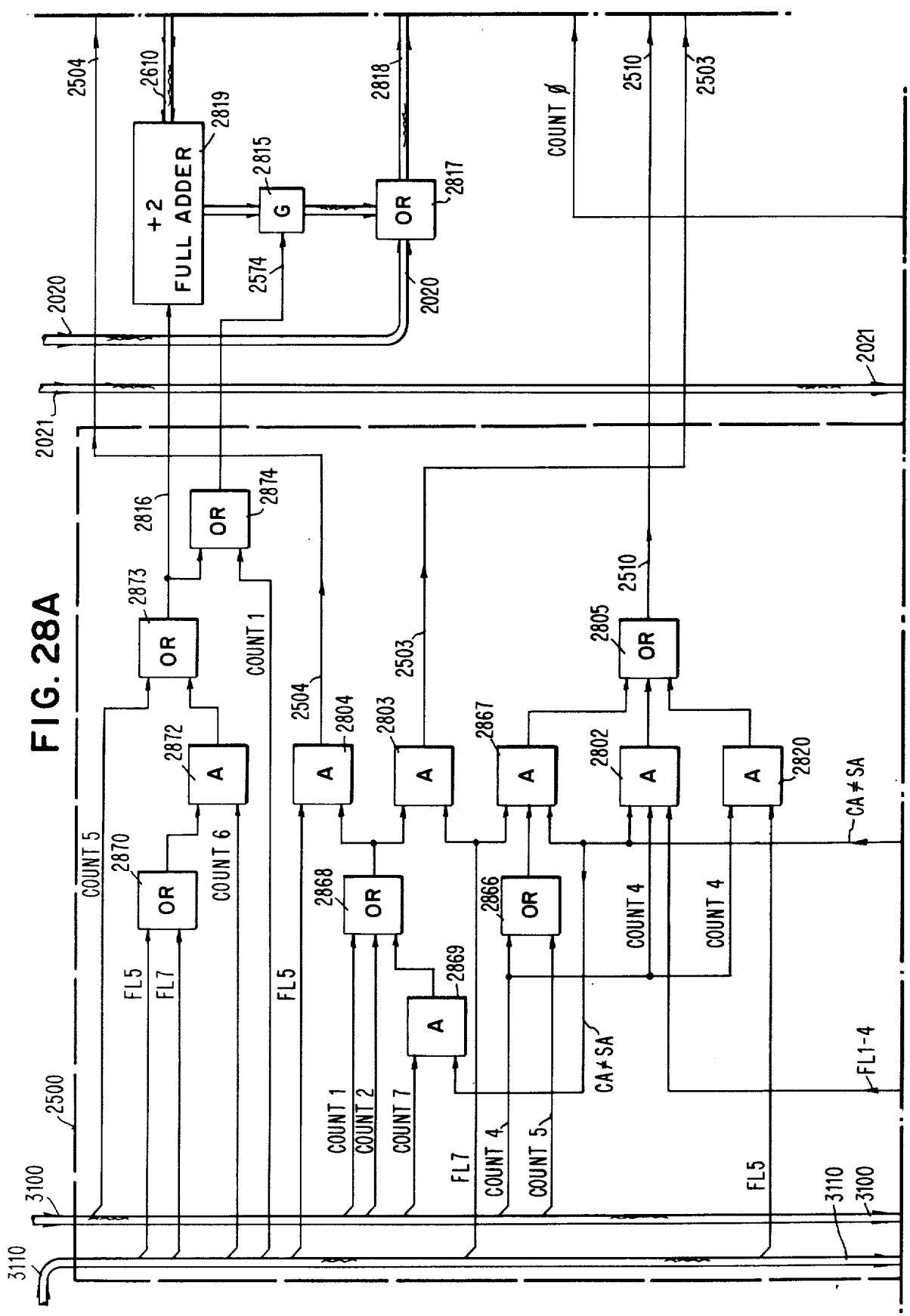
Figure 28B:
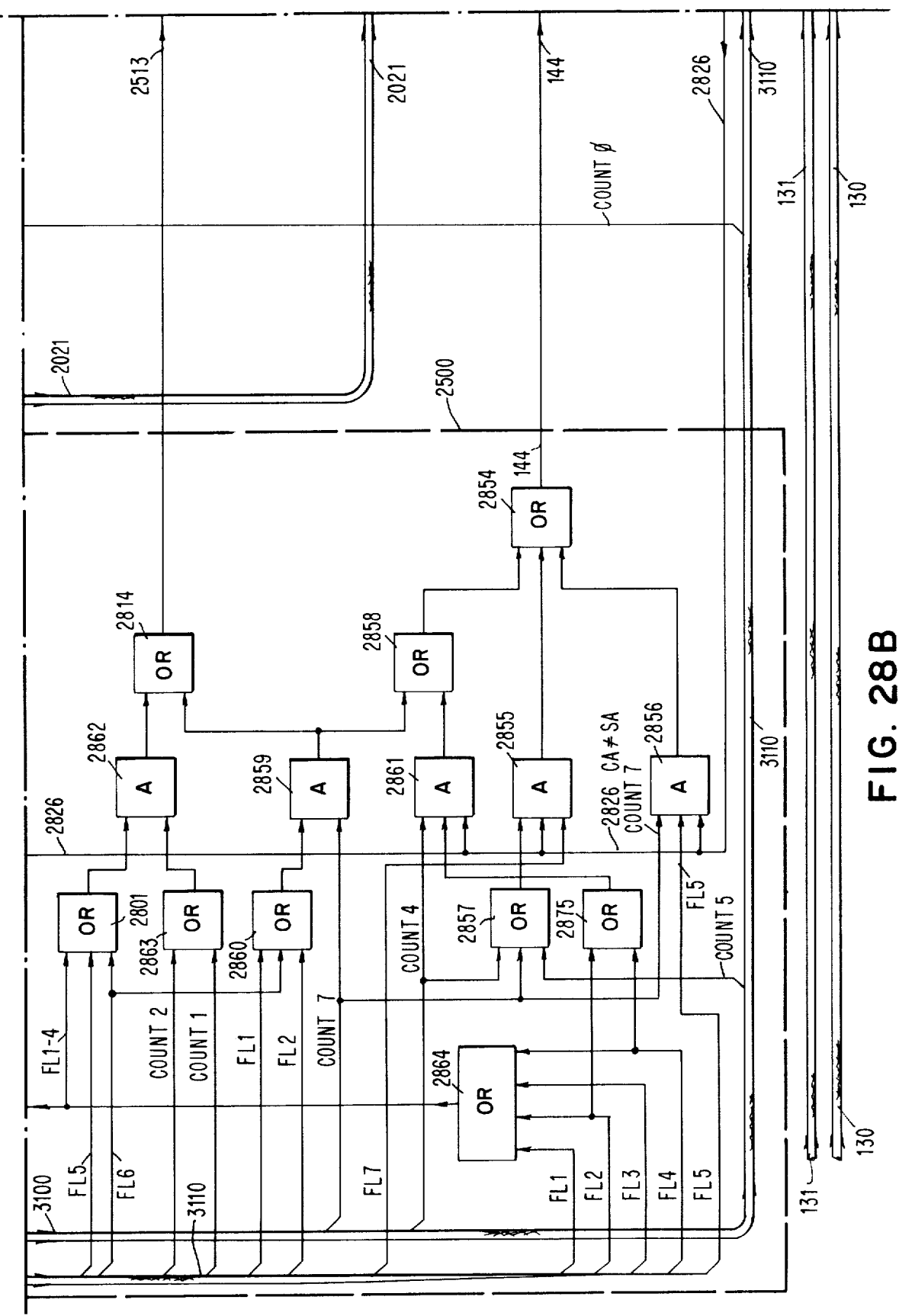

Table I describes how an interrupt inbound frame is processed. This is distinguished by FL 7, 127 in FIG. 32 being equal to 1, at the positive transition of count 1 time as a result of bit J1 on cable 2002 from cable 670 being positive. At count 1, the current address (CA) is obtained from memory 13 and supplied to CA register 2810 in ARCU 140 shown in FIG. 28 corresponding to the buffer control word of level J2, 3 and 4. How a unique buffer control word is associated with every interrupt level to be determined by j2, 3, and 4 is described below in Table IV. At count 2, the stop address (SA) is obtained and supplied to register 2820 in FIG. 28 corresponding to the stop address (SA) of the buffer control word (BCW) of the appropriate interrupt level. If the stop address is equal to al ones ('FF' in hexadecimal notation) as determined by AND 2840 in FIG. 28 which activates line 2825, J3 and J4 of the corresponding outbound frame are both set to 1 at count 2 via AND 2413 in FIG. 24. The I byte is left the same. The K and L bytes are "don't cares." This causes AND 2050 in FIG. 20 to reset FF 2053 via OR 2052 thus dropping memory request line 149. This causes memory grant line 128 to drop inhibiting the counter 120 from processing via AND 249. Thus, processing of this inbound frame is complete.

If the stop address (SA) is unequal to 'FF', the counter will proceed to count 3 and comparator 2821 in FIG. 28 will compare the current address (CA) of the BCW of the interrupt level to the stop address (SA) of the same BCW of the same interrupt level. If they are equal, a buffer overrun (J4 equal to 1)in the outbound frame is created as shown in FIG. 24. Line FL7, count 3 and CA-SA operates AND 2420 to reset DFL 2403 (J3) and to set DFL 2404 (J4) providing the Buffer Overrun (BO) code of J3=0, J4=1. Again processing is ended.

Figure 30A:
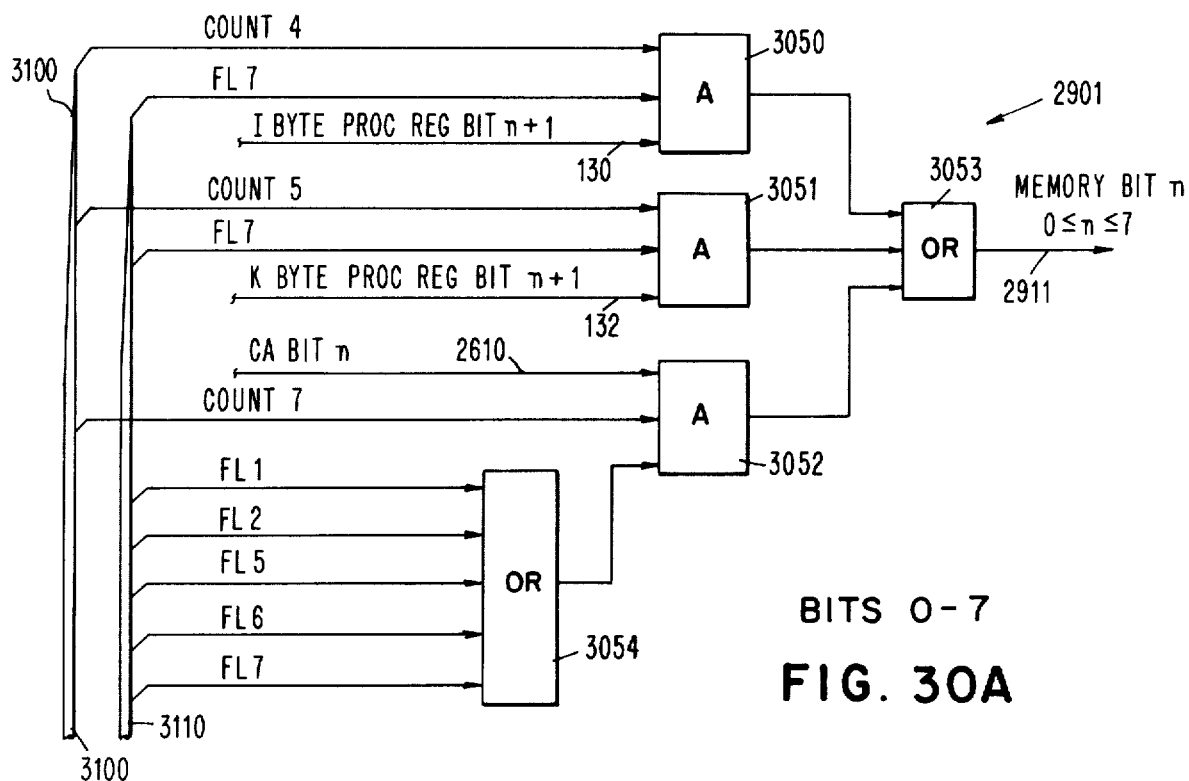
FIG. 30A shows a logic block of a portion of FIG. 29 in detailed electrical schematic form.
Figure 30B:
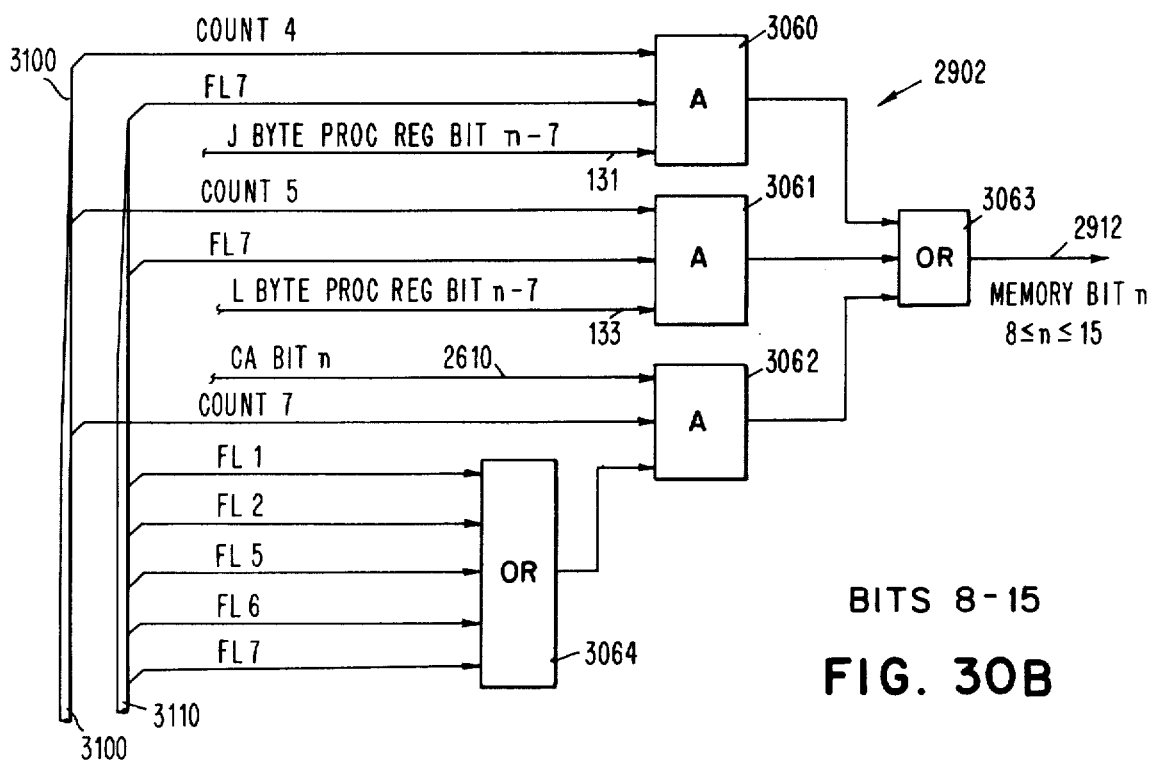
FIG. 30B shows another logic block of another portion of FIG. 29 in a detailed electrical schematic form.

If processing is not ended, the counter continues to count 4, at which time the I and J bytes of such an interrupt inbound frame are stored at the current address (CA) for the BCW by activating write line 144 via OR 2854, AND 2853 and OR 2857. We proceed to count 5, at which time we store the K and L bytes of the inbound frame as shown in FIGS. 30A and 30B for signals FL7, count 5 and the respective bytes to ANDS 3051 and 3061 and write line 144 as above. Note that the buffer control word (BCW) is preset to half-word boundaries such that the buffer control word (BCW) at the beginning of the operation always has its last two bits set to 0. Thus, to go to current address (CA) plus 2, all that is required is that the second to last bit, or bit 1 of the memory address is changed from a 0 to 1 in FIG. 28 by activating line 2816. This automaticlly obtains the curent address (CA) plus 2 which is then stored in the current address register 2810 via gate 2815 in almost zero time. However, CA+4 might require propagation of a carry bit through 16 bits. Thus, an entire count time is set aside for this. Therefore, at count 6, CA+4 is calculated by again activating line 2816 and at count 7 the result is stored away at the BCW's space in memory 13 associated with the inbound interrupt of level J2, 3, and 4. This is done in FIG. 28 by gates 2803 and 2806 activating the memory address bus 143 and gate 3052 in FIG. 30A and gate 3062 in FIG. 30B for memory data bus 145 and write line 144 as described above.

TABLE II

| FL 5=1 (Command Request) | |
|---|---|
| Count 0 | Reset J byte decode |
| Count 1 | GET current address (CA) of CMDQ (Command Queue) |
| Count 2 | GET stop address (SA) of CMDQ, if SA='FF' hex, END processing. |
| Count 3 | If CA=SA, stop processing. |
| Count 4 | If CA≠SA, GET I, J bytes at CA. |
| Count 5 | GET K & L bytes at CA+2. |
| Count 6 | Calculate CA+4. |
| Count 7 | Store CA+4 at CA of CMDQ (Command Queue). |

Table II describes how a command request corresponding to FL5 being equal to 1 is processed by AND gate 2804 in logic 2500 in FIG. 28. At count 1, OR2868 operates so the current address of the command queue is obtained by gate 2804 activating line 2504 to pass through OR 2501, line 4 into cable 143 to the Memory Address Register 160. In FIG. 28 and in Table IV below is a descriptin of how this unique address is obtained. At count 2 the stop address is obtained by gate 2804 and line 2504 plus line 2805 to OR 2501 bit 14 and similar to the interrupt processing, if the stop address is all ones ('FF'), processing is terminated. At count 3, if the current address is equal to the stop address, processing is also terminated because this corresponds to the command request queue being completely empty and an all zero I byte outbound frame is sent. This is done via AND 2307, resetting DFL 2303 in FIG. 23. Since this I byte is reserved for the IMA, in effect a don't care outbound frame has been created. At count 4, if the current address is unequal to the stop address (which implies that the command request queue has at least one frame) the I and J bytes are obtained at the current address of the command queue via AND 2820, OR 2805 line 2510 gating the current address register 2810. Note that the command queue of a LAD associated with the lower speed loop is obtained using the address of that LAD. An empty frame going around the byte-wide loop 804 has all zeros in it and the LAD inbound 12 transforms that into a command request with an address of all zeros. Returning to frame processing, at count 5, memory access is made at the address CA+2 to fetch the K and L bytes by means of AND 2871, OR 2873, line 2816, OR 2874, line 2574, gate 2815, and or 2817 to cable 2818, etc. Since the command queue, like the interrupt queue, is set to a half-word boundary, adding 2 simply means changing the second to last memory address bit to a 1. At count 6, an entire step is set aside for calculating CA+4, since up to 16 bits might be required to change as a result of this addition. At count 6, AND 2872 drives OR 2873 to operate adder 2819, gate 2815 and OR 2817 as above to reload register 2810. At count 7, the current address of the command request queue, CA+4 is stored via cable 2610 at the CA of the CMDQ equal to the I byte as gated by OR 2814 driving gate 2813, plus a one in bit 4 on cable 143 from line 2504 and AND 2804 and frame processing is complete and write line 144 as described above.

TABLE III

| FL 1, or FL 2, or FL 3, or FL 4, or FL 6=1 | |
|---|---|
| Count 0 | Reset J byte decode |
| Count 1 | GET current address (CA) of BCW of I byte |
| Count 2 | GET stop address (SA) of BCW of I byte. If SA='FF' hex, set J3=J4=1 of OB frame for BNR, END processing. |
| Count 3 | Compare CA to SA. If CA=SA, create BO (J4=1) of OB frame and END processing. |
| Count 4 | If FL 1 or FL 3=1, FETCH at CA K & L bytes. If FL 2 or FL 4=1, store at CA K & L bytes. |
| Count 5 | Calculate CA+2. |
| Count 6 | If CA+2=SA, create BE (J3=1) of OB frame. |
| Count 7 | If FL 1 or FL 2 or FL 6=1, store CA+2 at CA of BCW. |

Table III shows how all other frames such as data request with and without BCW update, data transfer with and without BCW update, and count requests are processed. At count 1, the current address (CA) is obtained corresponding to the BCW of the I byte. This is done via cable 130 gated by line 2513, AND 2862, and ORs 2801 and 2863. At count 2, the stop address (SA) of the BCW of the I byte is obtained with similar gating as in count 1, with the addition of line 2805. Similarly to the other frames that are processed, if the stop address is equal to all ones ('FF'), J3 and J4 are set equal to one in the outbound frame, indicating that the buffer is not ready (BNR) as described above, and processing is terminated. If the current address (CA) is equal to the stop address (SA) at count 3, buffer overrun (BO), which is J4 of the outbound frame equal to 1 is created in FIG. 24 via AND 2420 to DFL 2403 and 2404, and again processing is ended via unit 2510, driving line 2824 in cable 2520 to AND 2051, OR 2052, to FF 2053 turning on line 149 in FIG. 20. At count 4, one of three things occurs. If flip latch 1 or flip latch 3 is equal to 1, at the current address, the K and L bytes are obtained via AND 2802, OR 2805, and write line 144 via OR 2854, OR 2858, and AND 2861. This corresponds to a data request and at this point it is immaterial whether or not there will be a buffer control word update. If line FL 2 or line FL 4 is equal to 1, then and K and L bytes are stored at the current address in memory by OR 2864, AND 2802, OR 2805 to drive line 2510 to gate 2812. Write memory line 144 is activated by OR 2875, AND 2861, driving OR 2858, driving OR 2854. If line FL 6 is equal to 1, nothing occurs at count 4. Irrespective of whether FL1, FL2, FL3, FL4, or FL6 is set, at count 5, curent address plus 2 is calculated via OR 2873 to line 2876 to OR 2874, etc. as above. Since a half-word boundary is not necessarily present, an entire count time is allowed for the addition of +2 to the current address. At count 6, if the current address +2 is equal to the stop address, a buffer end condition is created; namely, J3 of the outbound frame is set to the equal to 1. This is done in unit 2510 which inlcudes an AND which combines count 6 and the output of comparator 2821 to set DFL 2822 via an OR. In FIG. 24, the bit J3 is set equal to 1 by OR 2414 and AND 2415 driven by line 2824 and other FL inputs from OR 2421 and count 6. If this operation has been a data request, with buffer control word update or a data transfer with buffer control word update or a count request, corresponding to FL 1 or FL 2 or FL 6 equal to 1, the system proceeds to store the current address plus 2 at the current address corresponding to this buffer control word of this inbound frame and it has completed processing the inbound frame. This is done via OR 2860, AND 2859, activating lines 2513 and 144 indirectly as shown in FIG. 28.

FIG. 20 shows cable 143 going from ARCU 140 to the memory address register 160 and cable 145 going to the memory data register 163 from IMDC 141. The memory control unit 162 contains a series of five control lines corresponding to write memory line 144, read bus valid 148, memory request 149, memory grant 128, and write memory bus valid 147. These are standard memory interface lines.

FIG. 20 also shows how frame processing is prematurely terminated if one of two conditions occurs; namely, if a stop address is equal to all ones ('FF'), on line 2825, indicating that the buffer is not ready (BNR) and common to all frames being processed at count 2. To stop frame processing, a flip-flop 2053 is reset which causes the memory request line 149 to go inactive and consequently, memory no longer can be accessed by the device requesting service. The next time a frame is received by the LAD, a transmission request XR/DSA on line 502 will reset the counter 120 and also set the memory request line 149 which will cause a new frame to begin to be processed. Another condition for prematurely terminating processing is if at count 3 a signal appears on line 2824 CA=SA because the current address is equal to the stop address, which corresponds to a buffer overrun activating AND 2051 to reset FF 2053, so again memory request line 149 is dropped and frame processing is terminated. This is common to all inbound frames. At count 7 time, a one SP interval time delay unit 2055 is triggered to reset FF 2053 for the next frame.

Figure 21:
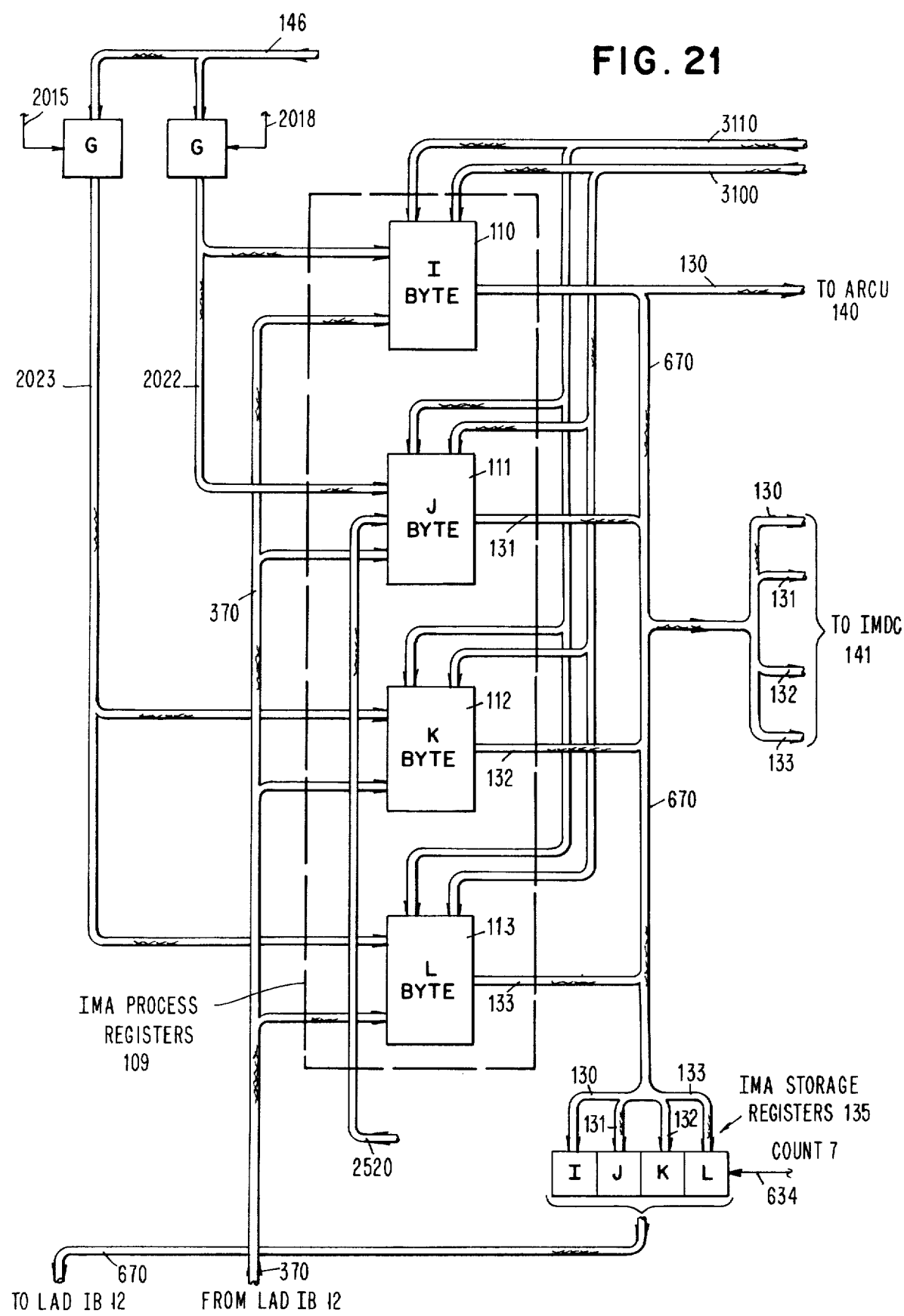
FIG. 21 shows the process registers of the IMA and associated cables and elements.

FIG. 21 shows the process registers 109 (110-113) of IMA 11 connected by cable 670 to various points including IMA storage registers 135 via cables 130 through 133. The IMA process register 109 has its inputs connected to LAD inbound 12 via cable 370 and the IMA storage registers 135 have their outputs connected to LAD outbound 12 via cable 670. At count 7, data ready line 634 is activated to pass a signal to the LAD outbound, signalling the completion of inbound frame processing resulting in an outbound frame which should now be placed on loop 804. Notice in FIG. 20 that count 6 and a data received signal on line 231 results in a high level interrupt sent via AND 2221 and line 2220 to the CPU 10 because the IMA has been processing frames faster than the loop has been transmitting them. Since this can occur only as the result of a major loop malfunction, it is consequently posted to the CPU 10 at the appropriate interrupt level.

Figure 22:
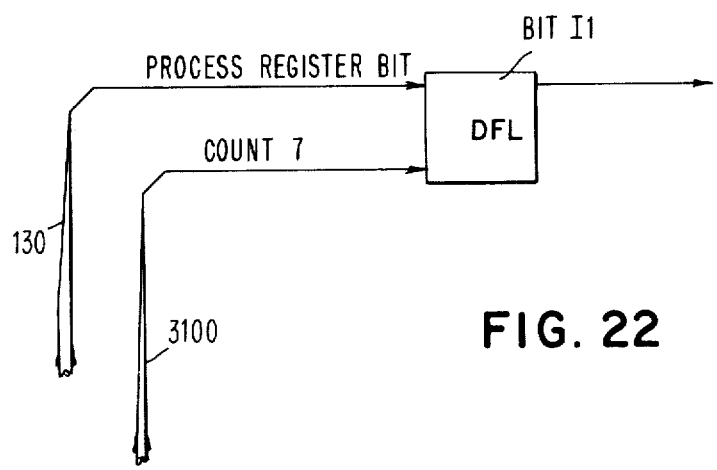
FIG. 22 shows an exemplary storage register for a single bit in FIG. 21.

FIG. 22 shows a sample storage register 135 from FIG. 21 for a single bit which is I one in the case from I byte register 110. Each such register is connected to receive a bit via one of the cables 130 through 133 from the corresponding process register 109. It is brought in via count 7 at which time all processing should be complete and a complete outbound frame should have been supplied to process registers 109.

Figure 23:
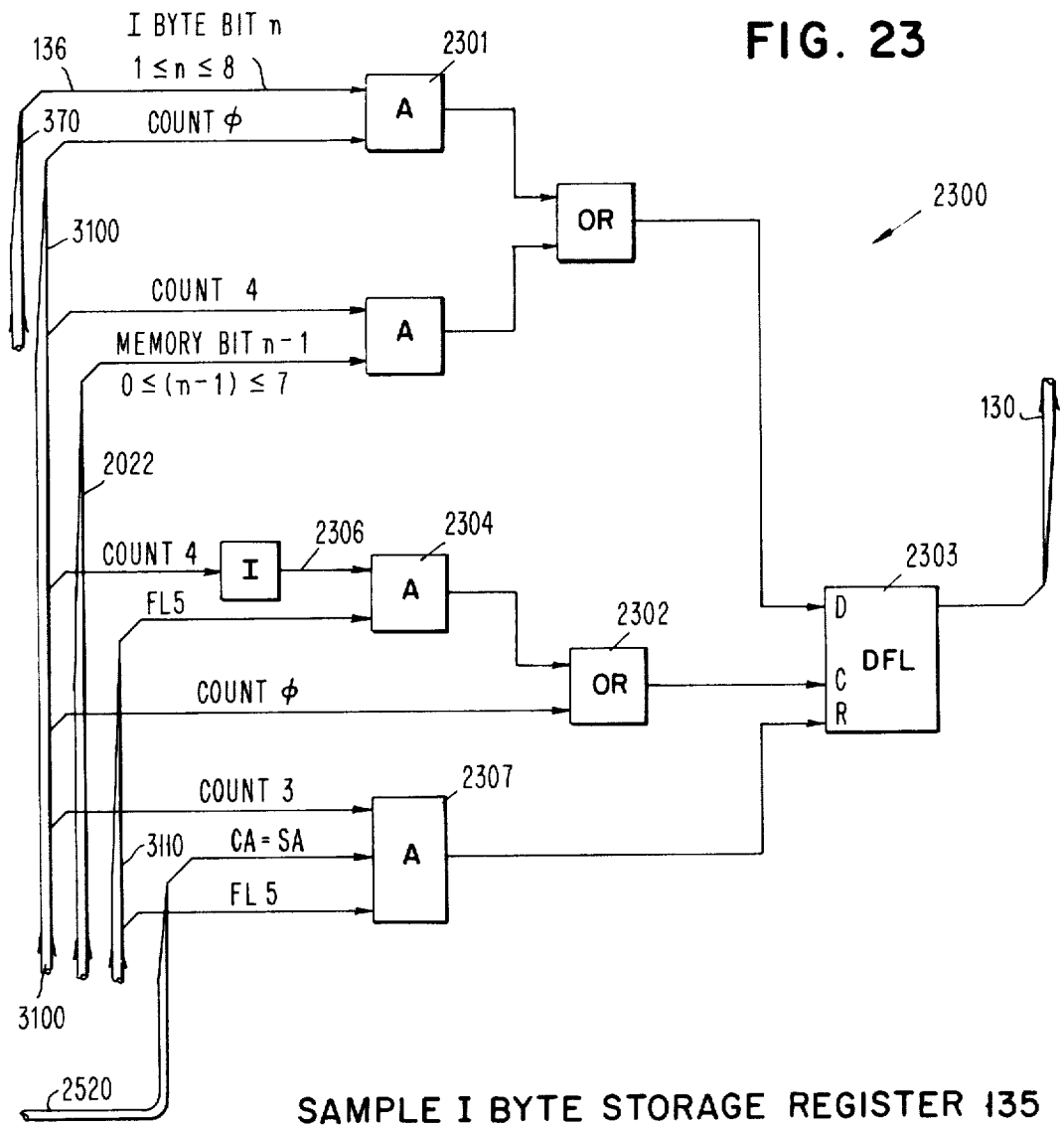
FIG. 23 shows a sample registor of the I byte register of FIG. 21.

FIG. 23 shows a sample register 2300 from FIG. 21 of I byte process register 110. Cable 370 containing an I byte bit n (where n can be 1 through 8) is ANDed by AND 2301 with count 0 and then stored in DFL 2303 by the clock signal from OR 2302. At the fall of the count 4 signal on line 2306, AND 2304 clocks DFL 2303 to store memory bit n-1 (where n-1 will go from 0 to 7 so that I byte bit 1 corresponds to memory bit 0), when FL 5 is equal to 1 (command request). That is to say, the only time an I byte is loaded into an outbound frame via data bus 2022 is if it is a command request. A reset occurs via AND 2307 if a command frame is being processed and the command queue is empty. This is determined via AND 2307 testing for CA=SA, FL 5 and count 3, as explained above. This will result in a null I byte consisting of all zeros being sent out on the loop since there is not frame to be processed out to loop 804. The J, K, and L bytes for a null I byte frame are don't cares.

Figure 24B:
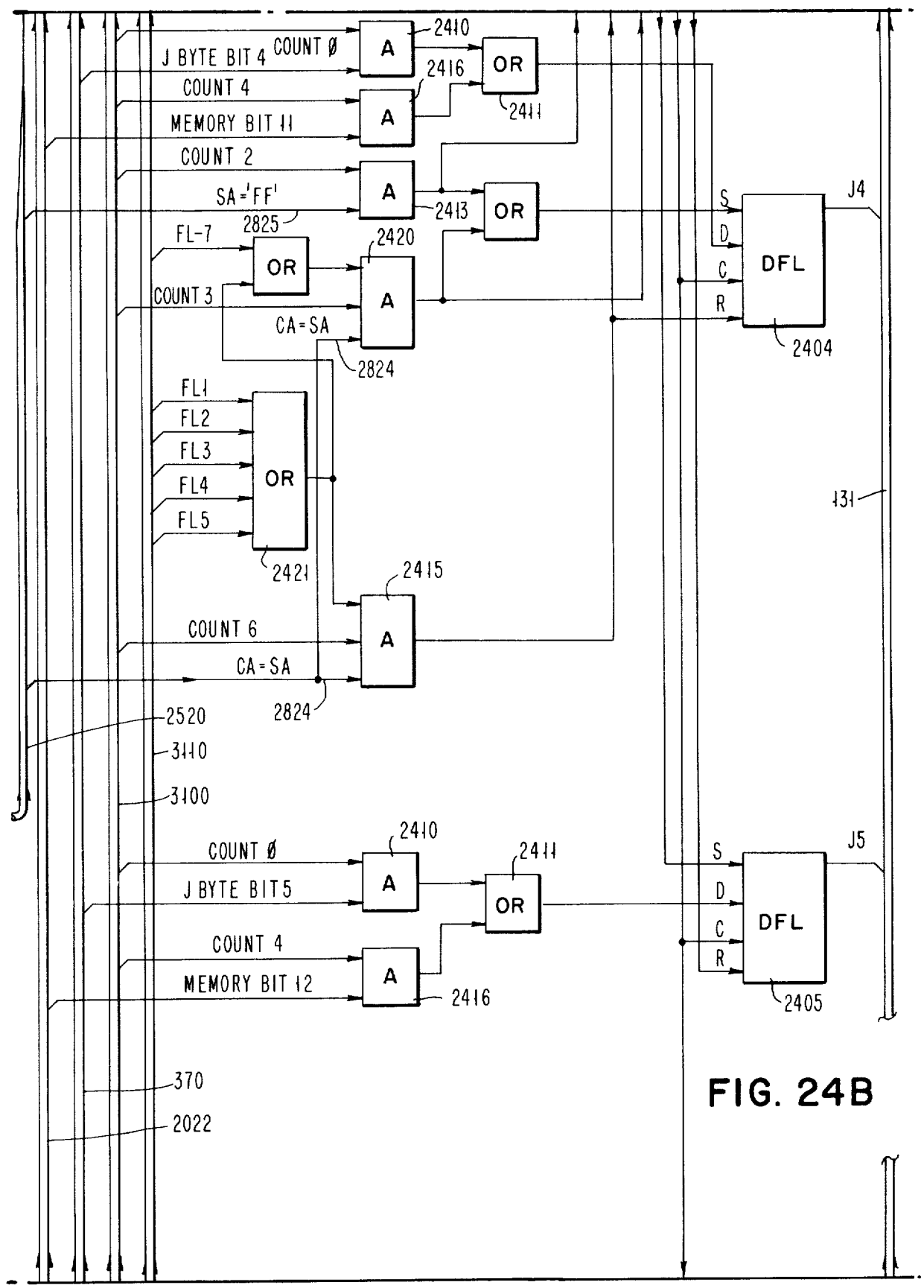
Figure 24C:
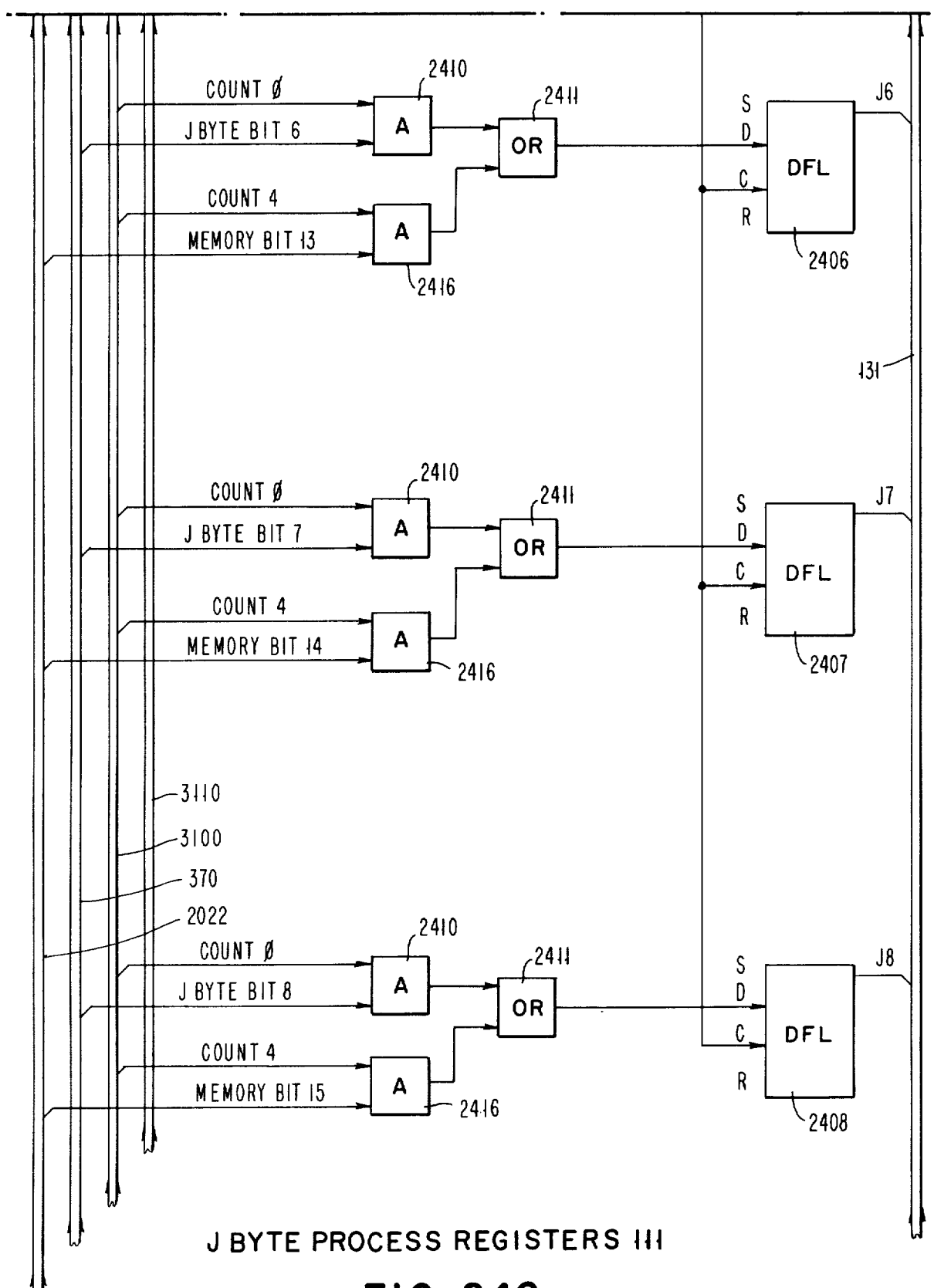

FIGS. 24A–C show the details of the various J byte process registers 111 of FIG. 21. The J byte is stored from MIDC memory bus branch 2022 at count 4 through ANDS 2416 and ORS 2411 to the D input of DFLs 2401–2408 when the clock lines C are turned on by AND 2417, OR 2412 and inverter 2450. J byte bit 1 is set to 1 by AND 2413 and OR 2414 when there is an interrupt (FL 7), and at count 3 the current address is equal to the stop address, or at count 7, when one of flip latch 2 or flip latch 4 is on as shown by AND 2415 to OR 2414. This will result in the appropriate outbound frame control byte. Also, like the K and L bytes, the J byte register can be loaded via bus 370 at count 0 via ANDS 2410 and also from the memory bus 146 at count 4 if this is a command frame via ANDS 2416 and 2417, etc. Appropriate clocks are supplied by OR 2412 to all DFL's 2401–2408 at count 4 time if this is a command frame or at count 0 time. Similarly, J byte bit 2 is loaded via cable 370 from LAD inbound 12 at count 0 time or can be loaded from cable 2022 from memory at count 4 time if this is a command request. J byte bit 3 is exactly the same as J byte bit 2 with and addition of OR 2414 setting DFL 2403 to 1 to show a buffer not ready (BNR) condition by a signal from AND 2413 at count 2 if frame processing yields a stop address equal to 'FF' on line 2825. AND 2415 also shows a buffer end (BE) condition for all frames except an interrupt and command request via OR 2421 and AND 2415 setting DFL 2403 via OR 2414 and resetting DFL 2404. The buffer end (BE) condition must also be shown via AND 2415 at count 6 time if the current address +2 is equal to the stop address. J byte bit 4 is very similar to J byte bit 3. J byte bits 5, 6, 7, and 8 are either loaded from LAD inbound 12 via cable 370 at count 0 time or loaded via MIDC memory bus branch 2022 if this is a command request.

FIG. 25 is an overall data flow of the address register control unit (ARCU) 140 of FIG. 20A which is shown in detail in FIGS. 28A–D. FIG. 25 shows current address register (CA) 2810 which provides an output on cable 2610 that is gated by gate 2812 via a gate signal on line 2510 from the control logic 2500 which consists of logic responsive to outputs of flip latches, clock counts, and signals indicating either current address equal to or unequal to the stop address as indicated on lines 2824 and 2826, only the latter of which is used in logic 2500. The output on cable 2610 of current address (CA) register 2810 is coupled to an adder 2819. The +2 full adder performs an addition of all 16 bits in the amount of time prescribed equal to one count period. This is achieved by a full look-ahead circuit which is within the state of the art of adders today. Also the output cables 130, 131 from I byte process registers, J byte register bits 2 through 4, are shown gated by gates 2813 and 2806 into the memory address bus 143 via cables 2505 and 2506 and ORs 2501 so that the appropriate control words can be obtained from memory in response to a type of frame including a data request, a data transfer, count request, command request, or interrupt. These are also controlled via control logic 2500. On the bottom of FIG. 25 a stop address register 2820 is shown which with AND 2840 can determine whether the stop address is equal to 'FF' and also a comparator 2821 for comparing the outputs of current address register 2810 with the stop address register output on cable 2841 and a signal of stop address equal to current address on line 2824 or stop address unequal to current address on line 2826 can be generated.

Figure 26:
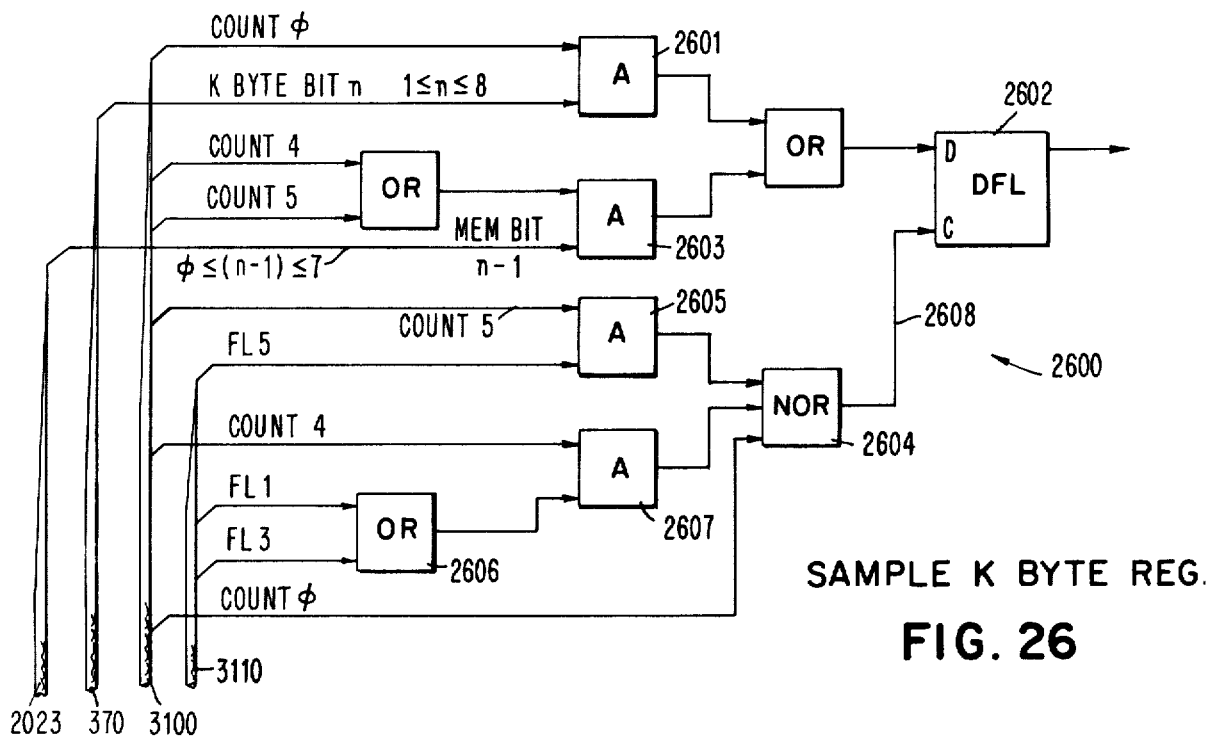
FIG. 26 shows an electrical schematic diagram of a sample K byte register of FIG. 21.

FIG. 26 shows a sample K byte process register 2600 or a single bit position of K byte register 112. The K byte register 112 is loaded when DFL 2602 is clocked at one of three times. If the count is equal to zero, the LAD inbound 12 frame is loaded by AND 2601 from cable 370 and clocked by NOR 2604 from cable 3100 into DFL 2602 for appropriate processing. The memory bit is loaded from cable 2023 corresponding to the proper K byte location by AND 2603 at count 5, if FL 5 is then equal to 1 as sensed by AND 2605 which clocks it into DFL 2602 via NOR 2604 (which is a command request). Also the K byte register 112 will be loaded from AND 2603 for a memory data request with or without buffer control word update which corresponds to FL 1 or FL 3 being on as sensed by OR 2606 at count 4 time which is tested by AND 2607 connected by NOR 2604 to clock line 2608 to clock in the data to DFL 2602.

Figure 27:
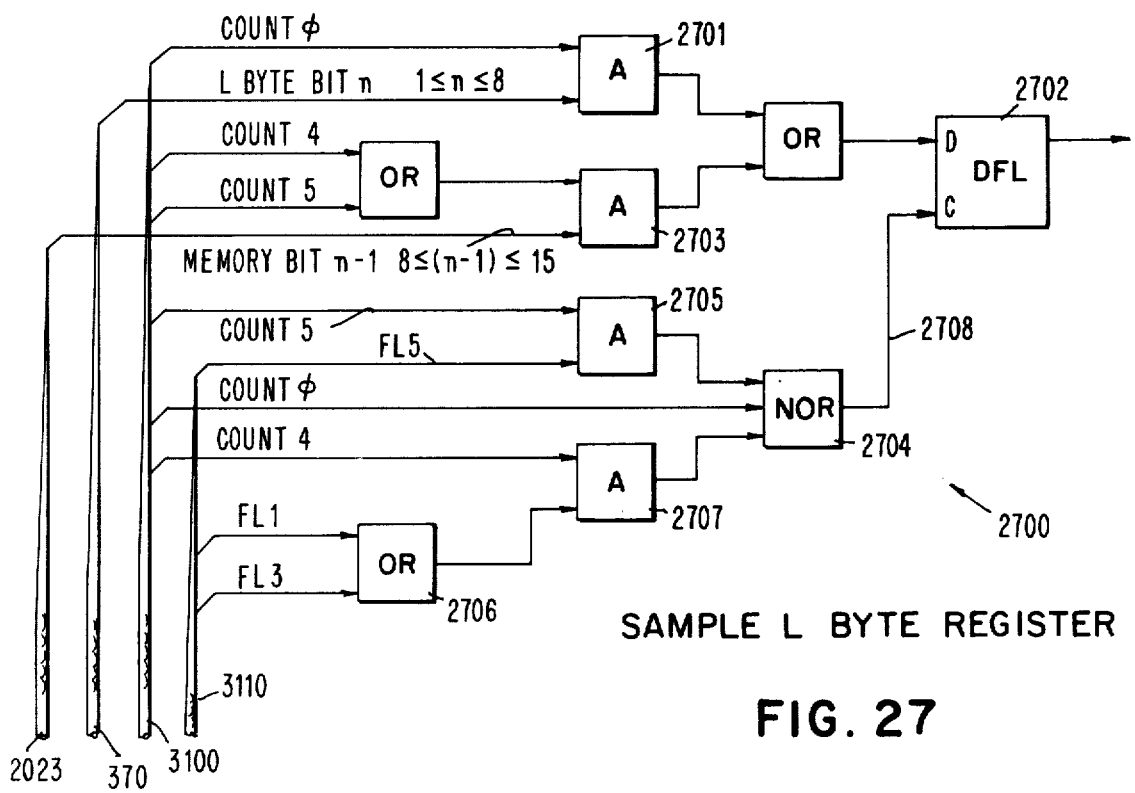
FIG. 27 shows an electrical schematic diagram of a sample L byte register of FIG. 21.

FIG. 27 shows a sample bit 2700 of L byte process register 113 and this is completely analogous to the K byte register 2600 in FIG. 26 with the exception that whereas the K byte register used the memory bits 0 to 7, the L byte process register uses the memory bits 8 to 15. A similar difference can be observed between the J byte and I byte process registers.

FIGS. 28A-D show the address register control unti (ARCU) 140 of FIGS. 21A and 25 which is an implementation of the data contained in Tables I, II, and III. Notice OR 2801 responds to any frame to be processed with the exception of the interrupt frame (FL=1); any frame to be processed at count 1 time will have to get the current address CA associated with the buffer control word BCW of the I byte. The interrupt frame receives its buffer control word as part of the interrupt level J2, 3, and 4, and this is obtained via gate 2806 gating cable 2506 into the appropriate bit position of the memory address bus 143. Also not that AND 2803 which is for command frame processing will provide the appropriate gating signals for those two frames onto the memory address bus 143, and based on the algorithm as shown on Table IV for determining buffer control words BCWs, they are ANDed into the appropriate memory address bus bit. The I byte register bus 130 is gated in by gate 2813 in FIG. 28D at the appropriate time by a signal on line 2513 from OR 2814 at count 1, count 2, for FL1-6 or at count 7 if updating is to be done on either a data request (FL1), a data transfer (FL2) or count reg. (FL6). OR 2854 provides the appropriate write memory signal on line 144 depending on the count and also what kind of frame is being processed to distinguish, for example, between a data request and a data transfer where one would read and one would write memory. The current address register 2810 is gated via gates 2812 in response to a signal on line 2510 from OR 2805 at the appropriate time for the appropriate frame as can be seen by the various units feeding OR 2805. The current address register 2810 is fed from the memory 13 by cable 2020, or 2817 and gate 2815. At the appropriate count time and for the appropriate frame, register 2810 is incremented by a 16 bit full adder 2819. There is a feedback from the adder 2819 via cable 2823 or 2817 and gate 2815 into register 2810 and, of course, the output of register 2810 can be fed directly into the memory address bus 143 at the appropriate time. The stop address register 2820 is loaded from memory at the appropriate time for the appropriate frame. It supplies an input to an AND gate 2840 used for detecting the 'FF' (hexidecimal) of the stop address; namely, that the stop address is equal to all ones to generate buffer not ready BNR. Also by means of a 16 bit exclusive OR comparator 2821, the output of the stop address (SA) register is compared to the output of the current address (CA) register to produce a signal from DFL 2822. At the right time CA=SA or CA ≠ SA on line 2824 or 2826 can be created by DFL 2822.

Figures 29, 31:
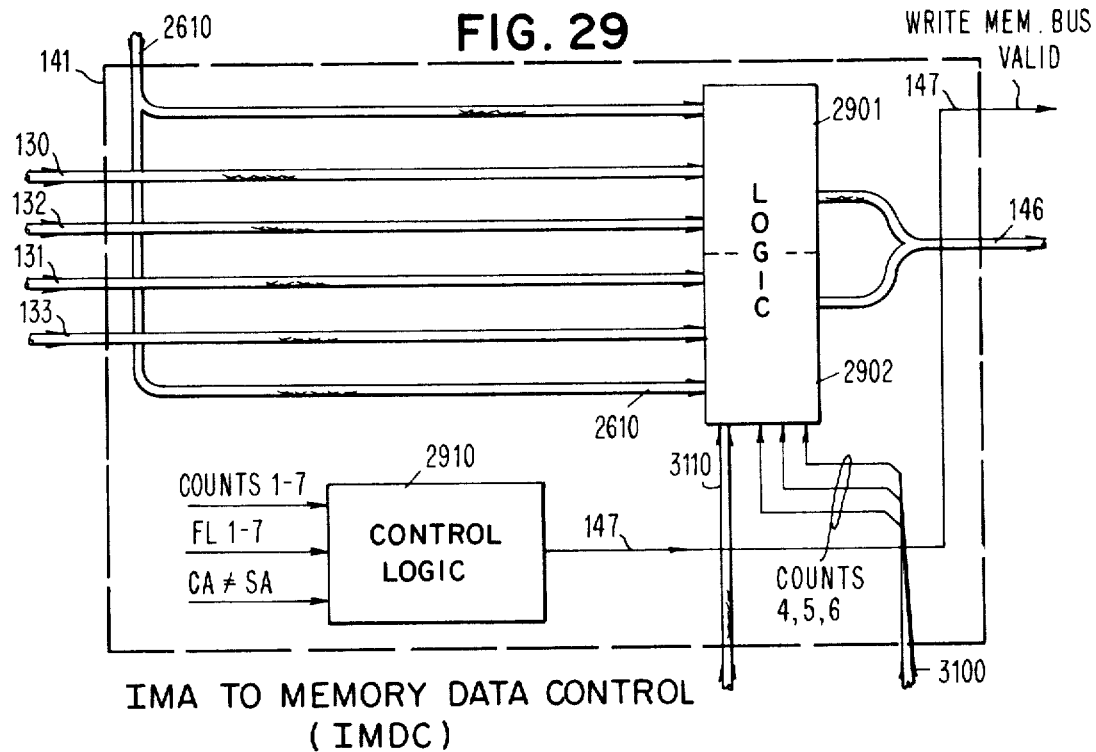
FIG. 29 shows the IMA to Memory Data Control Unit (IMDC) from FIG. 20B of the IMA, CPU and memory of the system.
FIG. 31 shows the MIDC of FIG. 20A in a detailed electrical schematic form.

FIG. 29, which is the IMA to Memory Data Control (IMDC) simply shows the write memory bus valid line 147 as a result of control logic 2910 being driven by outputs from the various counts, FL lines, and current address unequal to stop address line 2826. Logic 2901 receives inputs on cables 130–133 which are connected to the IMA process register outputs.

FIG. 30A shows the detail of logic 2901 of FIG. 29. Memory bit $n$ (where $0 \leq n \leq 7$) at count 4 is equal to I byte $n+1$ or K byte bit $n+1$ at count 5 as determined by ANDs 3050; 3051 respectively. In addition, if the BCW is to be updated for a data request, data transfer, count request, interrupt or command request as determined by OR 3054, AND 3052 gates CA bit $n$ at count 7 time.

FIG. 30B of logic 2902 from FIG. 29 is logically identical to FIG. 30A where 2060 and 3061 perform the same function as 3050 and 3051 for memory bit $n$ ($8 \leq n \leq 15$) with respect to J and K bytes bit $n-1$. Also, OR 3064 and AND 3062 are analogous to 3054 and 3052, respectively for CA bit $n$.

The following is the way the buffer control words are arranged in CPU memory 13. The current address of any bufferr associated with an I byte of 8 bits is obtained by preceding the I byte with 5 zero bits resulting in 13 bits. The last 3 bits of the current address (CA) of a buffer associated with a device having an I byte is then appended with 3 zero bits so that current address reads 00000 I byte 000. The stop address of this buffer is 00000, the I byte consisting of 8 bits followed by 010. For purposes of CPU 10, the start address of the buffer, which is used by CPU 10 to keep track of the buffer allocations so that one buffer can be allocated to only one device at a time, is obtained by using 00000, the I byte and 100. For the command queue and interrupt buffer queues, the Process Address (PA) which tells the CPU 10 where it has last put or taken a frame for processing is obtained by using 00000, the I byte, which now corresponds to the command queue which can have an address associated with LAD 12 or 17, and then appended by 110. The interrupt and command queue buffers use the same last 3 bit convention; namely, the last three bits are 000 for the current address of the buffer, 010 for the stop address, 100 for the start address and 110 for the process address. The first 13 bits are formed by 0000, a 1, 00000, then P1, P2, P3 set as manual switches in FIG. 6A, which correspond to the interrupt of the process. Notice that the P1 = P2 = P3 = 0 is the address of a command queue buffer, since interrupt level 0, by design, is not allowed to be used by any device.

FIG. 28 memory bus bits correspond to this implementation. That is to say, that the memory address bus output depends on proper gating to obtain the correct current address 143 as P1, P2, P3 bit for interrupt processing and also it is assumed that all zeros are used for P1, P2, P3 for command queue frame processing associated with the LAD 12. LAD 17 has an address and its frame is treated the same as any other frame except that 4 bytes are loaded instead of only 2 bytes. Also note that the last bit, bit 15, always equals 0 for frame processing since this refers to the upper or lower half of 2 bytes and all frame processing requires 2 bytes to be processed simultaneously so that we will be on a 2 byte memory boundary. The IMA 11 will never access memory 13 for a single byte.

TABLE IV

MEMORY BUFFER CONTROL WORD ASSIGNMENTS

| | | | |
|---|---|---|---|
| Count Request or | 00000 1 byte | 000 | current address |
| Data Request (w/wo update) | | 010 | stop address |
| Data Transfer (w/w update) | | 100 | start address |
| | | 110 | CPU process address |
| Interrupt | 00001 00000 P1P2P3 | 000 | current address |
| | | 010 | stop address |
| | | 100 | start address |
| | | 110 | CPU process address |
| (Note: P1=P2=P3=0 is an illegal interrupt buffer) | | | |
| Command | | | |
| | 00001 LAD or IMA Address | 000 | current address |
| | | 010 | stop address |
| | | 100 | start address |
| | | 110 | CPU process address |

DEVICE SPECIFIC ADAPTER (DSA)

An example of a DSA in FIGS. 1A and 1B is to be used with a selectric typewriter which consists of a typewriter having a disjoint keyboard and typing element (ball) so that keying causes no direct action by the element unless appropriate signals are gated back to the typing element and consequently the keyboard is used as an input device to satisfy the criterion for the in bound DSA interface. When a key is depressed it signals to a suitable set of $T^2$ L FET latches and so a transmission request is initiated and the address is used by the GDA. This is used only in the interrupt mode. The DSA consisting of the latches puts the keyboard character into digital form into the GDA and the GDA transmits it back. Then the CPU such as 370/145 is used for a table look up to translate the keyboard information into the tilt rotate code and this is then sent out as an outbound message and eventually the ball tilted and rotated to print the letter that was typed on the keyboard. Certain signal levels are changed for the $T^2L$ implementation of the GDA. The IBM Selectric typewriter is well known to those skilled in the art.

The drop 276–278 for inhibiting free bits is an AND gate as described on the GDA there is a signal generated which inhibits the free bit so the free bit is gated into one side of the gate and the inhibit free bit signal passes into the other side of the gate and this output passes on to the next device traveling entirely around the looop unitl it arrives at the inbound LAD 12.

ALTERNATIVE DEVICES

A device can be a teleprocessing link, a CPU or any other data processing device as well as another LAD connected to another loop.

Figure 33C:
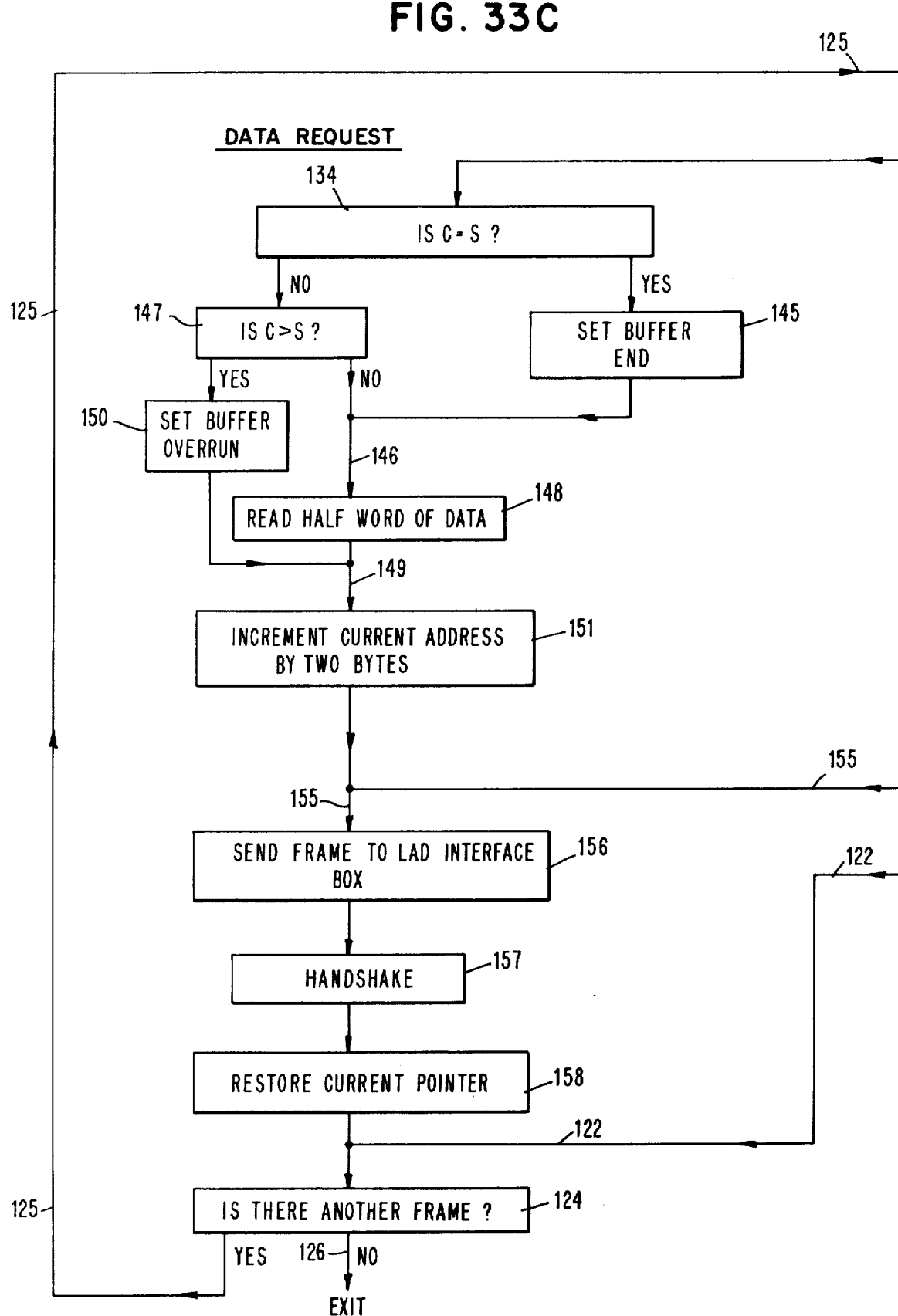

The flowchart shown in FIGS. 33A–33C provides an Indirect Memory Access (IMA) Channel in software form for a central processing unit (CPU). After the program is entered, the first input function 100 is to receive a signal that an inbound frame of data has arrived at the LAD 12 from the byte wide data lines of the loop and that as a result the LAD 12 is requesting service from the CPU 10. Next function 101 stores or latches the newly received frame in a CPU memory. Next, function 102 sends a response signal to the LAD indicating that the transmission has been received and is no longer pending. Then the first decision block 103 tests whether the frame is an interrupt frame shown by a J1 bit value of 1 requesting that the CPU be interrupted to perform a function for a device. If the answer is "yes" then the program branches along line 104 to the interrupt request sequence of functions. First the priority n of the request is decoded by function block 105. The priority code is contained in the second, third, and fourth bits J2, J3 and J4 of the J byte. When the first bit of the J byte was a 1, then it was determined that the frame comprised an interrupt frame for the purpose of the test in function step 103. The priority n can vary from 1 to 7 in binary form. Function step 106 determines the correct level buffer for the interrupt request in the interrupt buffer queue. Thus, the address of a priority buffer control word (PBCW) is calculated in step 106, based upon the priority n. Several bits are added to the priority n to identify two buffer locations in memory containing a first word referring or pointing to the end of the iterrupt buffer PSTOP, and at the other location a second word referring or pointing to the present address PCURRI which is to be used by the IMA channel. The PBCW includes four words which include PSTOP and PCURRI, as well as PCURRP and PSTART. PCURRP points to the current address in the buffer to be used by the service routine to be excuted by the particular interrupt. PSTART points to the starting address of the interrupt buffer for level n interrupts. In steps 107, 108, and 109 respectively PSTOP, PCURRI and PCURRP are each read. Then is step 110 the frame is stored in the interrupt buffer at PCURRI which was assigned by the PBCW for the interrupt.

In step 111 a test is made as to whether PCURRI equals PSTOP, which if so would indicate that the end of the buffer has been reached so all buffer locations are filled and that new interrupts must be stored at the top of the buffer. Thus, in step 112 if step 111 yields a yes, the pointer for PSTART for the interrupt buffer is read and in step 113 PCURRI is made equal to PSTART to go back to the top of the buffer. If test 111 yields a no answer, then the current address PCURRI is incremented in step 114 by 4 corresponding to the four bytes of the interrupt frame. The next step 115 is to rewrite the new PCURRI in memory. Next, a test is made in step 116 to determine whether the entire interrupt buffer level being used has been overwritten. The test performed is to determine whether the current pointer PCURRI equals the program pointer PCURRP. In other words, is the current buffer location now being serviced by the program of the CPU. If the CPU is now servicing the particular location, that means that the loop at this buffer level has been completely filled with interrupt request to the extent that more requests have been made than can be stored in this buffer without overwriting an interrupt request which has not yet been serviced. Thus, the result is that a buffer overflow signal is sent back if the test produces a yes causing the priority n to be set to the zero level interrupt buffer.

Now the steps starting with step 106 must be requested in the same way except that the PBCW 106 associated with interrupt level 0 is used. This also causes the CPU to unload the overflowing buffer level.

If there is no buffer overflow in step 116, step 118 is performed to determine whether the pending interrupt has a pending priority PP of a higher priority level than the current priority CP level priority now being serviced by the CPU. Thus, in step 118 an OR is made on the nth bit of the pending priority (PP) register which registers the priority of the pending interrupt, and in step 119 a test is made to determine whether PP exceeds CP. If yes, then in step 120 a branch to a higher interrupt level is made by setting the WCA bit and in step 121 an OR is made on the nth bit of the transmitted priority TP which reports to the CPU interrupt handler the highest priority interrupt pending.

At the end of steps 121 and 119, line 122 connects the program to step 124 which tests whether there is another frame. If yes, the program branches back on line 125 to step 101. Otherwise, the program exits at 126.

Returning to step 103, if the frame is not an interrupt frame, then it must be a data frame and in step 130 the address of the buffer control word for the frame is calculated based upon the address of the frame received.

In steps 131 and 132, the step pointer and the current pointer are read.

Step 133 tests the data to determine whether it is a data request, and if so leads to step 134. If "NO" then it leads to step 135, which tests whether the frame is for a data transfer. If it is "YES" then in step 136 a test is made to determine whether the current buffer address C equals the buffer stop address S. If it does YES, then in step 137 a buffer end marker must be set to be shipped back as part of the acknowledgement. If C does not equal S, NO then step 138 follows and step 138 tests whether C exceeds S. If C does not exceed stop NO then in step 139 the 2 bytes or halfword of data is stored (as it would be after step 137 also), and then in step 140 the current address pointer is incremented by 2. If C is greater than stop in test 138 yes then the current buffer address C has gone past the stop address S and this is a buffer overrun so step 141 sets the buffer overrun register and proceeds to step 140.

Note that in step 139 following steps 137 and the NO of test 138 the data is stored, but that in step 141, the data is not stored, but the buffer overrun is set and then the program branches out. In the case of buffer overrun incrementing the address in step 140 makes no difference. Step 137 indicating buffer end will cause the GDA to send an interrupt automatically. This interrupt tells the CPU to process the buffer.

If the data is a command request the answer to test 135 is No. The question to be answered by test step 142 is to determine whether a command is waiting. If there is no command waiting and the current address C is greater than the stop address, then the program for this frame is finished as nothing more remains and line 143 leads to step 124. If the current address is less than the stop address, then there remains a frame to be processed or sent out and the entire frame is read in step 144 and then the current address is incremented by 4 in step 154 because the entire frame takes 4 bytes including the address, the control byte, as well as 2 data dytes, if any. Step 144 causes the entire 4 bytes to be read and the LAD eventually presents that data as a frame.

If the result of test step 133 is a yes the program branches to test step 134 which tests to determine whether the current address pointer C equals the stop address pointer S. If they are equal which means that the last two data bytes have been requested from the buffer, the buffer end indication is set in the control byte in step 145 which leads to line 146, joining the no output of test step 147 which follows a No output of test step 134. In step 147 C is tested for being greater than S. If the result is No, then it joins with step 145 on line 147 to step 148 which reads a half word of data and continues to line 149. If C exceeds S in step 147, then in step 150 a buffer overrun indication is produced and there is no reading made and then the program proceeds via line 149 to step 151 which increments the current address pointer by 2.

Note that the difference between a data request and a data transfer is that the former reads data from a buffer and the latter stores data in the buffer.

Steps 140, 151, and 154 led to line 155. In step 156 the frame is sent to the LAD interface box. Then handshaking is done in step 157 and in step 158, the current address pointer is stored in memory, and step 124 follows as described above.

Serializer 256

The serializer 256 of FIGS. 18A and B provides a double function. It times the parallel operated LAD OB 17 as well as the serial, low speed, secondary loop 14, 255. The serial and parallel timing output signals are quite different. The output on cable 1250 for the outbound time is substantially identical to the timing on the other cables 1250 shown in FIG. 1A. However, there are hiatuses between outbound J and K time parallel timing not shown in FIG. 19, there is only one SP pulse IT2 following outbound time and other inbound time pulses are missing. Also, the timing is asynchronous since the clock line 255 carries a square wave signal generated by an independent source 1827.

The decoder 1801 sends out clock signals at counts 7, 15, 31, 39 and 47 to generate SP pulses at OR 1830 during I, J, K and L times, respectively, during the outbound half frame plus a pulse at count 47 durng what would be I time of the inbound half of a frame, which is not generated by serializer 256 and which is referred to in FIG. 19 as a hiatus interval. The SP pulse at count 47 resets the LAD OB 17 for the next outbound frame which commences at the next count 0 of the decoder.

Outbound A time pulses are commenced at counts 8 and 32 by OR 1831 as shown in FIG. 19 which sets the FL for A time. The FL for A time is reset to zero at counts 16 and 40 as shown in FIG. 19 by OR 1832. Note the hiatus referred to as the FF interval which lasts from counts 16–23 because a free frame FF interval set of data is fed into OR 1823 from counts 24–31 the chart shows at the bottom of FIG. 18B, so no data should be entered into register 1802 until the byte interval from counts 16–23 has expired. If the data were entered into register 1804 at count 23 and transferred by gates 1803 into register 1802 at count 24, then the clock signal from line 255 applied to clock input C of register 1802 would empty all of the data from register 1802 before the time when it would be needed. Thus, the transitions or changes in A, B, SP, It, Ot, FF, etc. intervals are all suspended from counts 16–23 insofar as LAD OB 17 and cable 1250 are concerned during the FF interval. Note also that during inbound hiatus time from counts 48–95 there are no A, B, FF, IT or OT transitions because of the fact that there is no need for inbound timing other than the signals on clock line 255, for the SERDES units, which generate their own inbound data and timing signals in accordance with the timing chart at the base of FIG. 18B. Furthermore, DES 257 produces A, B, SP, IT and OT signals for the LAD IB 17. Note, that during the inbound hiatus, there is an SP pulse IT one at clock time 47 which is generated for the purpose of resetting the LAD OB 17.

At count 24, the FL which generates B time is set and that FL is reset of count 40, at the end of the outbound portion of the frame.

The FL for OT and IT time is set at count 0 and is reset at count 40.

The serializer 256 of FIGS. 18A and B uses clock pulses from decoder 1801 to control timing for the parallel operated LAD OB 17 and for the serial, low speed, secondary loop 14, 255. The output on cable 1250 during outbound time appears identical in FIG. 19 to that on other cables 1250 in FIG. 1A shown in FIG. 3 although it will be asynchronous since the clock line 255 has a square wave signal provided by an independent generator 1827. However, there are hiatuses in the generation of OB timing signals and there is only the one (SP) inbound timing signal IT one to reset the LAD OB 17. The decoder 1801 provides SP pulses at counts 7 and 15 and skips to 31, 39 and finally at count 47 via OR 1830 during I time, J time, K time, and L time of the outbound portion of a frame plus a pulse at count 47 of I time for the inbound time to reset the LAD OB 17 for the next outbound frame. The A time pulses are commenced by decoder output pulses at counts 8 and 32 to OR 1831 as in FIG. 19 and the A time FL is reset by decoder output pulses at counts 16 and 40 to OR 1832 as in FIG. 19. Note the hiatus in A and B time from counts 16–23 for an FF interval 48–95 when on inbound signals are required since the deserializer DES 257 produces such signals for the LAD IB 17 and the CRC interval.

The FL for B times is set at count 24 and reset at count 40 while the FL for OT and IT is set at count 0 and reset at count 40.

In FIG. 18A, the clock signals for the serial loop on line 255 are shown as illustrated at the bottom of FIG. 18B, labeled "FRAME." From counts 0–7, on the serial loop, data passes from OR 1820 to OR 1823 to line 14 at counts 1, and 5–7 to designate the synchronization byte 47 hex, 01000111. During the same interval, the signals on cable 1250 are for the outbound I byte, so that when count 7 occurs, the register 1804 will receive an I byte of data from the LAD OB 17 on cable 904. The lead of the serial time ahead of the LAD timing is required to assure that data will be ready at count 7 for loop 14, 255 serialization. At count 8, on the serial loop, I time begins turning on OR 1828, and on cable 1250, J time begins. At count 16, J time begins turning on OR 1828 gating data into register 1802. During the next eight clock pulses via AND 1824 and OR 1823 onto line 14 of the serial loop and the timing on cable 1250 is suspended for eight counts until count 23. At count 24, on the serial loop, FF time begins and counts 26–30 are passed by OR 1823 onto the line 14 to create an FF byte of 00111110, and the timing on cable 1250 is set at K byte time (FIG. 19) to prepare the K byte for the serial loop at count 32. At count 32, the serial loop 14, 255 begins K byte time and the cable 1250 beings L byte time. At count 40, the serial loop begins L byte time and the cable 1250 begins a hiatus state in which no data signals A or B or FF are transmitted until the next count 0, because inbound time is synchronized by the SERDES and DES 257, etc. At count 47, the last SP pulse IT one is sent on cable 1240 to reset LAD OB 17 and at count 48 the serial loop is cut off from data when AND 1821 no longer receives a count 9–47 input on cable 1822, so AND 1824 cannot gate output data from register 1802. Register 1802 and AND 1825 operate in a similar way to the serializer bit on line 1826 being fed from cable 904 to the eighth register position of register 1802.

CRC generator 1805 operates in like manner to the CRC generator in FIG. 16 and its output is gated out only from counts 48–55 via AND gate 1827, at the beginning of inbound time. The signal is connected from AND 1827 to line 14 of the secondary loop, 14, 255 by means of OR 1823.

What is claimed is:

1. A loop data communication system including a loop comprising a transmission medium having an input end and an output end, a central loop terminal interface connected to send data into said input end and to receive data from said output end of said loop, a message frame generator for generating time division multiplex frame timing and synchronization control signals for devices connected to said loop, an indirect memory access channel for connecting said central loop terminal interface to data processing hardware adapted to provide data demanded therefrom, said frame control signals providing synchronization for inbound time and outbound time portions in each frame, for signals inbound to said central interface and outbound from said central interface, a plurality of interface stations adapted for coupling data processing equipment to said loop for message communication with said access channel, said stations being connected to said loop, said message frame generator always generating with each frame a free frame signal designating a free inbound time portion without addressing said signal to any specific interface station indicating the availability of said frame for an interface station on a first come, first serve basis, means adapted for coupling said free frame signal to each of said interface stations in series upon said loop on a one-at-a-time sequential basis, seizure means associated with each of said interface stations responsive to a free frame signal for seizing a free inbound time portion appearing at any one of said interface stations without first sending a signal to said central interface effective to assign the corresponding inbound time portion of a frame to said interface station associated therewith in response to a free frame signal and to activate said station to send a message on said free inbound time portion to said central interface and to block communication of said free frame signal by said means adapted for coupling to an interface station downstream from said station having seized said frame, and said central interface having no control over the allocation of access to send messages on said free inbound time portions of frames by said interface stations, but said control over allocation being maintained exclusively by each of said seizure means independently of said central interface or any other interface station and equipment related thereto on a first come, first serve basis.

2. The loop data communication system is accordance with claim 1 including a buffer memory for storing data, said memory including a memory control for controlling access to said buffer memory connected to said channel, wherein each interface station has a portion of said buffer memory allocated thereto and a said interface station generates an inbound message directed to said channel demanding access to said allocated portion of said buffer memory, said channel including means for address control to determine whether the portion of said buffer storage demanded by said message is available, and BNR means for determining and then indicating that said allocated portion of said buffer memory is not ready to accept data when that condition exists, said channel including apparatus for transmitting a signal on an outbound time portion of a frame addressed to said interface station that said allocated portion of buffer storage is not ready to accept data in response to such an indication from said BNR means, and said channel including means for generating a memory request signal and means for sending said memory request signal to said memory control in the absence of an indication from said BNR means whereby access to said memory is granted by said memory control.

3. The loop data communication system in accordance with claim 1 including a CPU connected with said channel, means for transmitting interrupt messages for communication from each said interface station through said channel to said CPU to secure data processing service from said CPU for transmission of resulting output data to said station.

4. The loop data communication system in accordance with claim 1 wherein a CPU is coupled with said channel and said channel receives interrupt signals from said loop and stores said messages in memory, for access by said CPU.

5. The loop data communication system in accordance with claim 1 including a memory connected to said channel wherein said channel includes a memory address register control unit including a current address register providing a current address signal and a stop address register providing a stop address signal and a comparator connected to the outputs of said registers.

6. The loop data communication system in accordance with claim 5 wherein a decoder is connected to said stop address register to detect an end of buffer signal.

7. The loop data communication system in accordance with claim 5 wherein said current address register has its terminals coupled with an adder for incrementing the address in memory until the current address signal equals the stop address signal and said comparator being adapted for detecting equality of said signals for indicating a buffer end condition.

8. A loop data communication system including a high data rate message frame generator and a high data rate inbound message receiver, a high speed data rate loop connected to a plurality of interface units adapted for coupling to a data processing device, a low speed data rate loop coupled to said high speed loop through one of said interface units, said high speed loop including a plurality of data lines in parallel for parallel transmission of information signals, first timing means for generating frame timing control signals for said high speed loop, said low speed loop including fewer data lines than said high speed loop, second timing means for generating frame timing control signals for said low speed loop asynchronously with respect to said first timing means, said interface unit coupled to said low speed loop being connected thereto through apparatus including means for serializing data into said low speed loop and means for deserializing data from said low speed loop, said first and second timing means including time means for time division multiplexing the time on the respective loop into time frames having a respective predetermined time duration on each loop, with an outbound time segment of each frame being devoted to outbound data and an inbound time segment of each frame being devoted to inbound data, each inbound time segment of each frame being generated free of data and available on an asynchronous basis for use by any said interface unit on a loop if said segment is free of data on a first come, first serve basis as said segment passes by each of said interface units, and availability of each of said inbound time segments being completely independent of control by any other means than seizure by said interface units of inbound segments on said first come, first serve basis, said means for generating and said time means generating a free frame signal for every inbound time segment without exception for transmission to said interface units on a first come, first serve basis as said signal travels in a fixed sequence to each of the interface units on a said loop, testing means associated with each interface unit on said loops for determining whether an inbound frame is free, and control means associated with each interface unit responsive to said testing means for supplying data to said inbound frame from said interface unit when an inbound frame is free.

9. A loop data communication system including a loop comprising a transmission medium having an input end and an output end, a central loop terminal interface connected to said data into said input end and to receive data from said output end of said loop, a message frame generator for generating time division multiplex frame timing and synchronization control signals for devices connected to said loop, an indirect memory access channel for connecting said central loop terminal interface to data processing hardware adapted to provide data demanded therefrom, said frame control signals providing synchronization for inbound time and outbound time portions in each frame for signals inbound to said central interface and outbound from said central interface, a plurality of interface stations adapted for coupling data processing equipment to said loop for message communication with said access channel, said stations being connected to said loop, a buffer memory for storing data, said buffer memory including a memory control for controlling access to said buffer memory connected to said channel, whereby each interface station has a portion of buffer memory allocated thereto and a said interface station can, at any time, generate an inbound message directed to said allocated portion of said buffer memory, said channel including means for address control to determine whether the portion of said buffer memory demanded by said message is available, and BNR means for indicating that said allocated portion of said buffer memory is not ready to accept data when that condition exists, said channel including apparatus for transmitting a signal on said loop on an outbound time portion addressed to said interface station that said allocated portion is not ready to accept data in response to an indication from said BNR means, and said channel including means for generating a memory request signal and means for connecting said memory request signal to said memory control in the absence of an indication from said BNR means whereby access to said memory is granted by said memory control.

10. The loop data communication system in accordance with claim 9 wherein a CPU is coupled with said channel and said channel receives interrupt signals from said loop and stores each said message in memory, for access by said CPU.

11. The loop data communication system in accordance with claim 9 including a memory connected to said channel wherein said channel includes a memory address register control unit including a current address register providing a current address signal and a stop address register providing a stop address signal and a comparator connected to the outputs of said registers for controlling the operation of said memory.

12. The loop data communication system in accordance with claim 11 wherein a decoder is connected to said stop address register to detect an end of buffer signal.

13. The loop data communication system in accordance with claim 11 wherein said current address register has its terminals coupled with an adder for incrementing the address in memory until the current address signal equals the stop address signal and said comparator being adapted for detecting equality of said signals for indicating a buffer end condition.

* * * * *